(12) United States Patent
Bang et al.

(10) Patent No.: US 10,778,065 B2
(45) Date of Patent: Sep. 15, 2020

(54) MOTOR ASSEMBLY

(71) Applicant: Samsung Electronics Co., Ltd., Suwon-si, Gyeonggi-do (KR)

(72) Inventors: Myung Bae Bang, Pyeongtaek-si (KR); Jong Jin Park, Suwon-si (KR); Byung Ryel In, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/165,243

(22) Filed: Oct. 19, 2018

(65) Prior Publication Data

US 2019/0052147 A1 Feb. 14, 2019

Related U.S. Application Data

(62) Division of application No. 15/316,404, filed as application No. PCT/KR2015/003105 on Mar. 30, 2015.

(30) Foreign Application Priority Data

Jun. 5, 2014 (KR) .................. 10-2014-0068329
Dec. 19, 2014 (KR) .................. 10-2014-0184840

(51) Int. Cl.
*H02K 1/14* (2006.01)
*H02K 7/14* (2006.01)
(Continued)

(52) U.S. Cl.
CPC ............ *H02K 7/14* (2013.01); *A47L 9/22* (2013.01); *F04D 17/165* (2013.01);
(Continued)

(58) Field of Classification Search
CPC ............ H02K 7/003; H02K 7/14; H02K 9/16; H02K 9/19; H02K 9/18; H02K 9/197;
(Continued)

(56) References Cited

U.S. PATENT DOCUMENTS 3,801,226 A      4/1974  Bevan et al.
5,203,574 A  *   4/1993  Stolzenfeld .......... B01F 7/1695
                                                          220/295
(Continued)

FOREIGN PATENT DOCUMENTS

CN          1975173       6/2007
CN        101208522       6/2008
(Continued)

OTHER PUBLICATIONS

International Search Report dated Jun. 29, 2015 in corresponding International Application No. PCT/KR2015/003105.
(Continued)

*Primary Examiner* — Bryan R Perez
(74) *Attorney, Agent, or Firm* — Staas & Halsey LLP

(57) ABSTRACT

A motor assembly of the present disclosure improves a combined structure between an impeller and a rotor to more firmly combine them. Furthermore, the impeller is combined with a rotor shaft without deformation, so the durability of the respective components may be improved.

6 Claims, 46 Drawing Sheets

(51) Int. Cl.

| | | |
|---|---|---|
| *H02K 9/06* | (2006.01) | |
| *A47L 9/22* | (2006.01) | |
| *H02K 1/27* | (2006.01) | |
| *H02K 1/28* | (2006.01) | |
| *H02K 9/14* | (2006.01) | |
| *H02K 15/03* | (2006.01) | |
| *H02K 11/33* | (2016.01) | |
| *F04D 17/16* | (2006.01) | |
| *F04D 25/06* | (2006.01) | |
| *F04D 29/26* | (2006.01) | |
| *H02K 7/00* | (2006.01) | |
| *H02K 1/18* | (2006.01) | |
| *H02K 3/52* | (2006.01) | |

(52) U.S. Cl.
CPC ....... *F04D 25/0606* (2013.01); *F04D 29/263* (2013.01); *H02K 1/148* (2013.01); *H02K 1/2733* (2013.01); *H02K 1/28* (2013.01); *H02K 7/003* (2013.01); *H02K 9/06* (2013.01); *H02K 9/14* (2013.01); *H02K 11/33* (2016.01); *H02K 15/03* (2013.01); *F05D 2260/37* (2013.01); *H02K 1/185* (2013.01); *H02K 3/522* (2013.01); *H02K 2213/03* (2013.01)

(58) Field of Classification Search
CPC .. H02K 9/20; H02K 9/06; H02K 9/14; H02K 1/148; H02K 1/2733; H02K 1/28; H02K 1/185; H02K 15/03; H02K 2213/03; H02K 3/522; H02K 11/33; F04D 17/165; F04D 25/0606; F04D 29/263; A47L 9/22; F05D 2260/37
USPC ............ 310/52, 54, 58, 59, 12.29, 12.01, 89
See application file for complete search history.

(56) References Cited

U.S. PATENT DOCUMENTS

| | | | |
|---|---|---|---|
| 5,448,794 | A | 9/1995 | Walch et al. |
| 2004/0061394 | A1 | 4/2004 | Gotoh et al. |
| 2006/0251351 | A1* | 11/2006 | Gomyo ................. F16C 17/045 384/100 |
| 2007/0069841 | A1* | 3/2007 | Kusano ................. H02K 3/522 335/202 |
| 2010/0215489 | A1* | 8/2010 | Johnson ................ F04D 29/444 415/208.2 |
| 2011/0119821 | A1* | 5/2011 | Chen ........................ A47K 1/14 4/295 |
| 2012/0162818 | A1 | 6/2012 | Sugi et al. |
| 2012/0201682 | A1 | 8/2012 | Dymond et al. |
| 2012/0237373 | A1 | 9/2012 | Li et al. |
| 2012/0243986 | A1 | 9/2012 | Wiebe |
| 2013/0052019 | A1* | 2/2013 | Ions ...................... F04D 29/023 416/174 |
| 2013/0251560 | A1* | 9/2013 | Xue ........................ F04D 13/06 417/410.1 |

FOREIGN PATENT DOCUMENTS

| | | |
|---|---|---|
| CN | 102545455 | 7/2012 |
| CN | 103348143 A | 10/2013 |
| CN | 103532299 A | 1/2014 |
| DE | 10 2005 031 589 | 1/2007 |
| EP | 0 207 457 | 1/1987 |
| EP | 1793124 | 6/2007 |
| EP | 1 918 589 | 5/2008 |
| JP | 5-21200 | 3/1993 |
| JP | 2001-32792 | 2/2001 |
| JP | 3333856 | 10/2002 |
| JP | 2007-154678 | 6/2007 |
| KR | 10-2006-0039535 | 5/2006 |

OTHER PUBLICATIONS

Australian Examination Report dated Jul. 26, 2017 in corresponding Australian Patent Application No. 2015269156, 3 pages.
Australian Notice of Acceptance for patent application dated Nov. 30, 2017 in corresponding Australian Patent Application No. 2015269156. 3 pp.
Extended European Search Report dated Jan. 2, 2018 in corresponding European Patent Application No. 15802334.1. 10 pp.
Schuht, Uwe: "Verbinden von Wellen mit Naben durch Klebstoff", Antriebstechnik, Vereingte Fachverlage, Mainz, DE, vol. 33, No. 4, Apr. 1, 1994, XP000440231. 3pp.
Communication pursuant to Rules 161(2) and 162 EPC dated Jan. 13, 2017 in corresponding European Patent Application No. 15802334.1. 2 pp.
European Communication dated Aug. 13, 2018 in European Patent Application No. 15802334.1.
Chinese Office Action dated Jul. 4, 2018 in Chinese Patent Application No. 201580042155.4.
U.S. Office Action dated Aug. 27, 2018 in U.S. Appl. No. 15/316,404.
U.S. Appl. No. 15/316,404, filed Dec. 5, 2016, Myung Bae Bang, et al., Samsung Electronics Co., Ltd.
Office Action dated Dec. 12, 2018, in U.S. Appl. No. 15/316,404.
Chinese Office Action dated Feb. 2, 2019 in Chinese Patent Application No. 201580042155.4.
Chinese Patent Office Action issued in Chinese Patent Application No. 201580042155.4 dated Jul. 11, 2019.
European Patent Office Action issued in European Patent Application No. 15802334.1 dated May 16, 2019.
Final Office Action dated Jun. 24, 2019 in U.S. Appl. No. 15/316,404.
Notice of Allowance dated Apr. 22, 2020 in co-pending U.S. Appl. No. 15/316,404.
Chinese Office Action dated Dec. 18, 2019 in Chinese Patent Application No. 201580042155.4.
European Communication dated Jan. 20, 2020 in European Patent Application No. 15802334.1.

* cited by examiner

[Fig. 1]
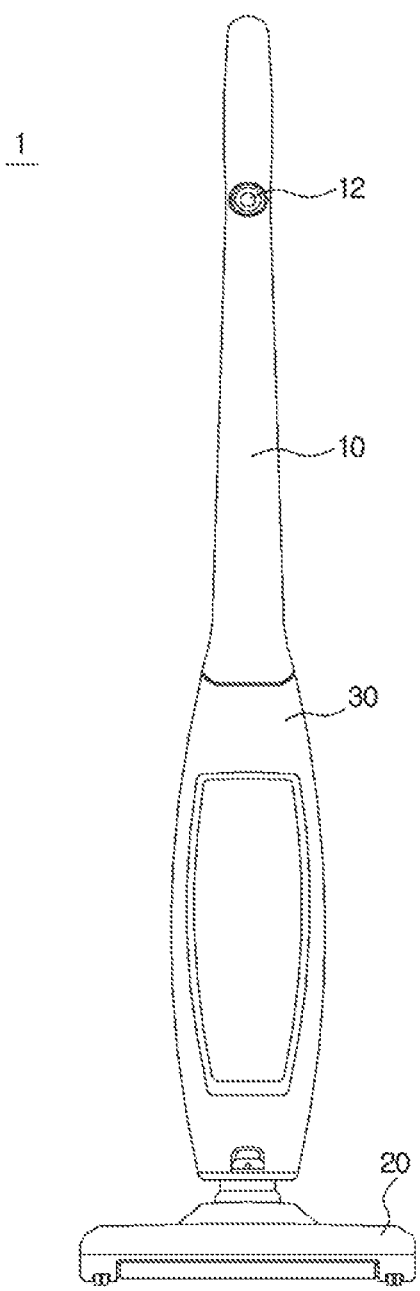

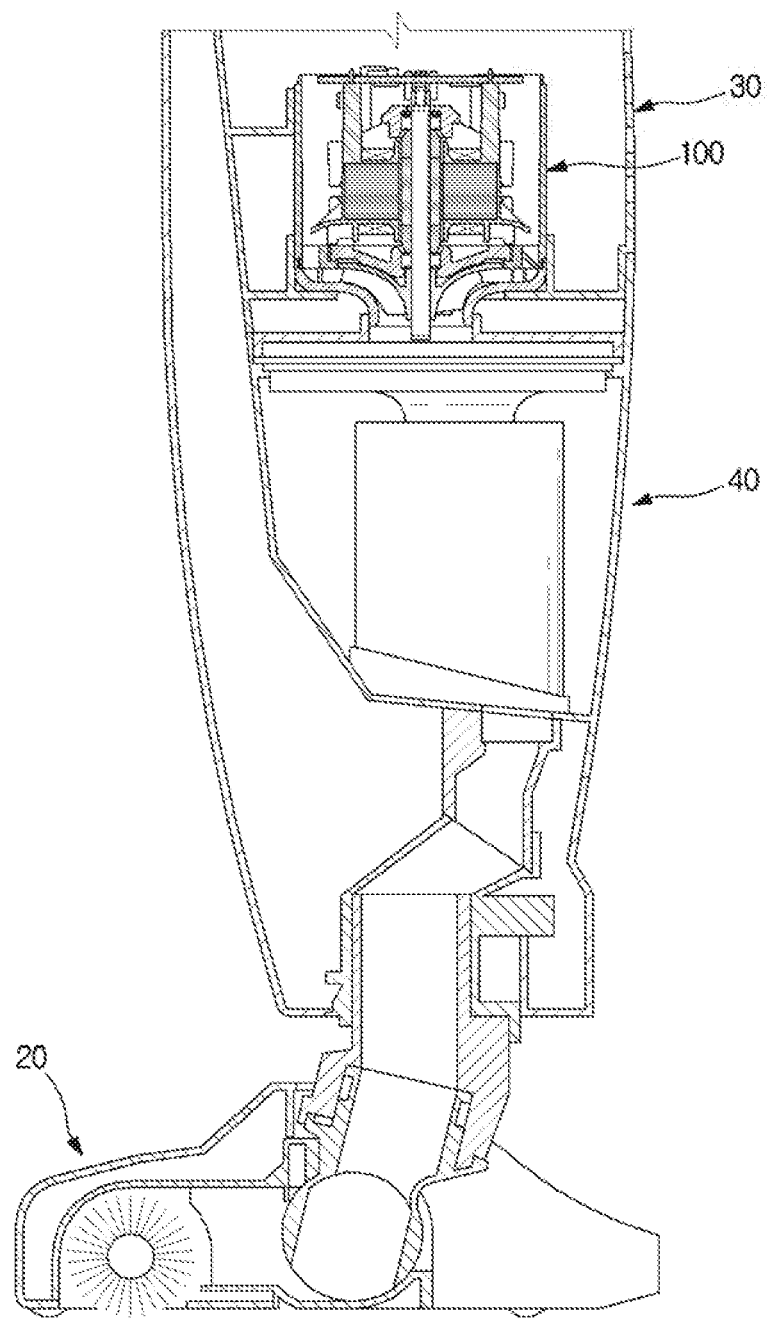
[Fig. 2]

[Fig. 3]
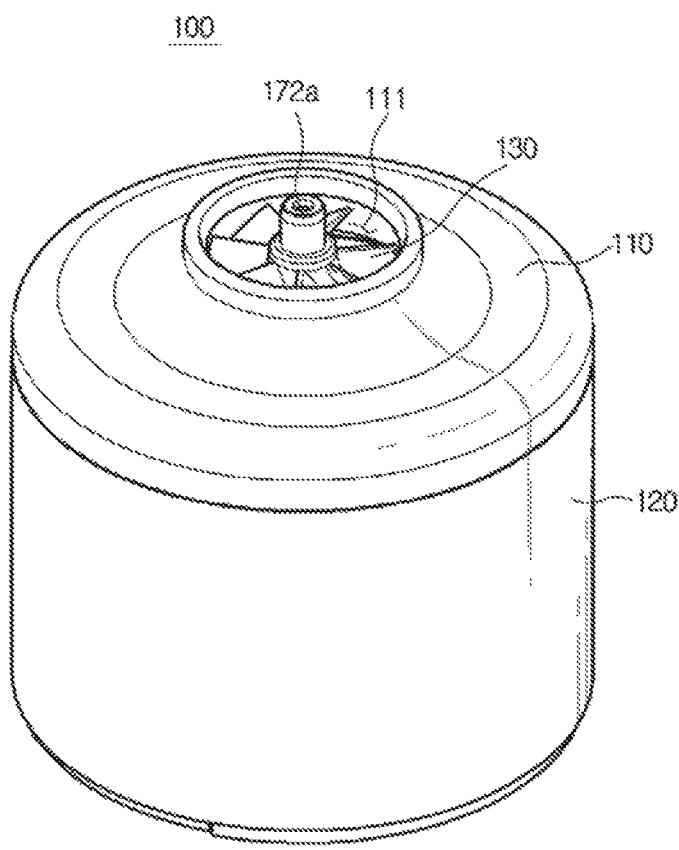

[Fig. 4]
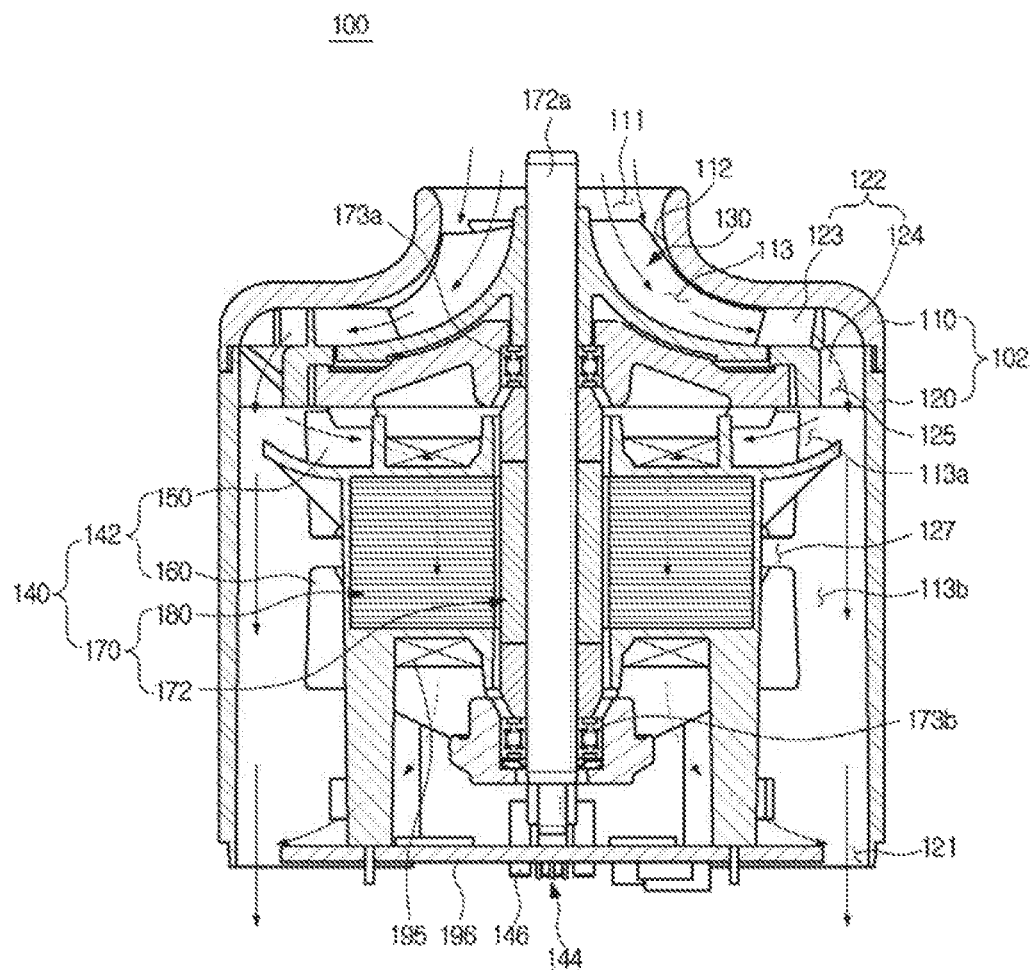

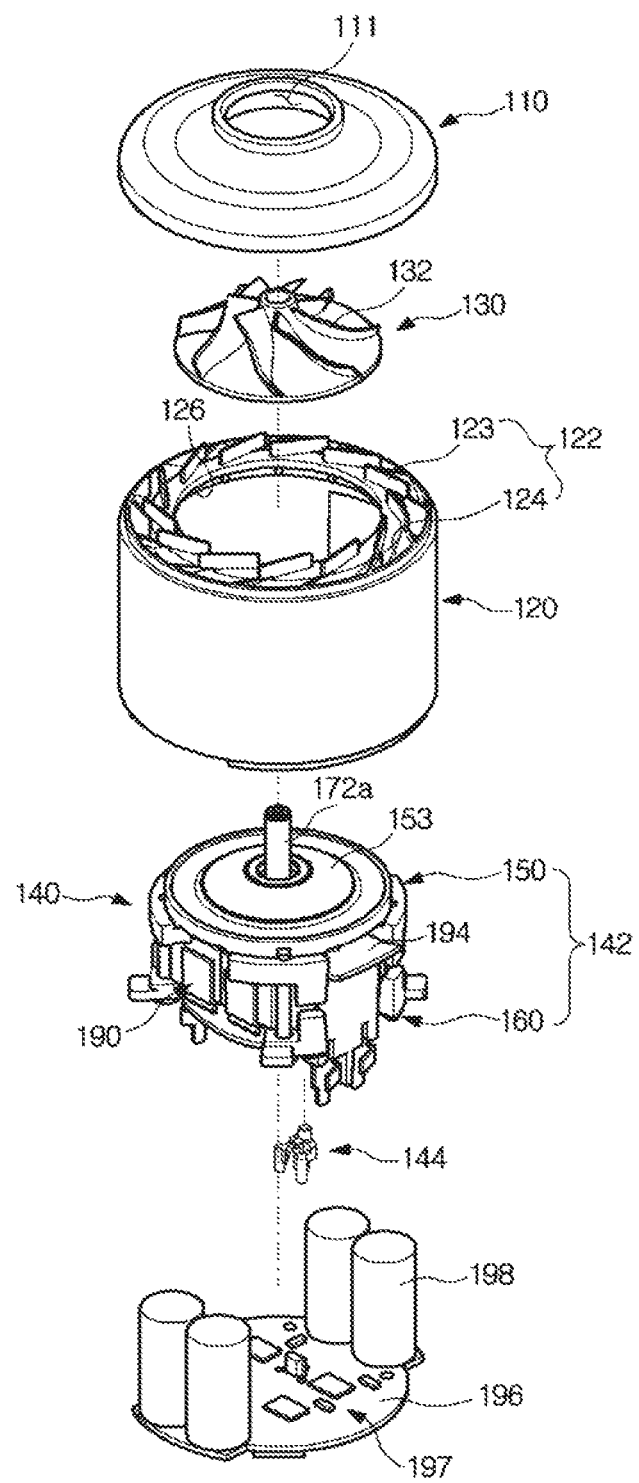

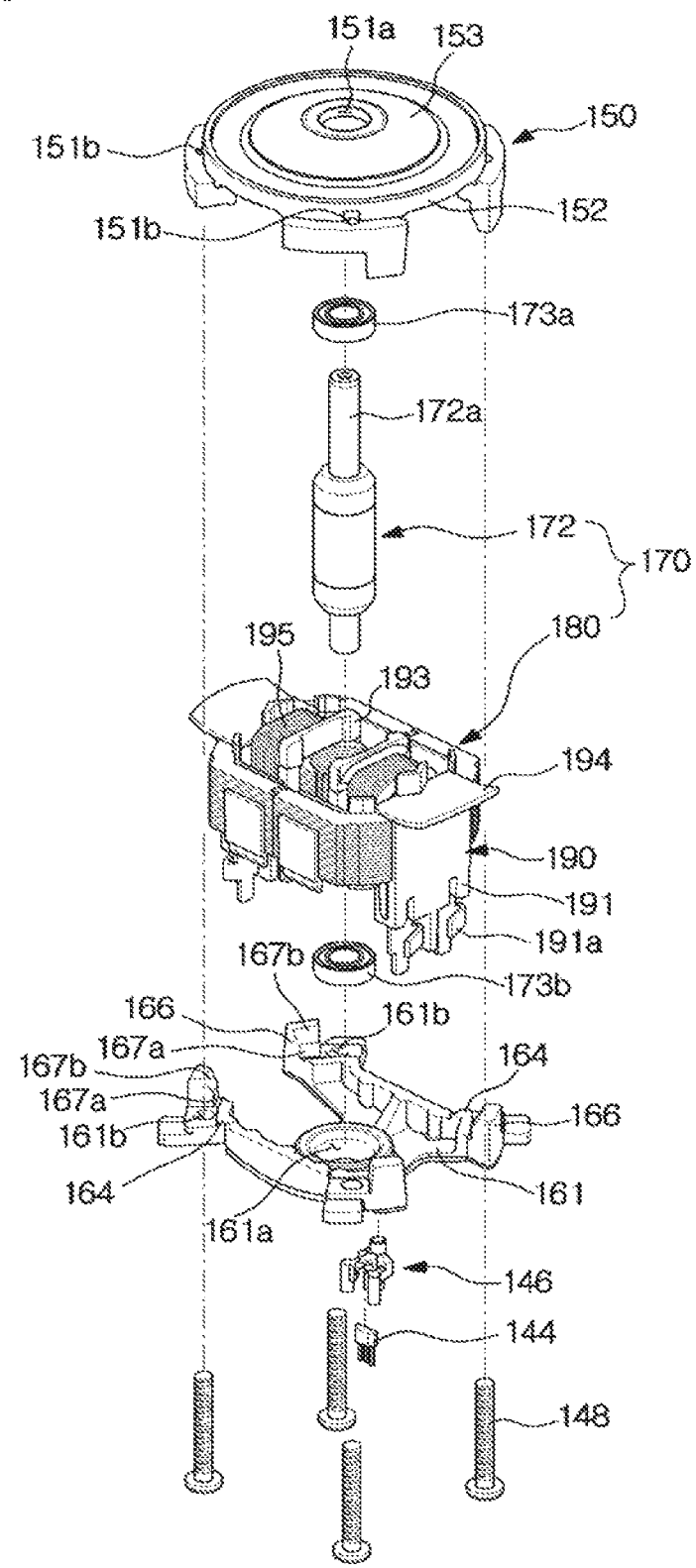
[Fig. 6a]

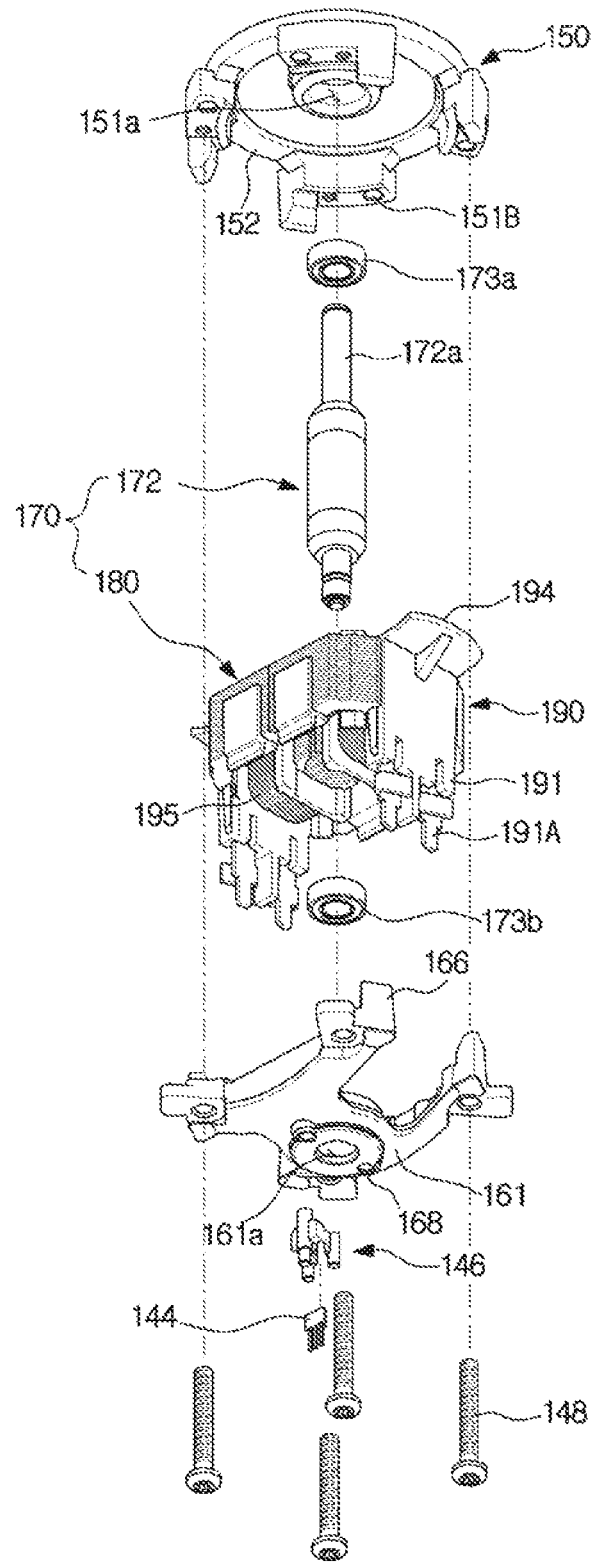
[Fig. 6b]

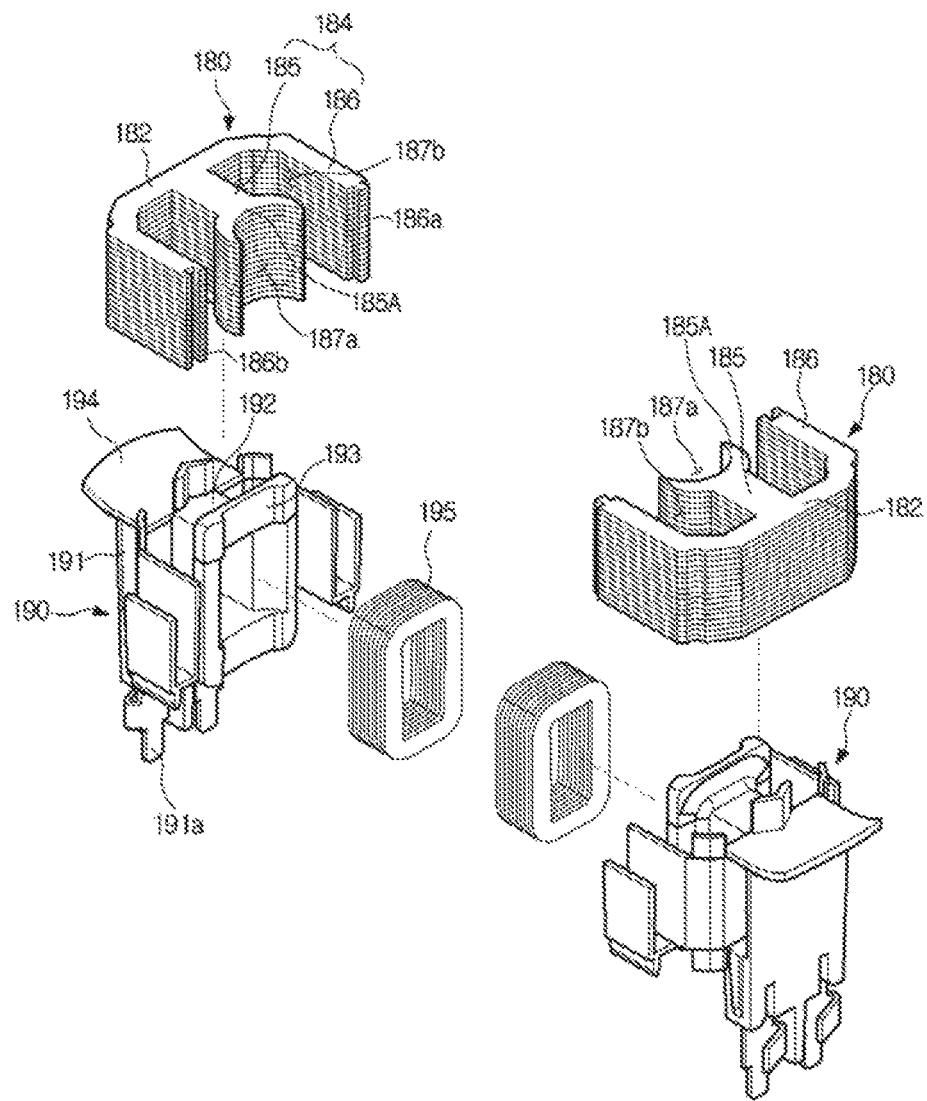
[Fig. 7]

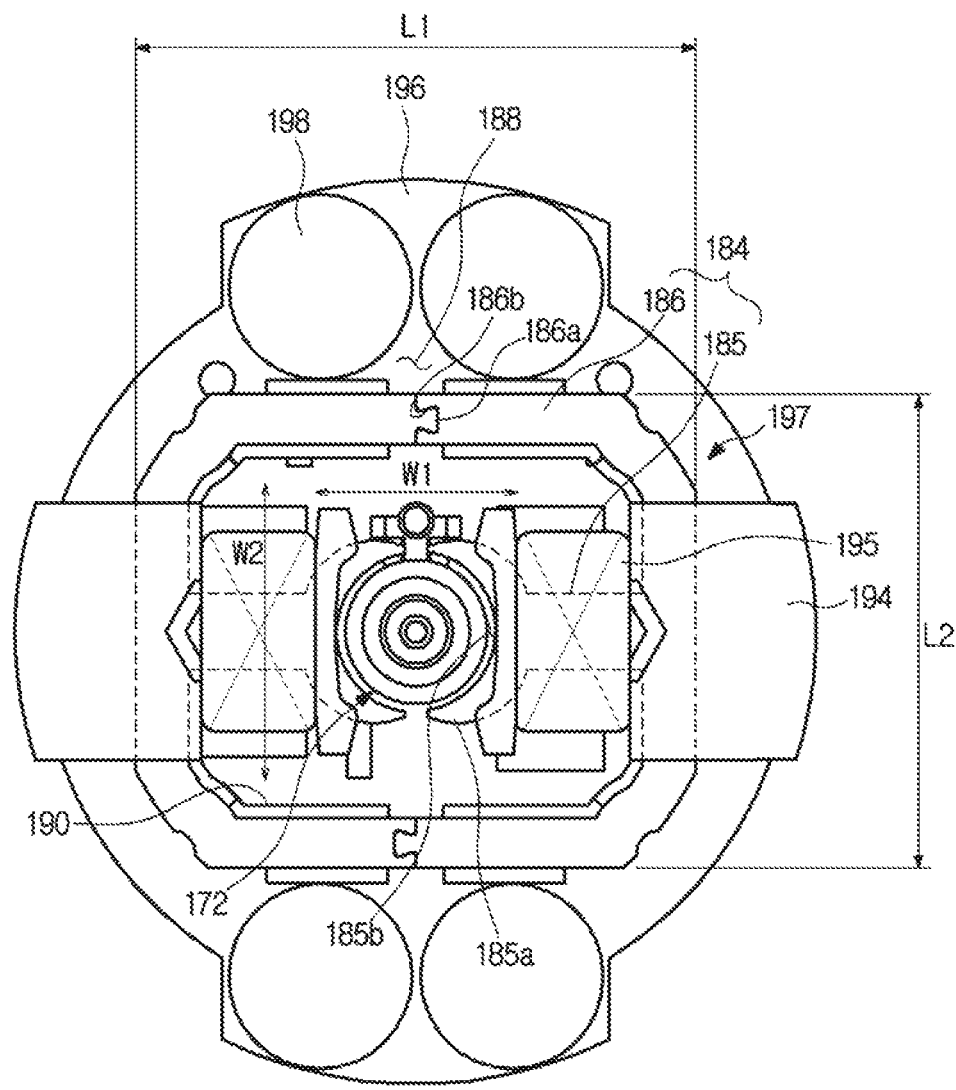
[Fig. 8]

[Fig. 9]
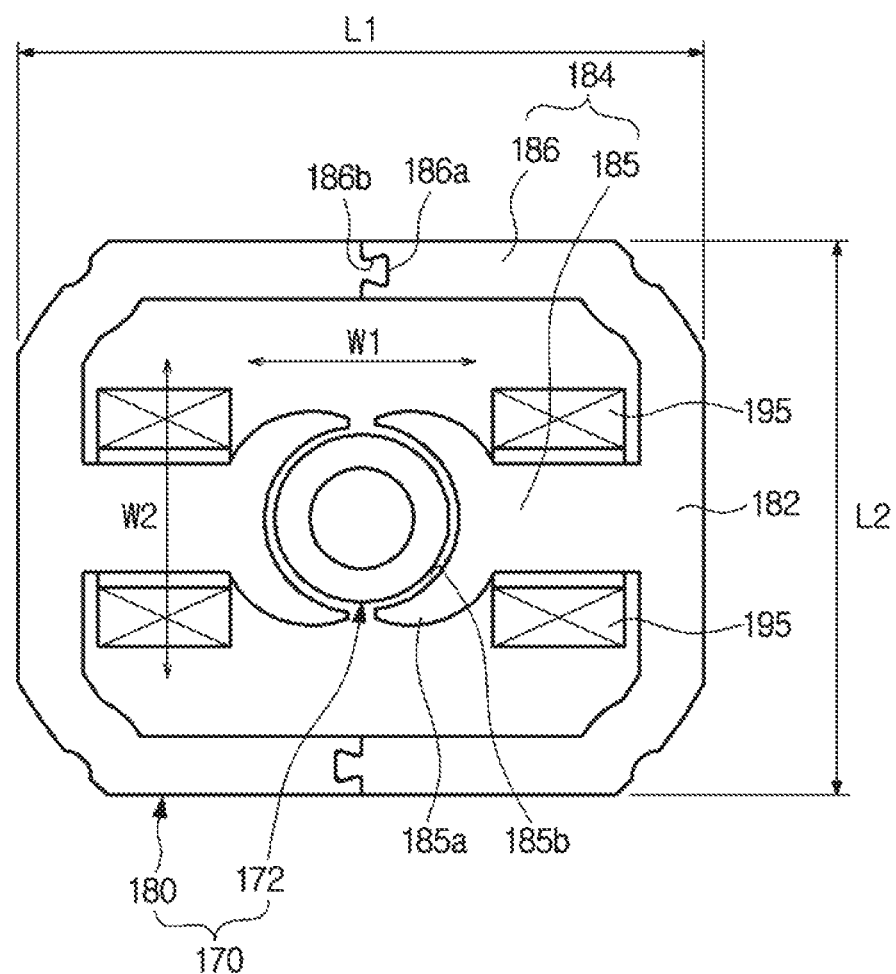

[Fig. 10]
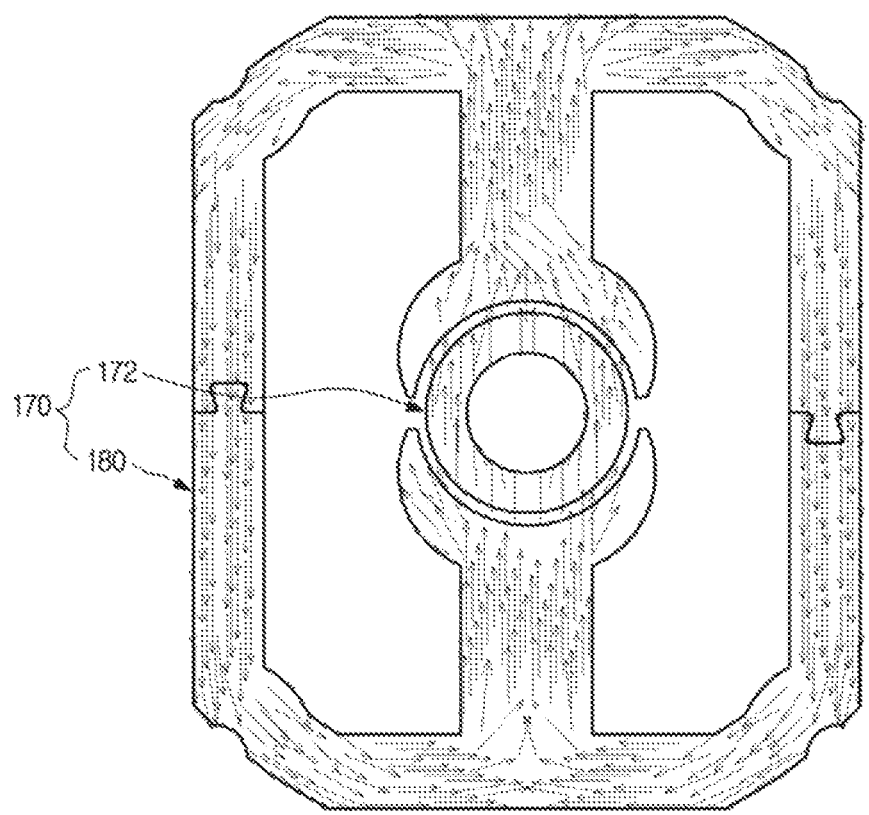

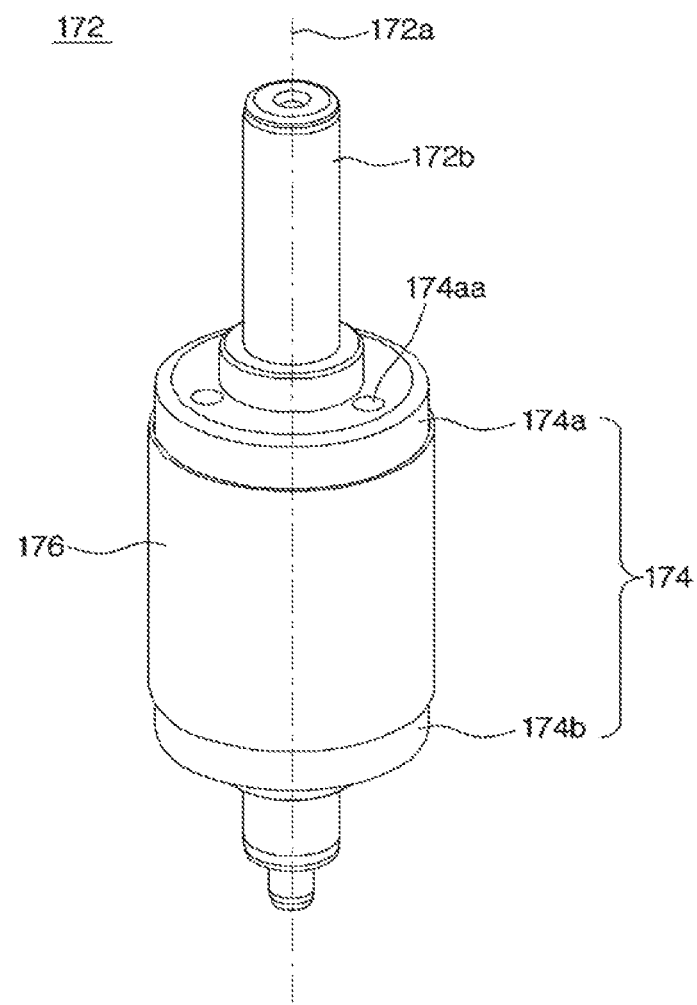
[Fig. 11]

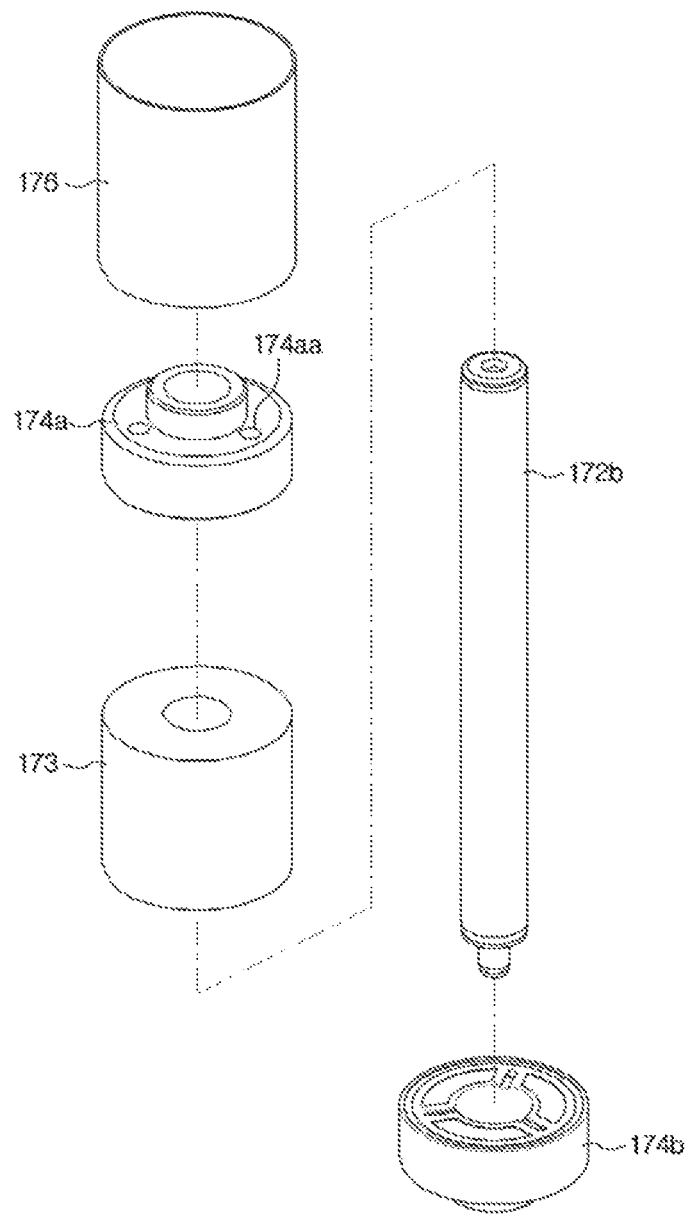
[Fig. 12]

[Fig. 13a]
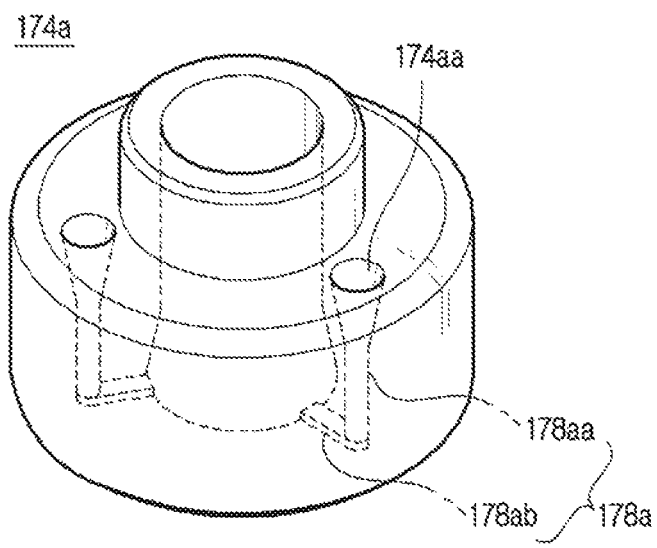
[Fig. 13b]
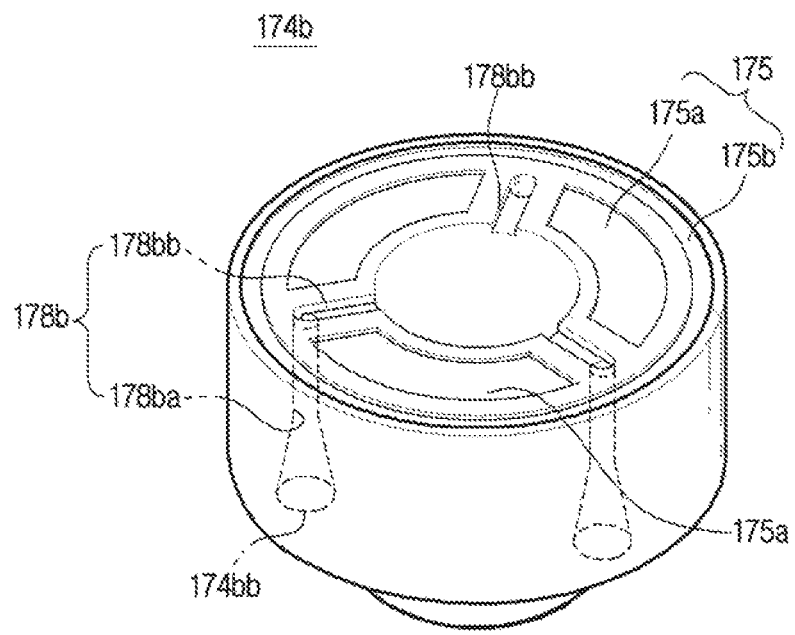

[Fig. 14]
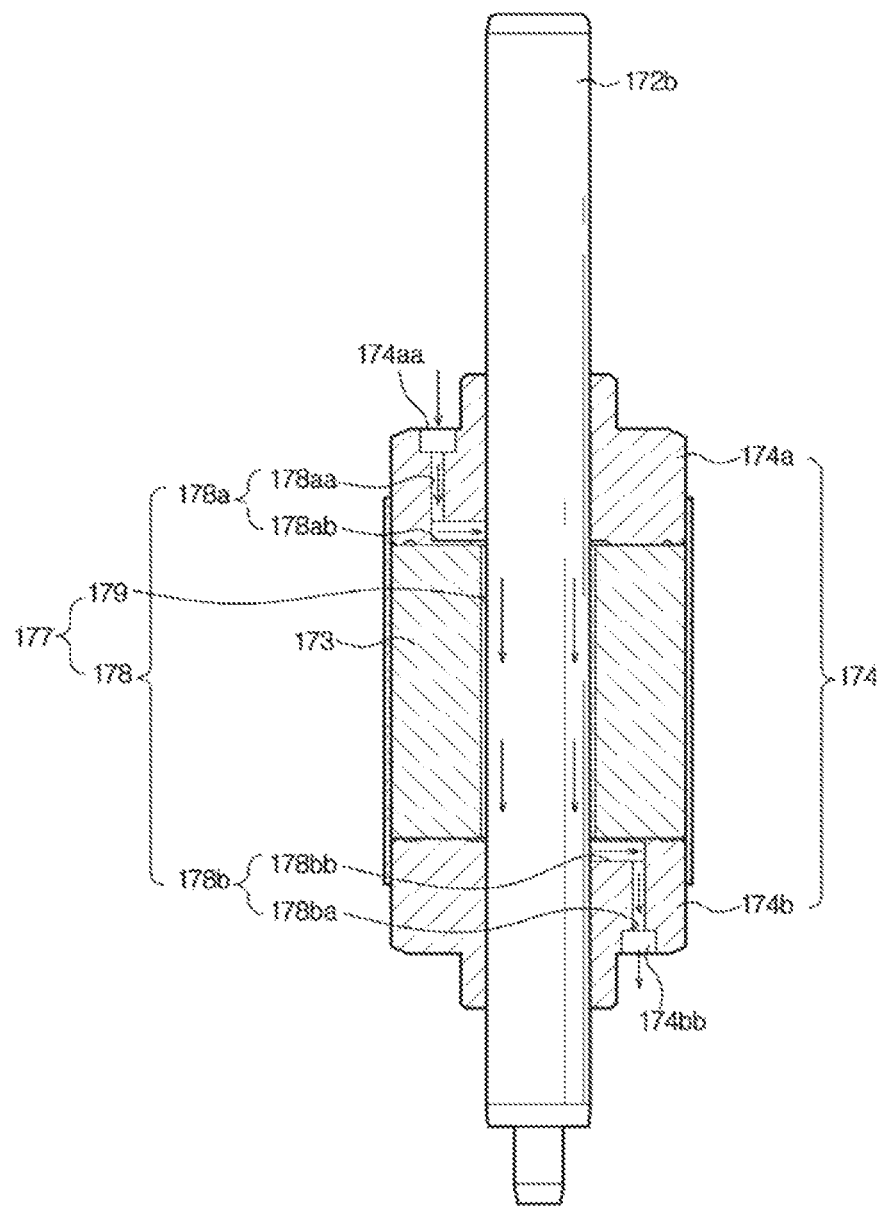

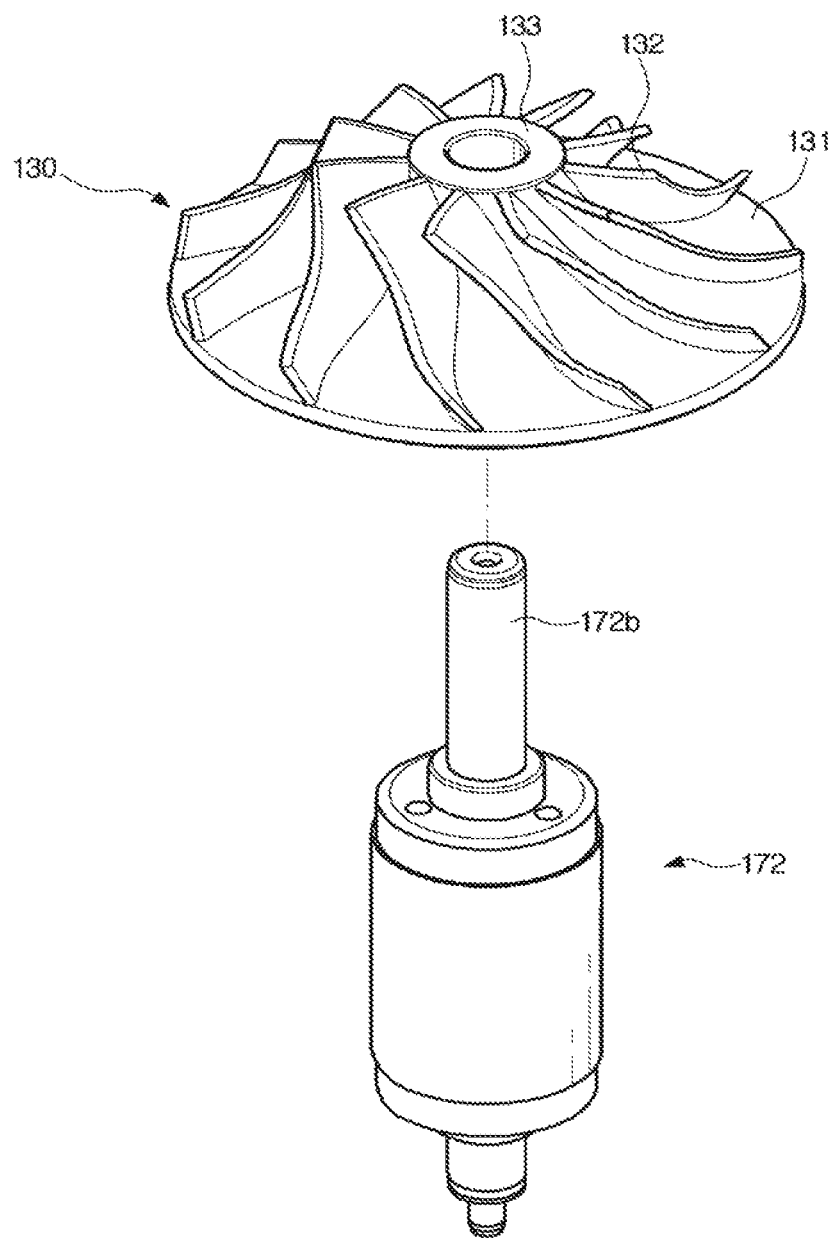
[Fig. 15]

[Fig. 16]
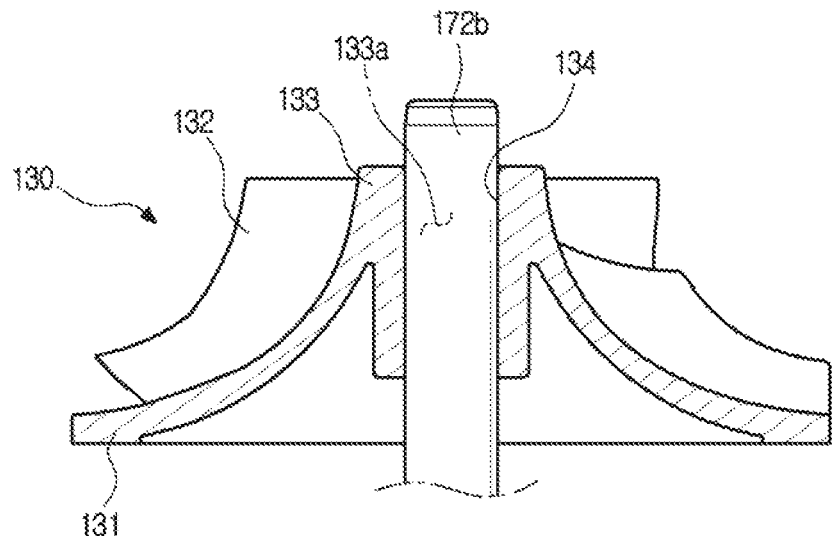
[Fig. 17]
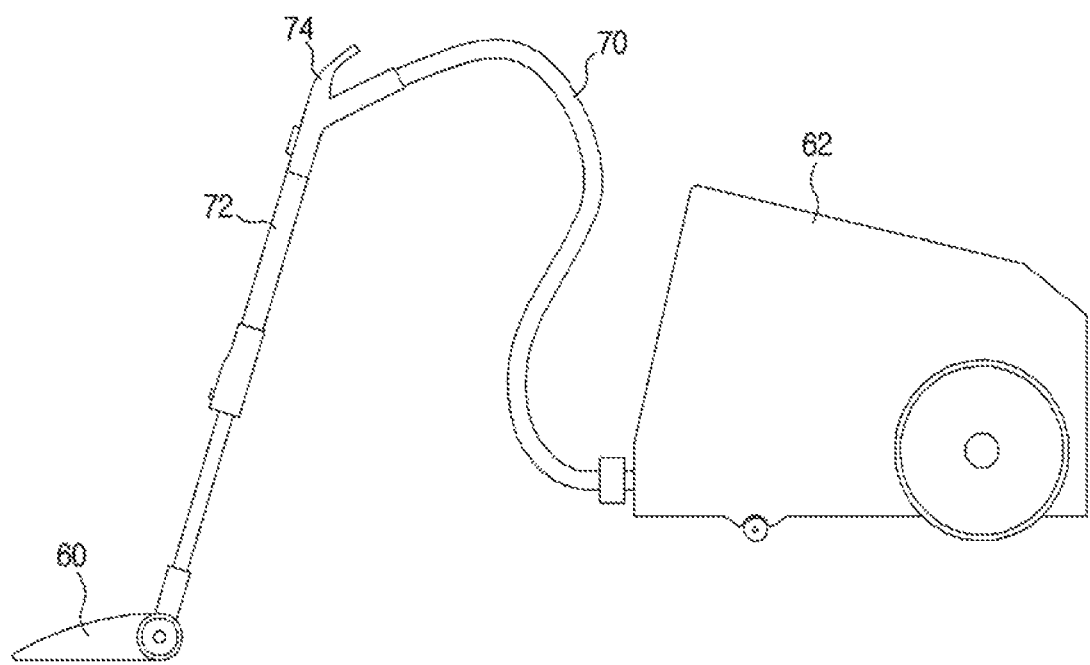

[Fig. 18]
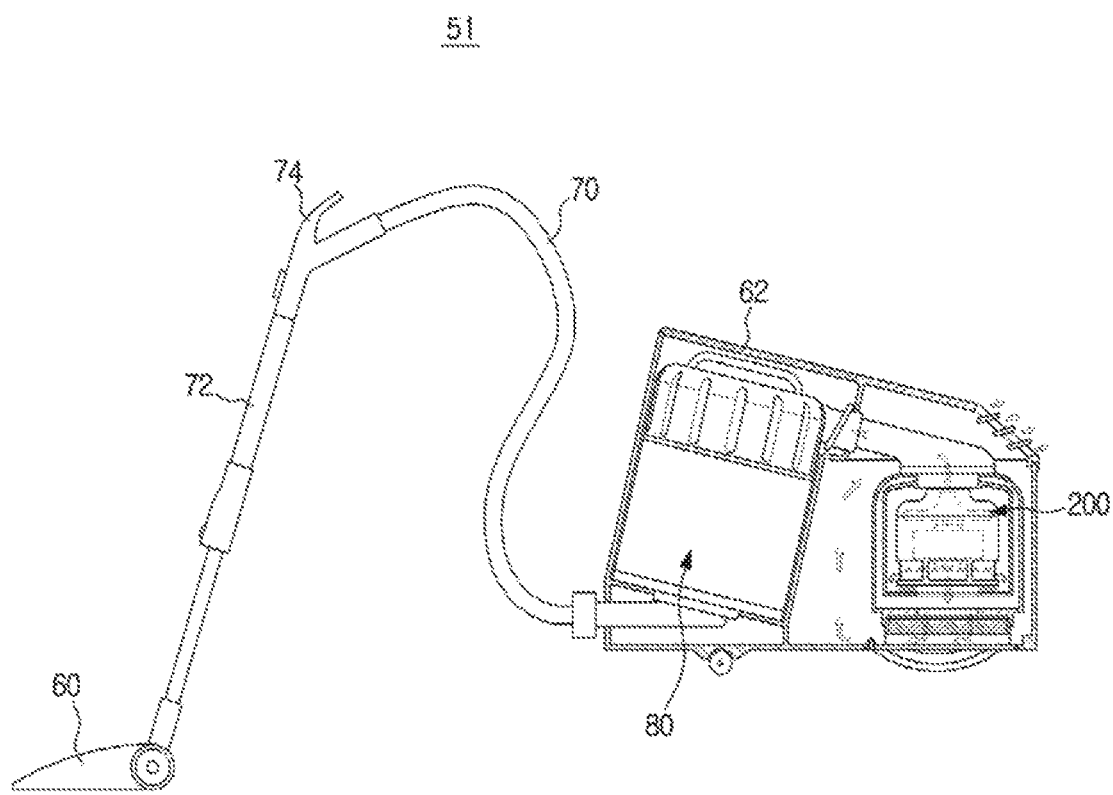

[Fig. 19]
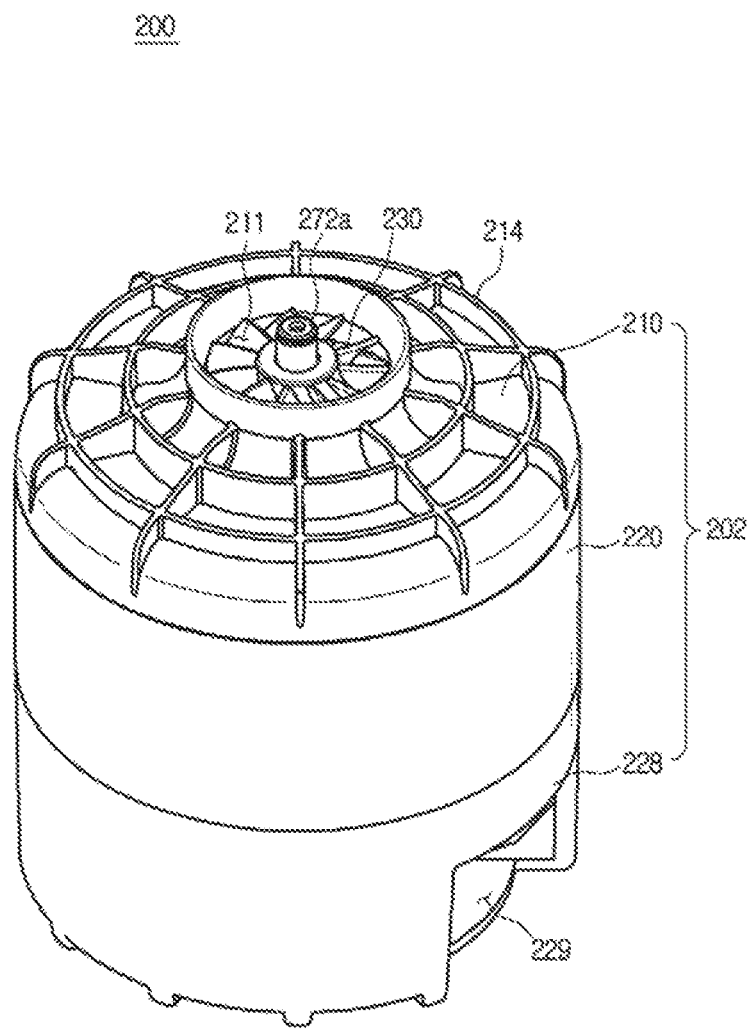

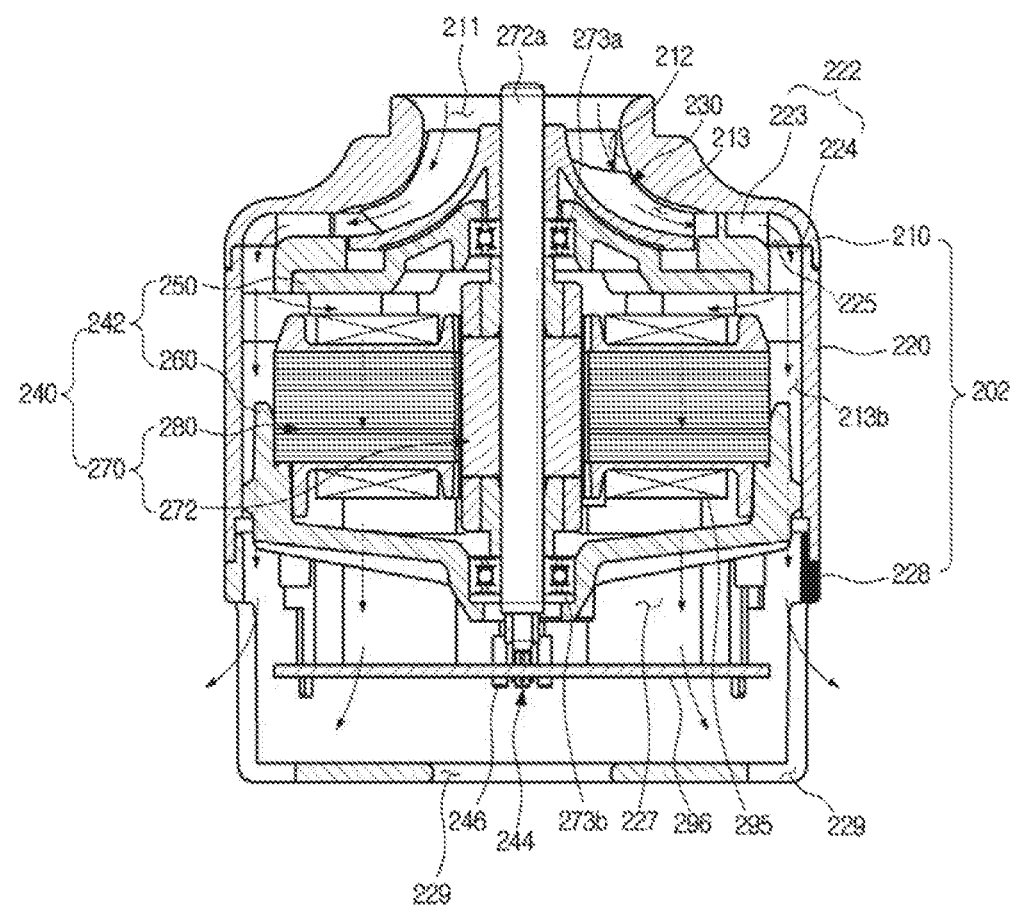
[Fig. 20]

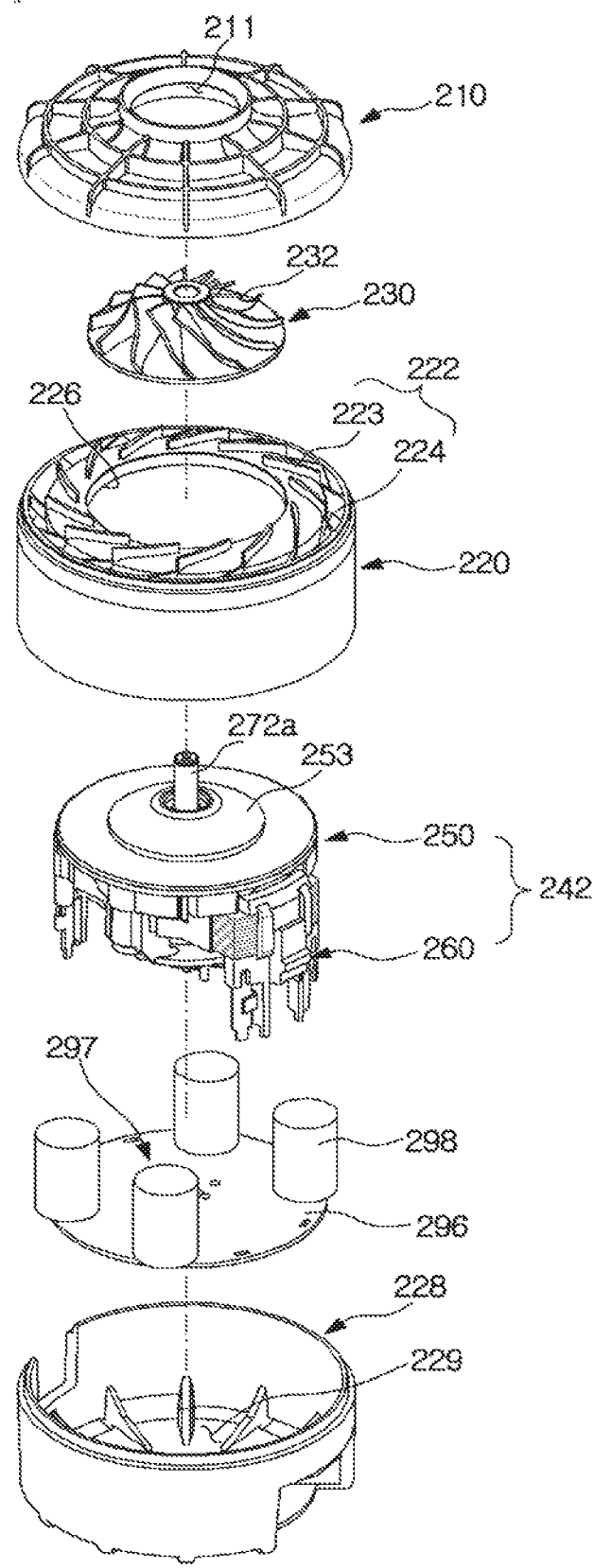
[Fig. 21]

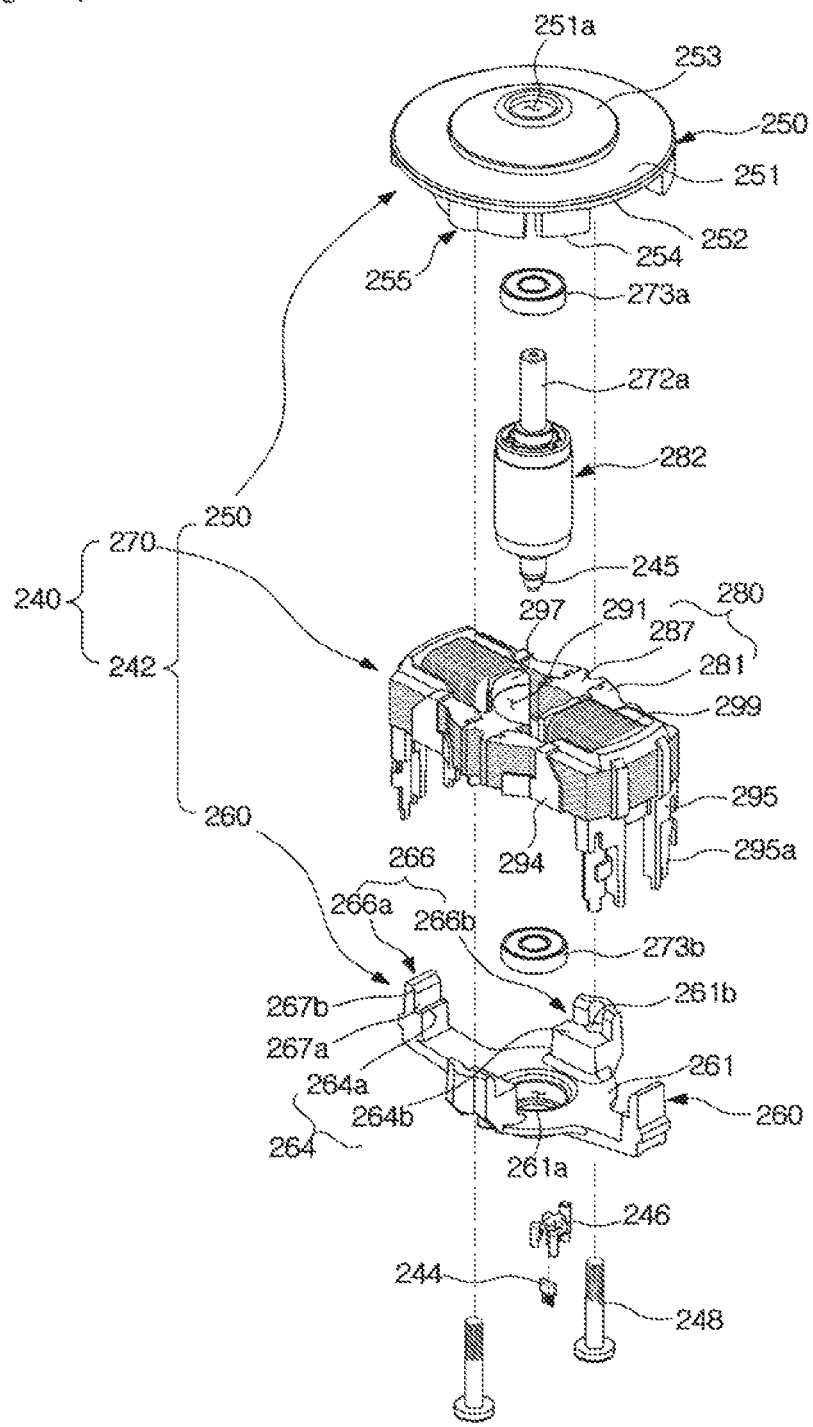
[Fig. 22a]

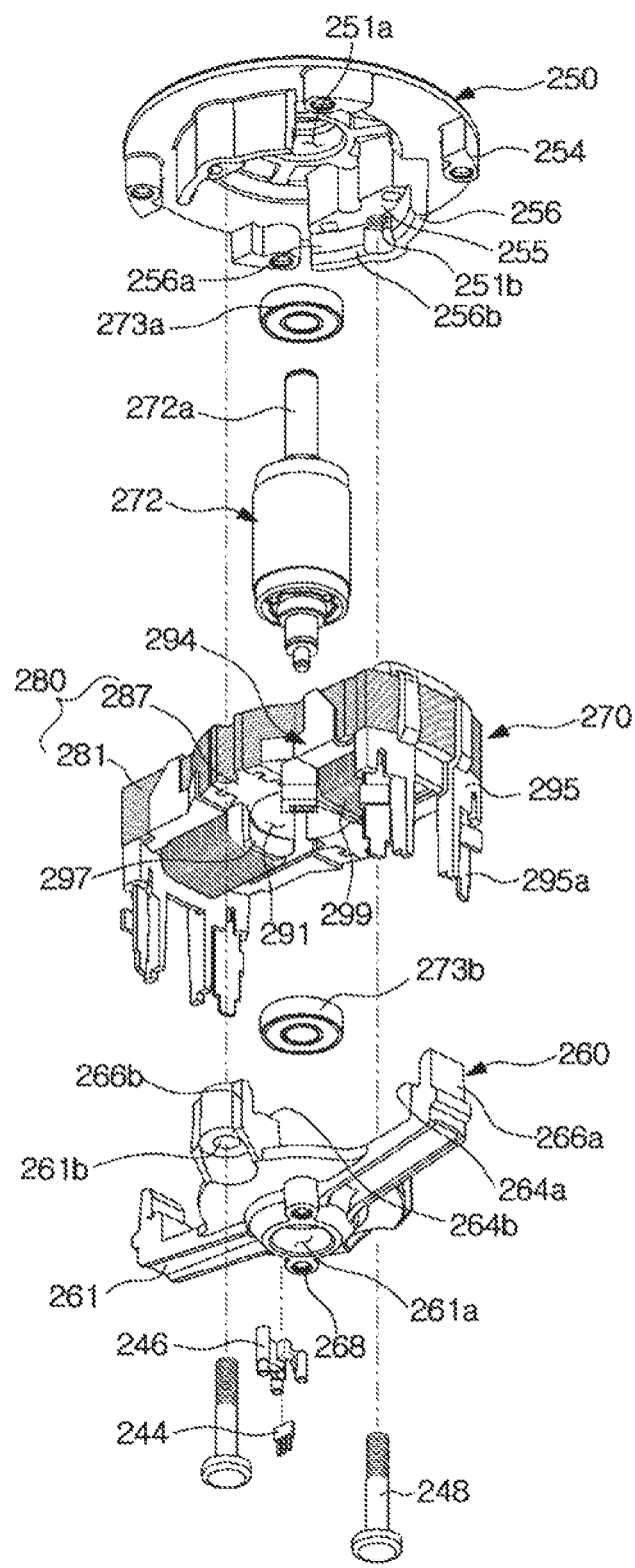
[Fig. 22b]

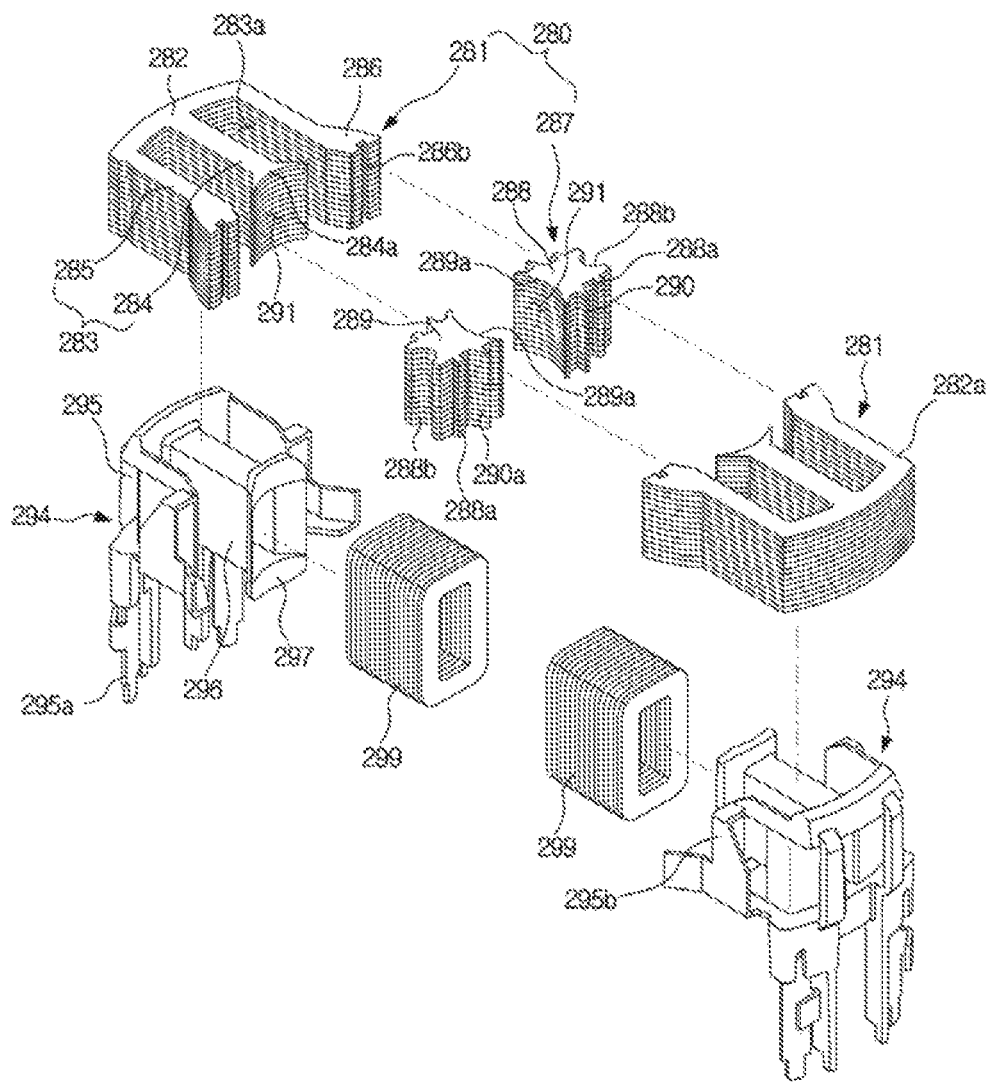
[Fig. 23]

[Fig. 24]
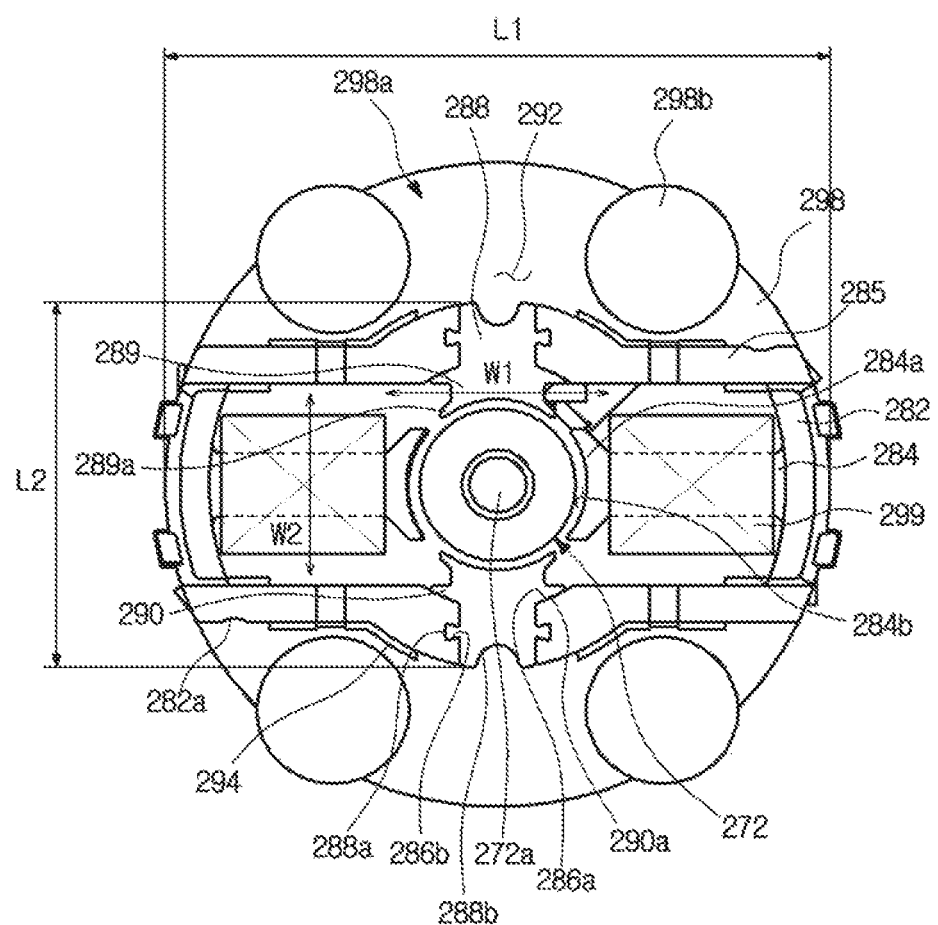

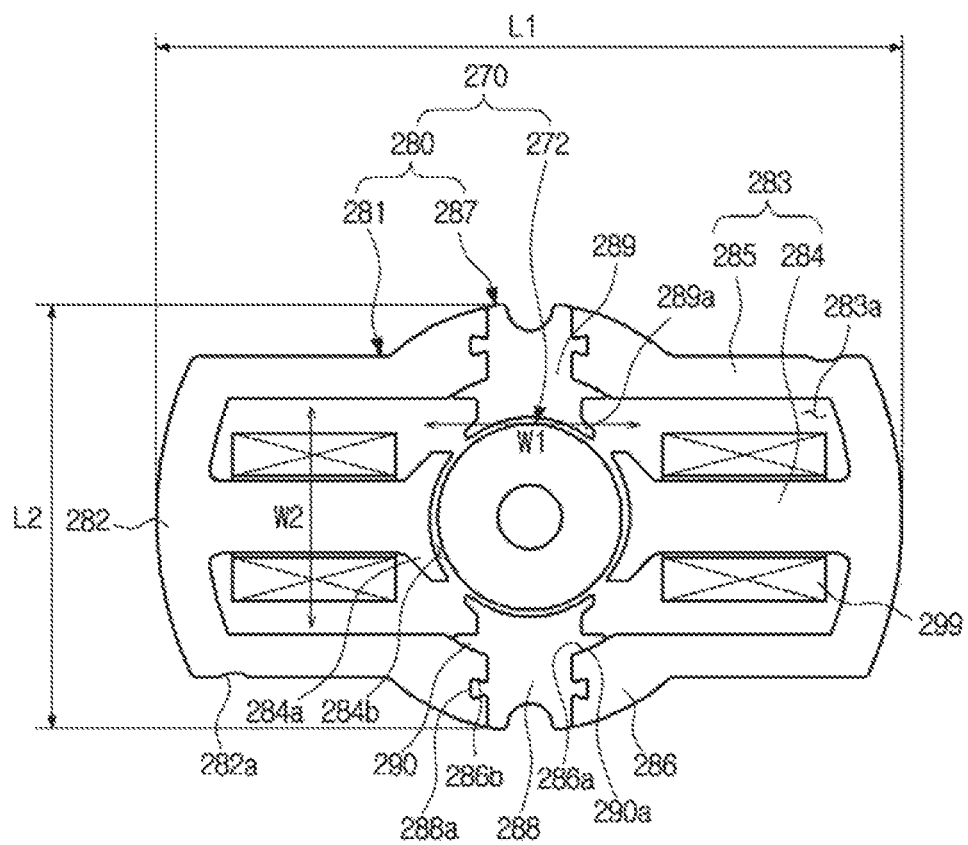
[Fig. 25]

[Fig. 26]
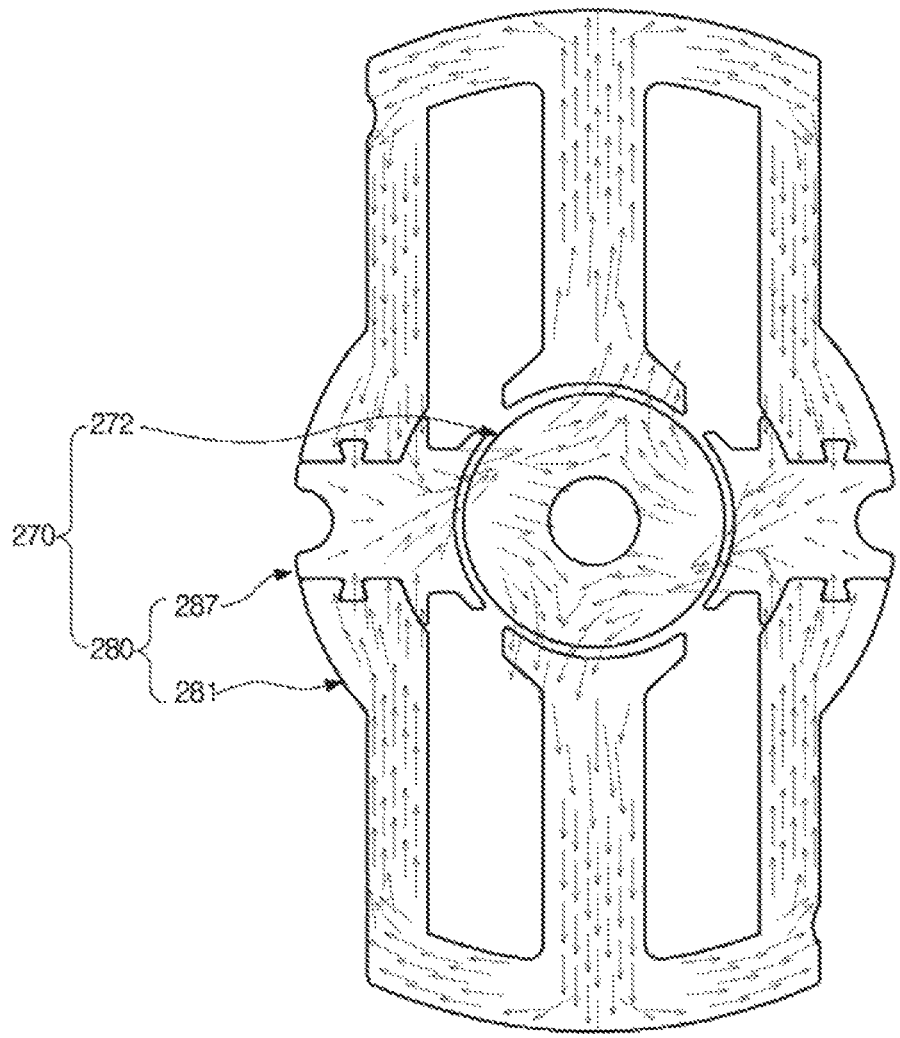

[Fig. 27]
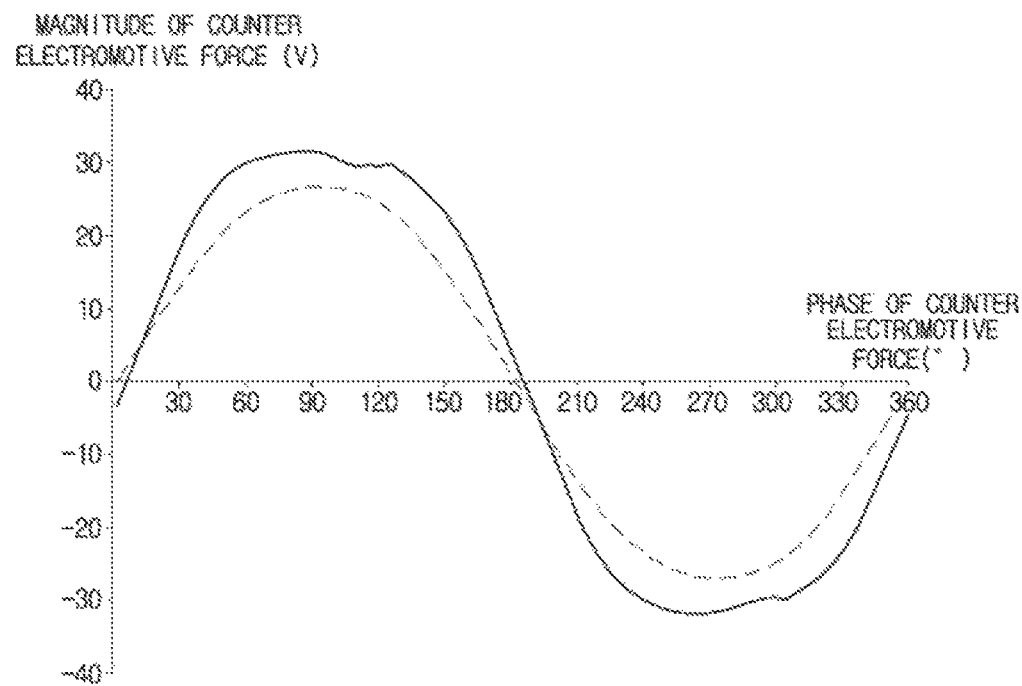
[Fig. 28]
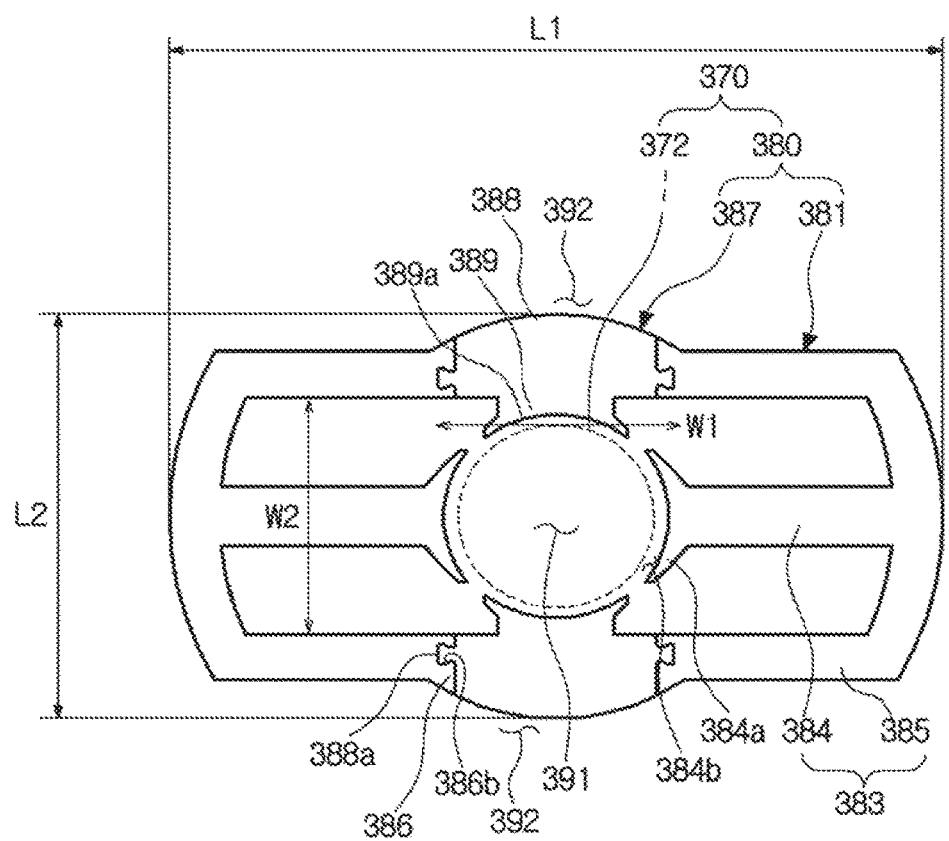

[Fig. 29]
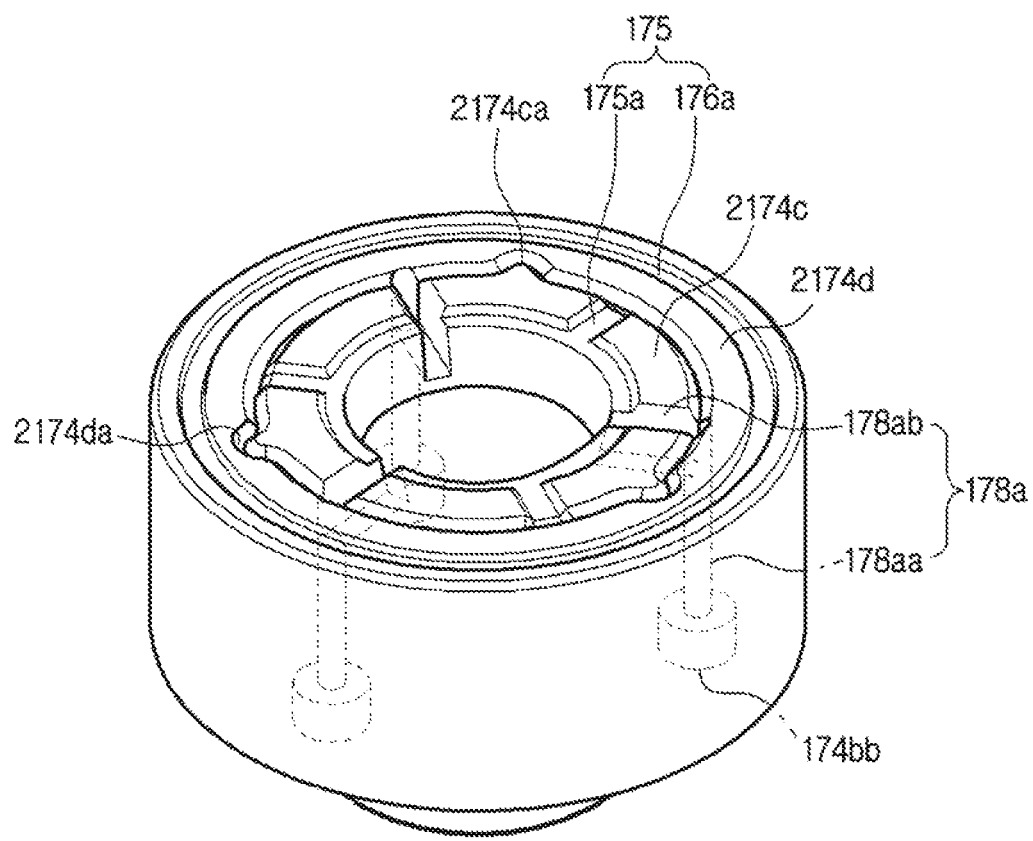

[Fig. 30]
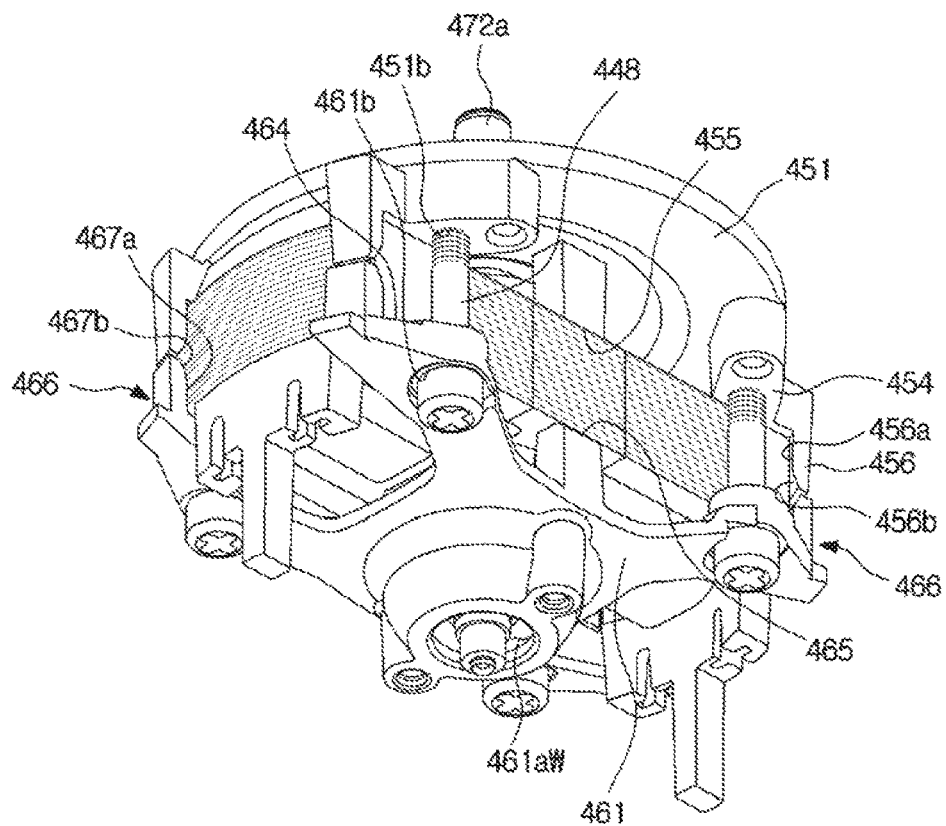
[Fig. 31]
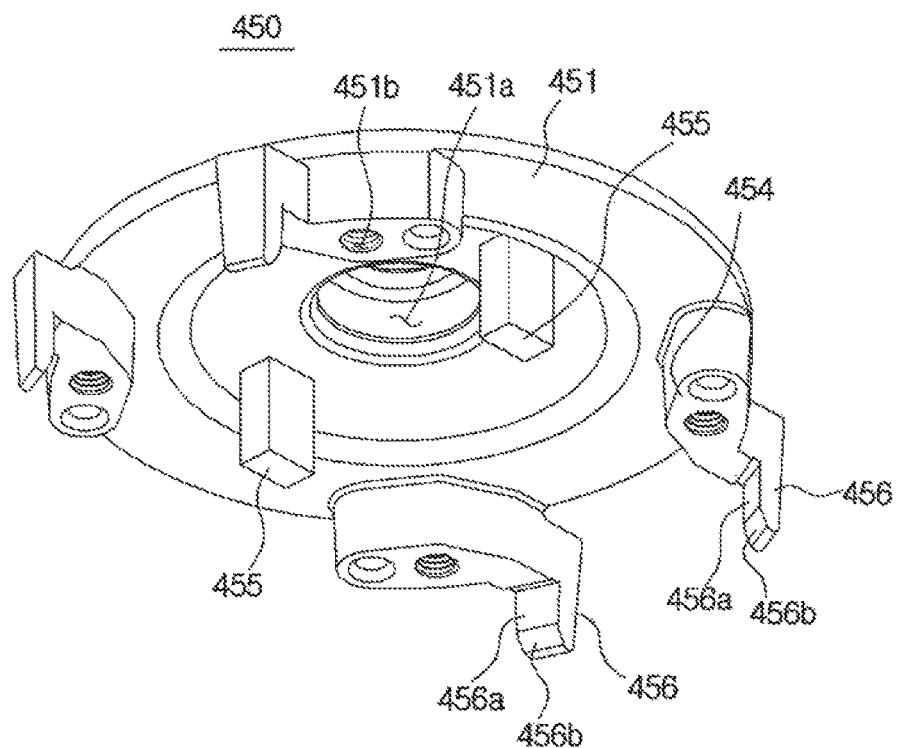

[Fig. 32]
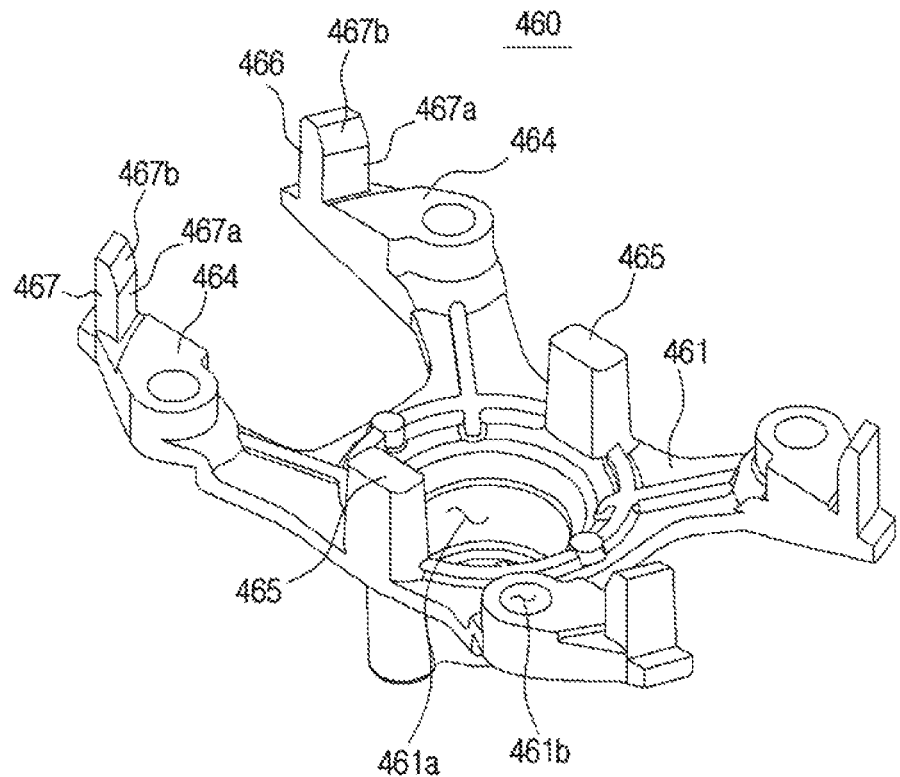
[Fig. 33]
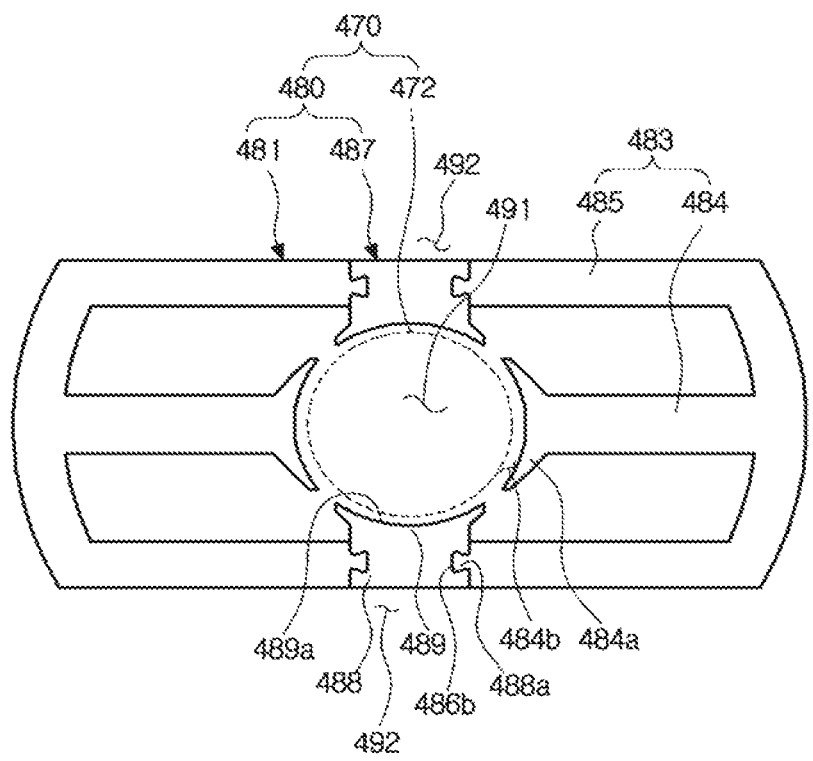

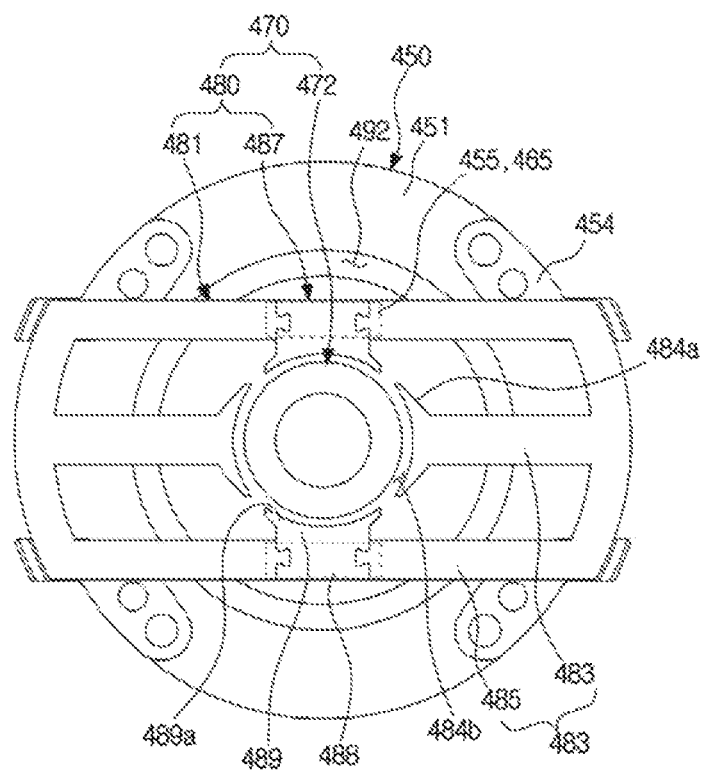
[Fig. 34]

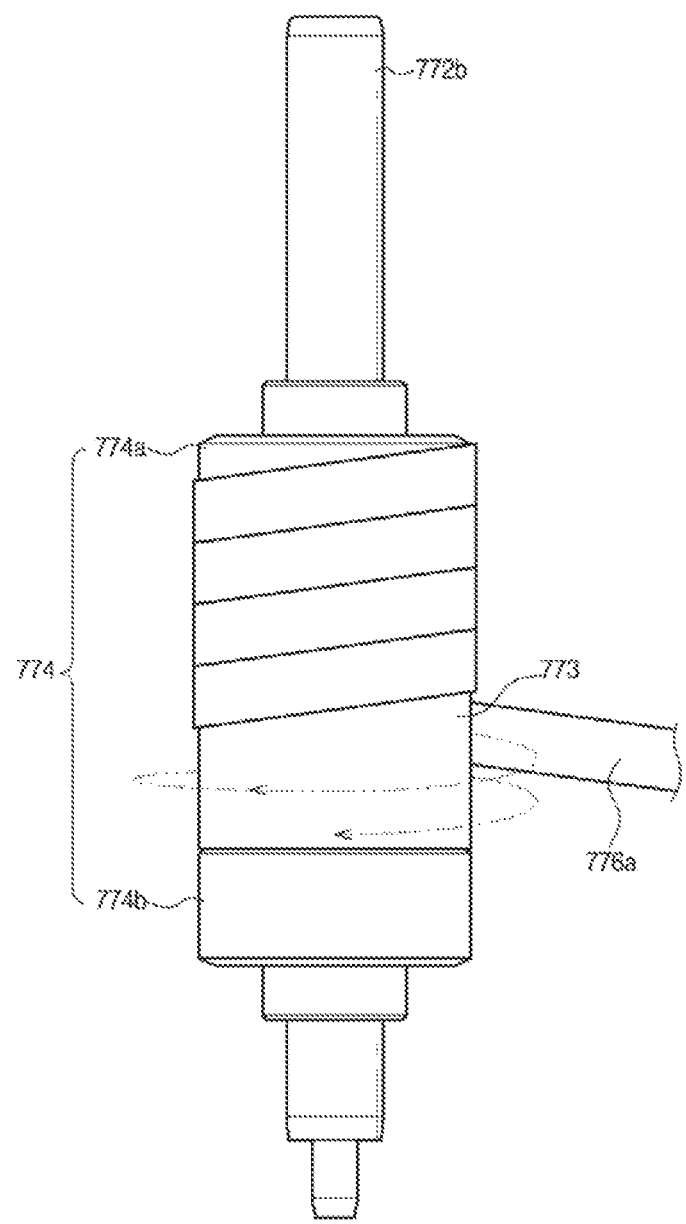
[Fig. 35]

[Fig. 36]
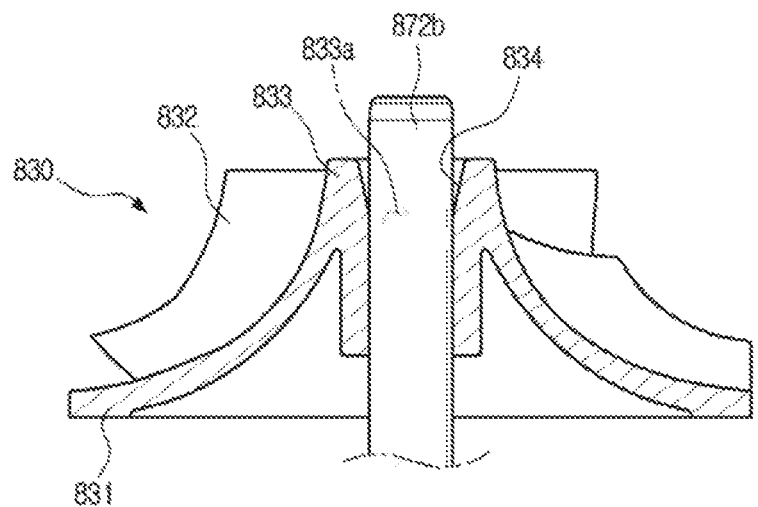
[Fig. 37]
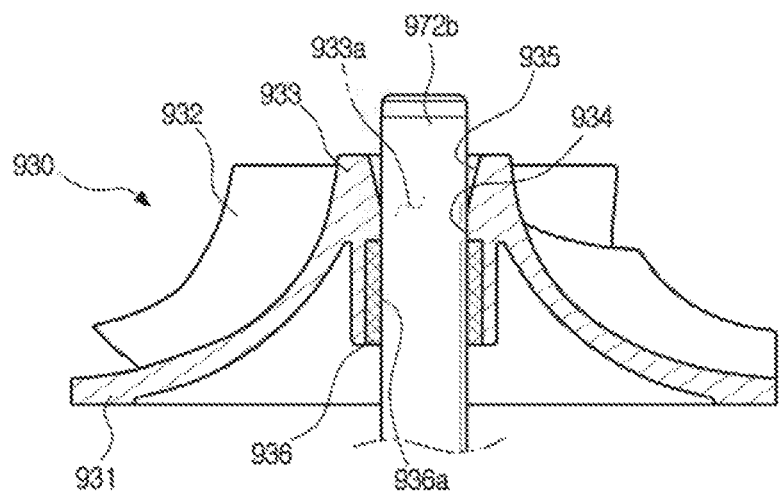

[Fig. 38]
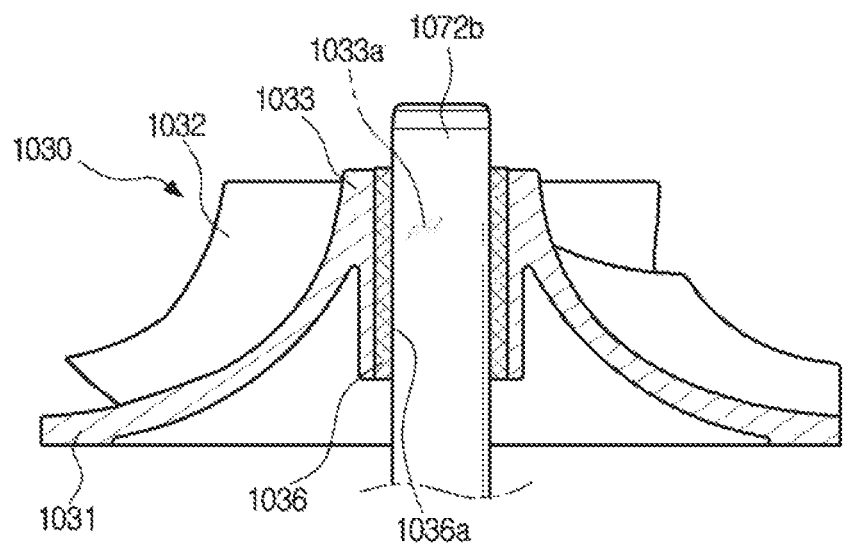
[Fig. 39]
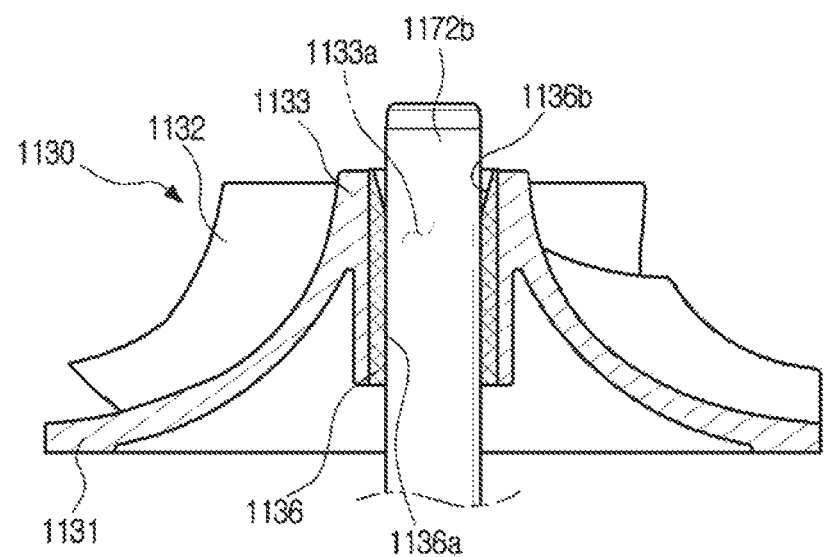

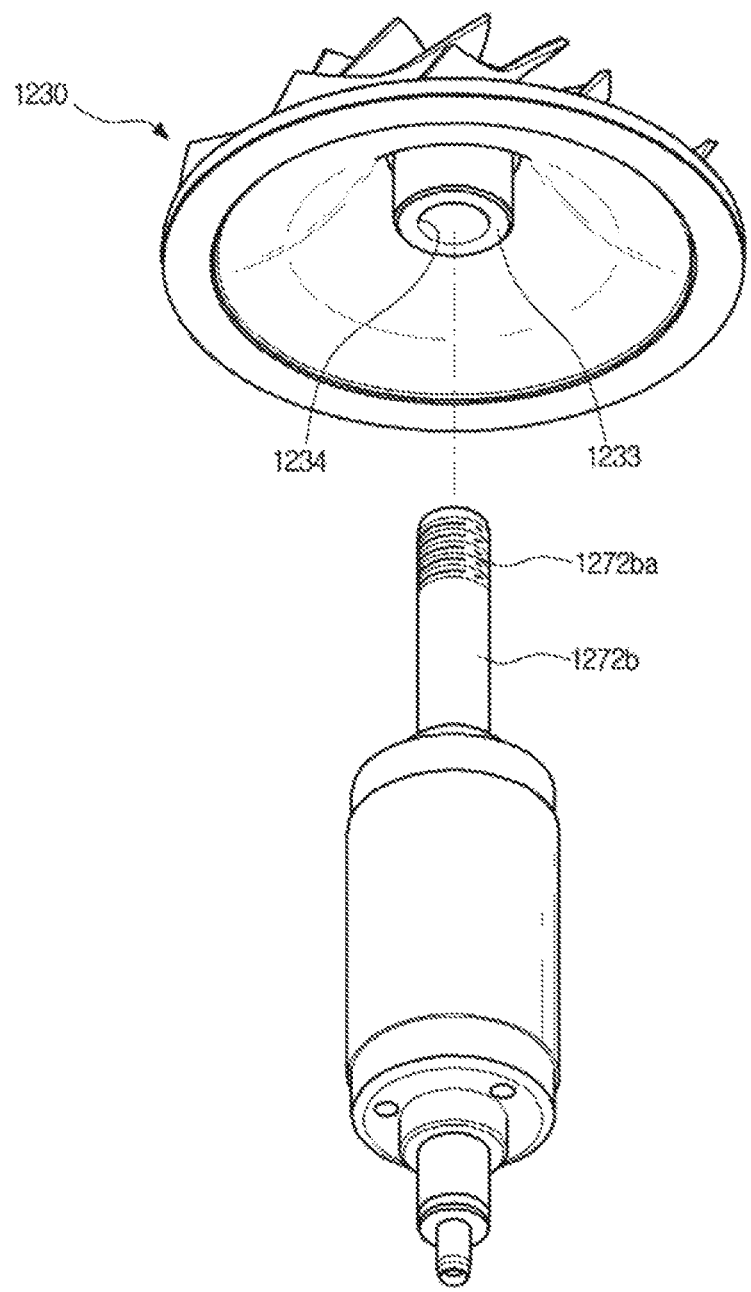
[Fig. 40]

[Fig. 41a]
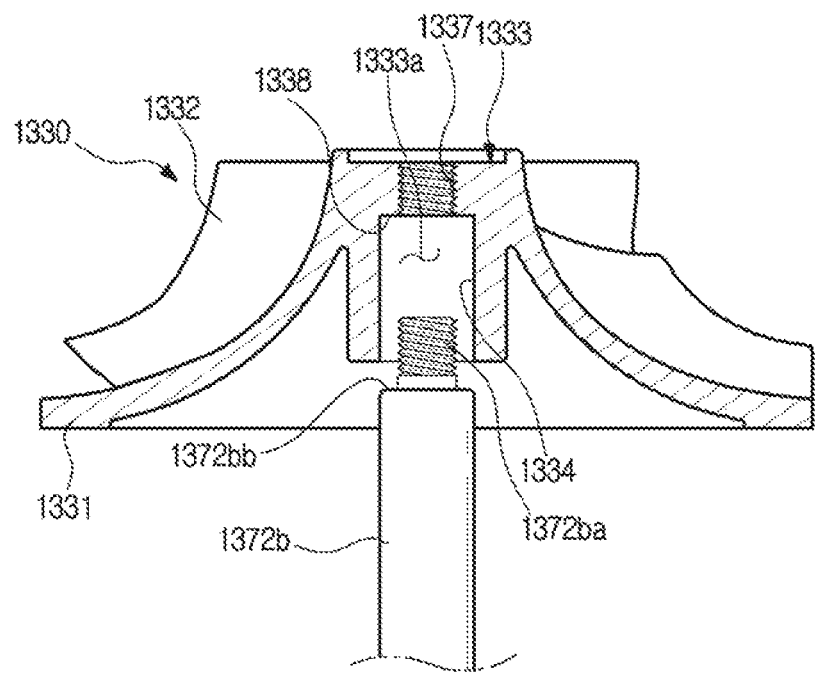
[Fig. 41b]
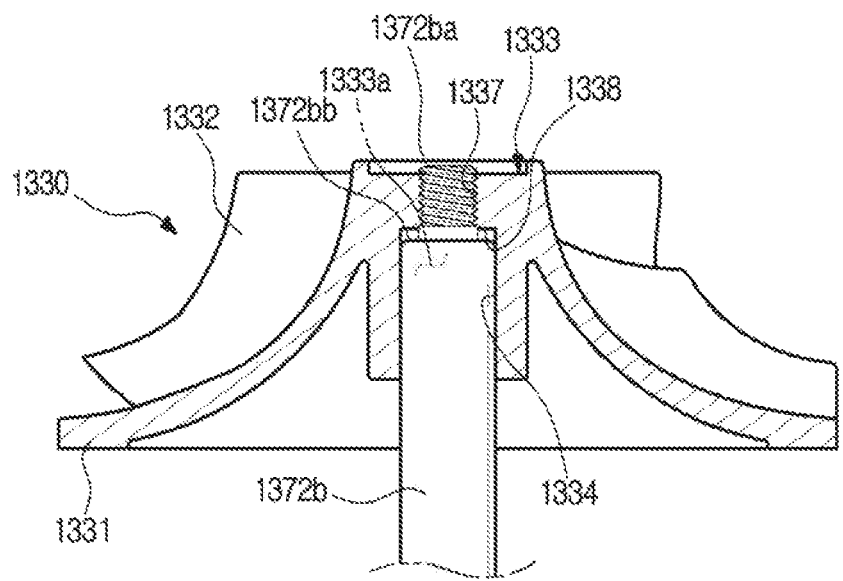

[Fig. 42]
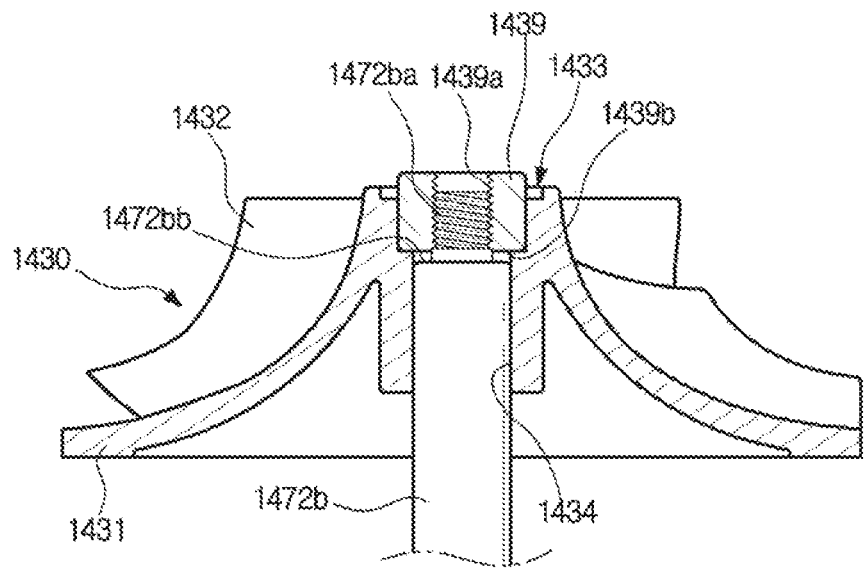
[Fig. 43a]
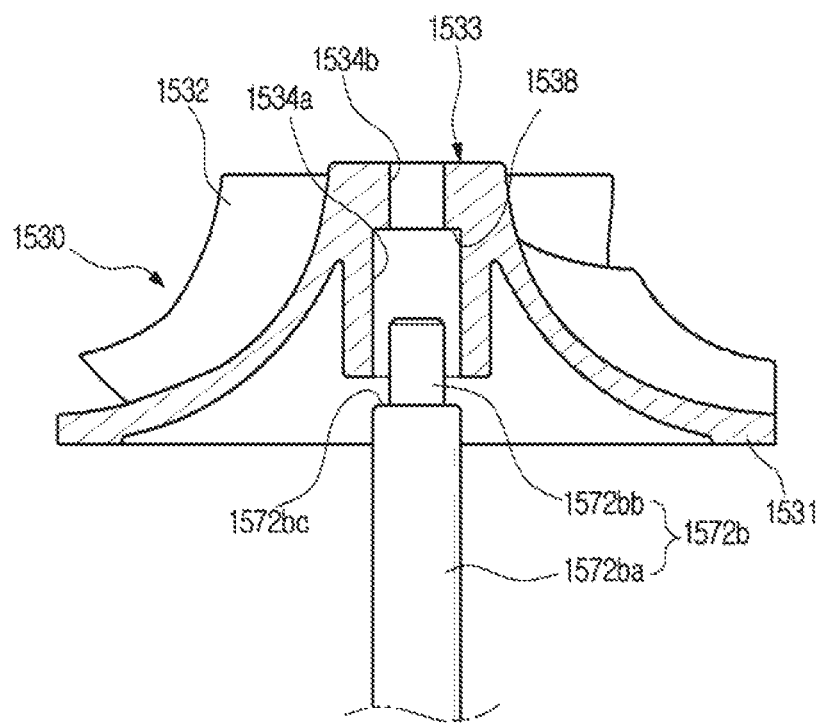

[Fig. 43b]
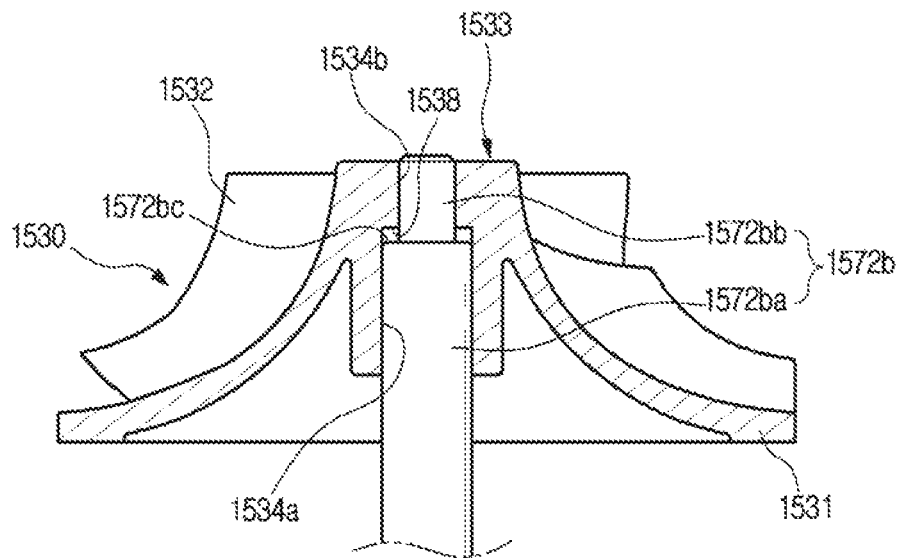
[Fig. 44a]
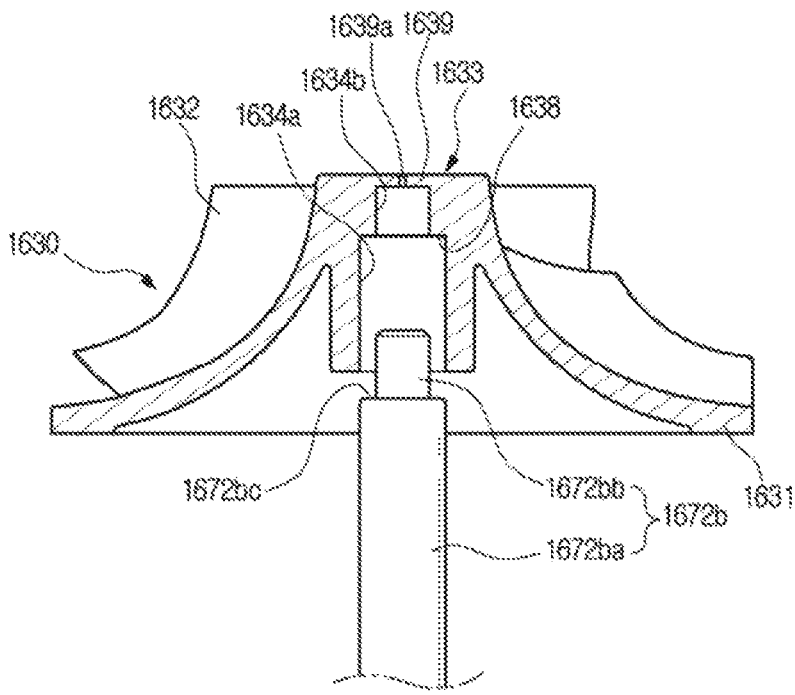

[Fig. 44b]
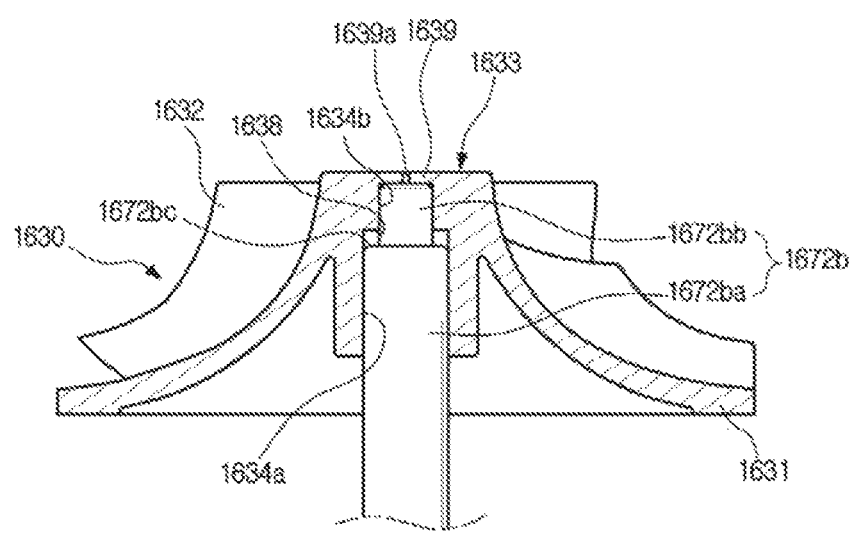
[Fig. 45]
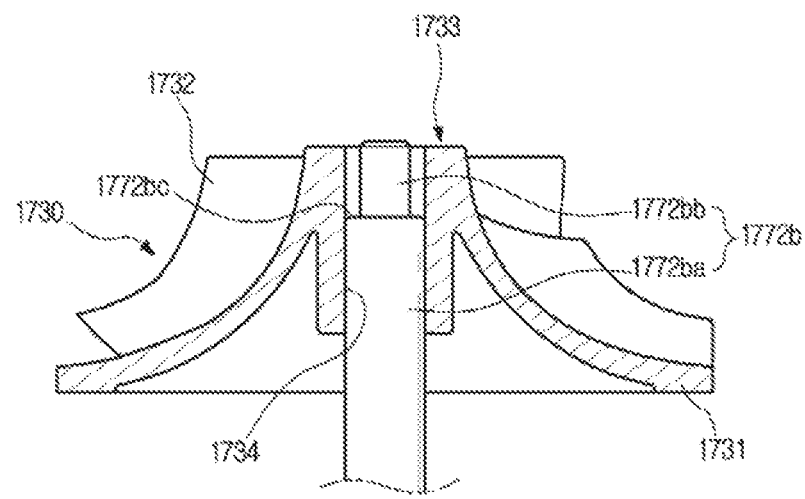

[Fig. 46]
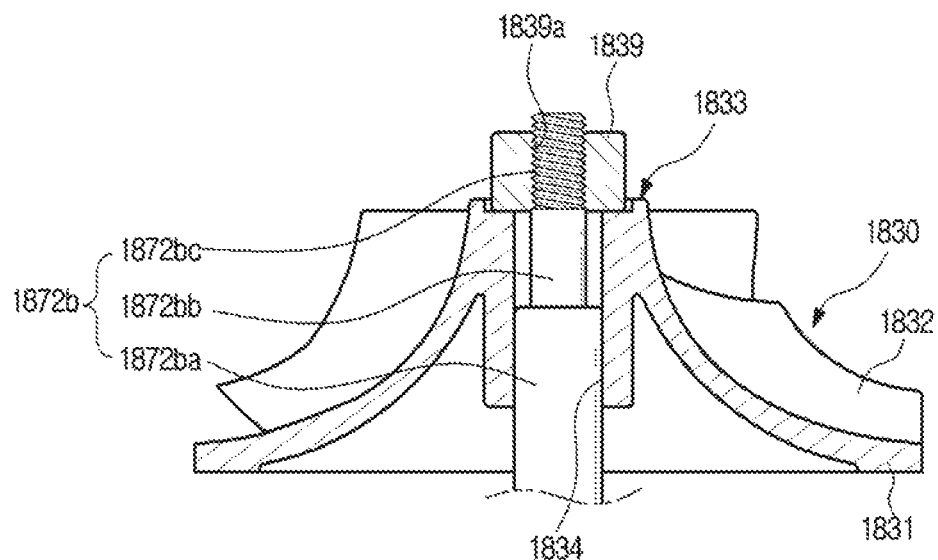
[Fig. 47a]
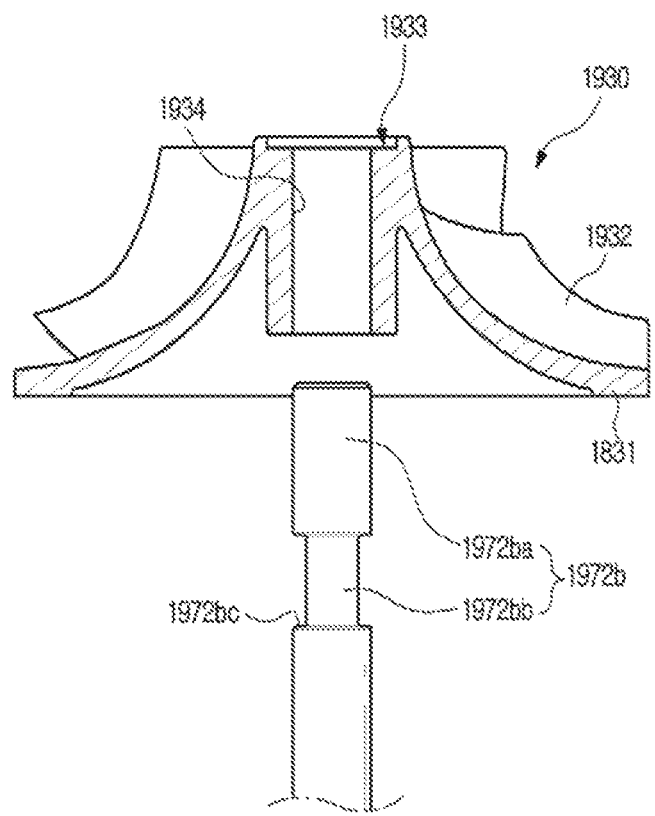

[Fig. 47b]
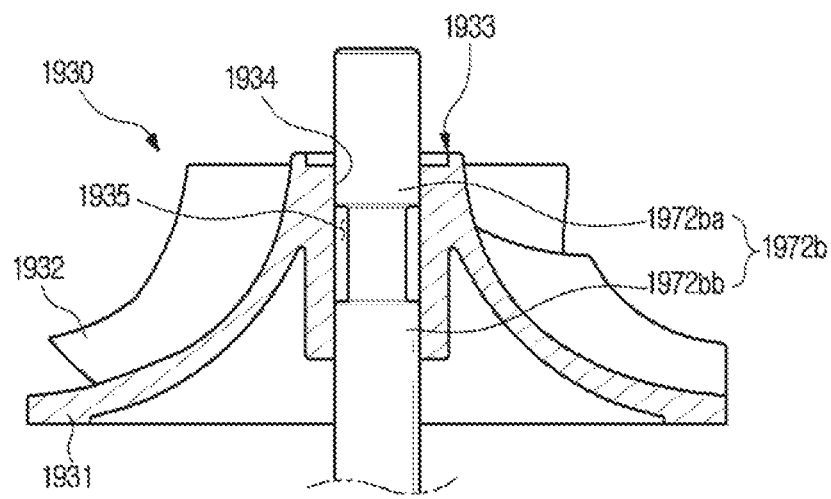
[Fig. 48a]
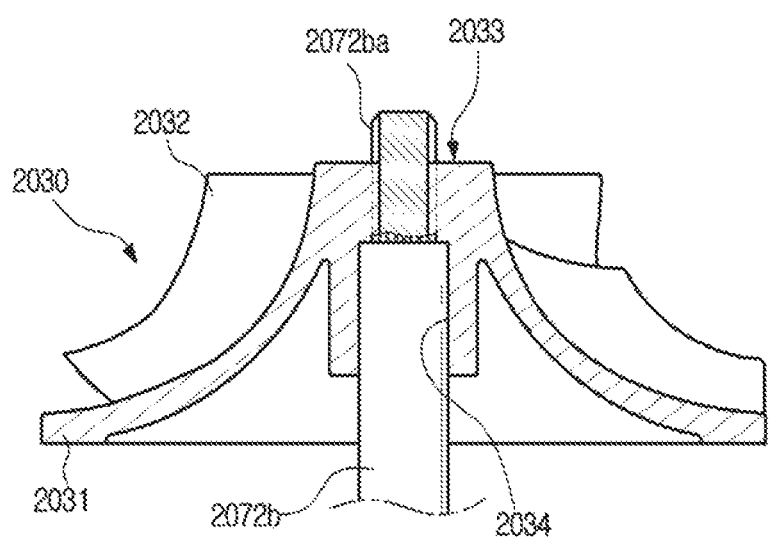

[Fig. 48b]
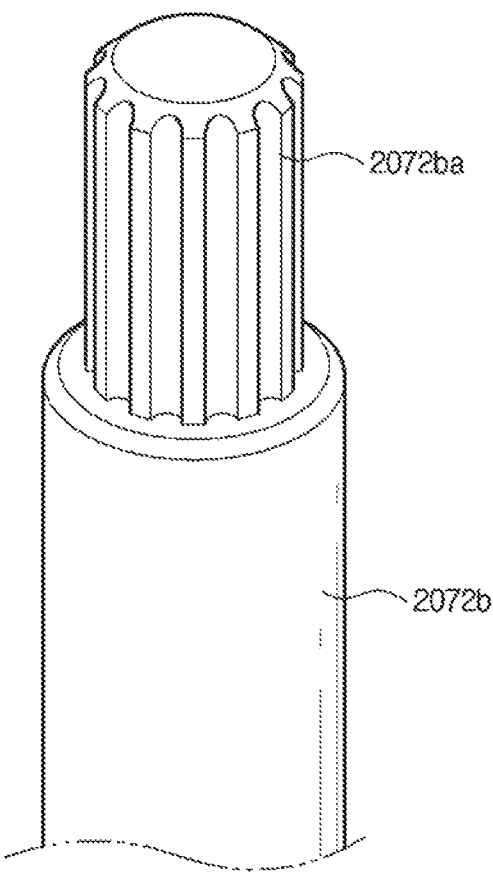
[Fig. 49a]
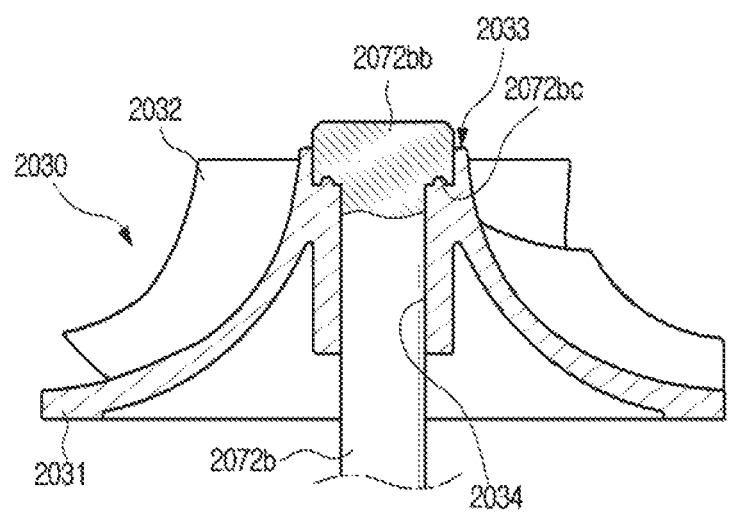

[Fig. 49b]
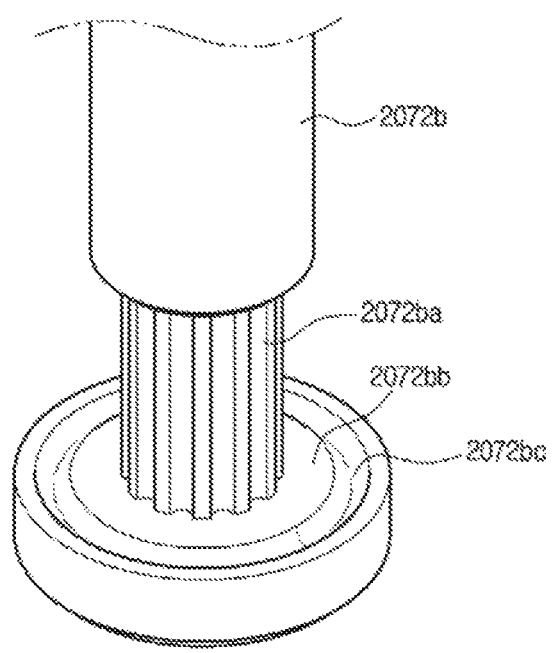

[Fig. 50]
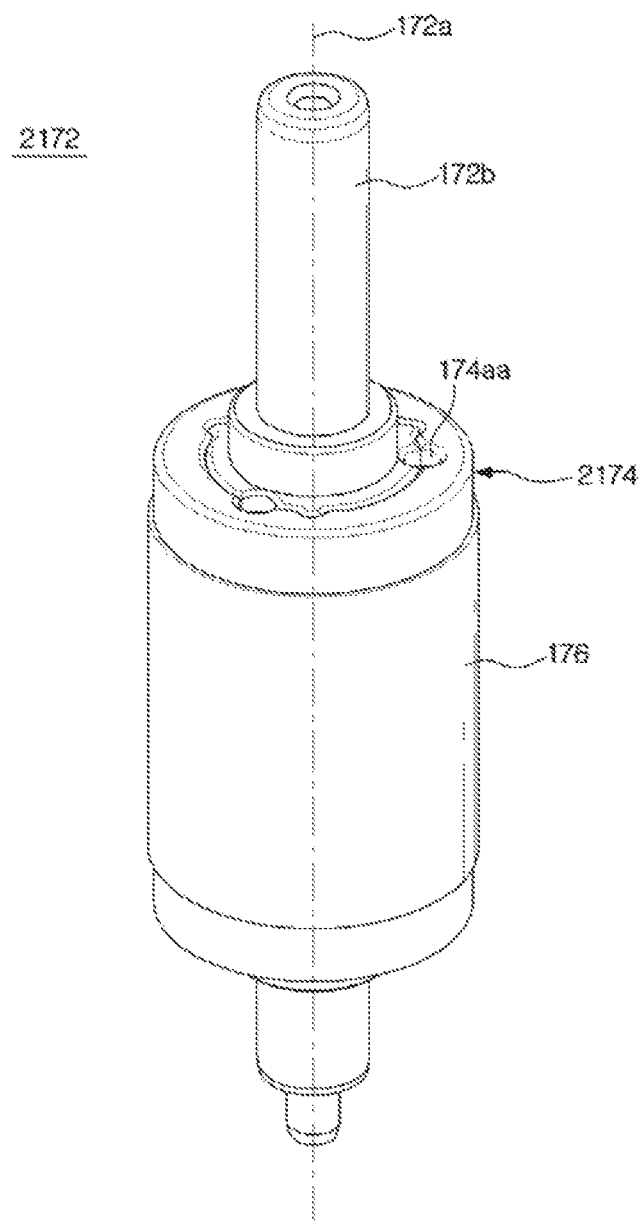

[Fig. 51a]
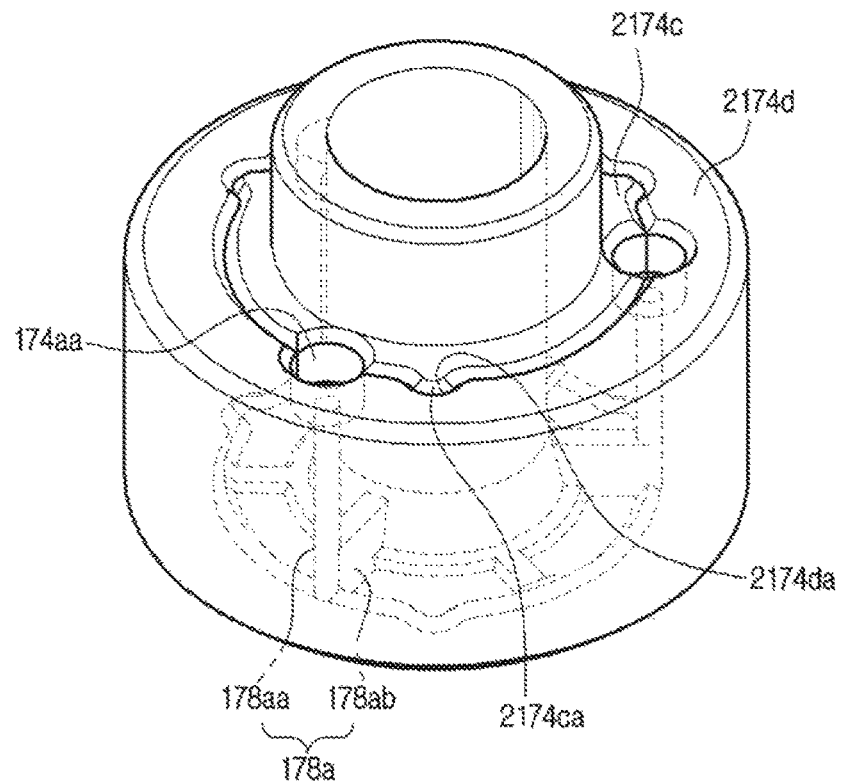
[Fig. 51b]
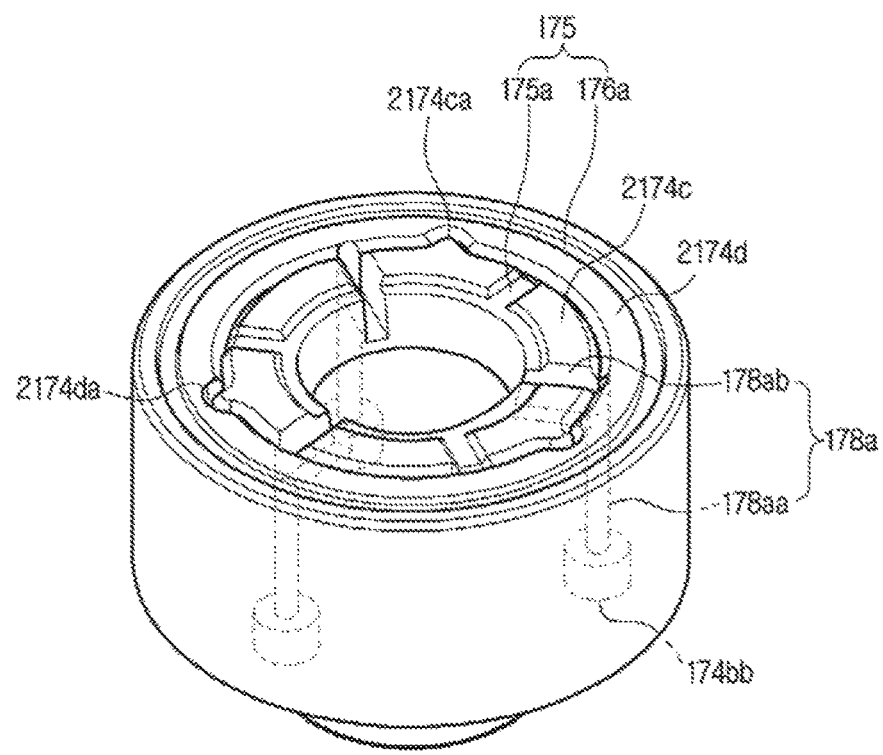

MOTOR ASSEMBLY

CROSS-REFERENCE TO RELATED APPLICATIONS

This application is a divisional application of U.S. patent application Ser. No. 15/316,404, filed on Dec. 5, 2016, which is a U.S. National Stage Application, which claims the benefit under 35 U.S.C. § 371 of PCT International Patent Application No. PCT/KR2015/003105, filed Mar. 30, 2015, which claims the foreign priority benefit under 35 U.S.C. § 119 of Korean Patent Application No. 10-2014-0068329, filed Jun. 5, 2014 and Korean Patent Application No 10-2014-0184840, filed Dec. 19, 2014, the contents of which are incorporated herein by reference.

TECHNICAL FIELD

The present disclosure relates to a motor assembly with an improved combined structure of an impeller.

BACKGROUND ART

In general, vacuum cleaners are home appliances using vacuum pressure produced by a motor equipped inside the main body of the cleaner to suck in air containing foreign materials such as dust and then filter out the foreign materials in the main body.

The motor produces sucking force from lowered internal pressure by discharging inside air out of the vacuum cleaner. The sucking force enables a sucking means to suck in foreign materials like dust on the floor to be cleaned with outside air and a dust collector to eliminate the foreign materials.

The motor is a machine to obtain turning force from electric energy and includes a stator and a rotor. The rotor is configured to electromagnetically interact with the stator and is rotated by a working force between a magnetic field and a current flowing in the coil.

The motor turns the rotor, which in turn turns a sucking fan to produce a sucking force, and these components may be arranged in a single module. However, the motor, components for fixing the motor, components of the sucking fan, etc., may interfere with one another's space, thereby increasing the entire volume of the cleaner.

DISCLOSURE

Technical Problem

An aspect of the present disclosure provides a motor assembly for improving a combined structure of an impeller and a rotor to make firm combination and improving manufacturing efficiency.

Technical Solution

In accordance with one aspect of the present disclosure, a motor assembly includes a stator; a rotor having a rotor shaft and electromagnetically interacting with the stator to be rotated; and an impeller combined with the rotor shaft. The impeller includes an impeller body; a plurality of wings formed on the outer face of the impeller body for producing air currents by rotation; and a shaft combiner having a shaft insertion hole through which the rotor shaft is inserted, arranged on the impeller body, and formed for the rotor shaft to be pressed in to enable the impeller and the rotor shaft to operate as one body.

The shaft combiner includes a shaft combining plane in which the rotor shaft is pressed; and a gradient combining plane extending from the shaft combining plane, and formed to be gradient to have an inner diameter gradually increase in an inserted direction of the rotor shaft.

The outer circumferential face of the rotor shaft and the gradient combining plane are adhered to each other by an adhesive.

The shaft combiner comprises an anti-deformation unit partially arranged from an end of the shaft combiner and insert-injected with the impeller to prevent deformation of the shaft combiner in combination of the rotor shaft.

The shaft combiner comprises an anti-deformation unit arranged on the entire area of the shaft combiner and insert-injected with the impeller to prevent deformation of the shaft combiner in combination of the rotor shaft.

The anti-deformation unit comprises an anti-deformation gradient plane formed in at least a part of the anti-deformation unit and formed to be gradient to have an inner diameter gradually increase in an inserted direction of the rotor shaft.

The rotor shaft comprises an anti-slip part formed on the outer circumferential face of the rotor shaft to correspond to the shaft combining plane, and having a knurling form.

The rotor shaft comprises a screw projection formed at an end in an inserted direction to the impeller and having a screw thread formed on the outer circumferential face. The shaft combiner comprises a screw groove corresponding to the screw projection.

The screw groove is formed to be stepped to have an inner diameter smaller than the inner circumferential face of the adjacent shaft combiner. The screw projection is formed to be stepped to have an outer diameter smaller than the outer circumferential face of the adjacent rotor shaft, thereby being combined with the screw groove.

The rotor shaft comprises a screw projection formed at an end in an inserted direction to the impeller and having a screw thread formed on the outer circumferential face. The shaft combiner comprises a nut unit insert-injected to the impeller and formed for the screw projection to be combined with.

In accordance with one aspect of the present disclosure, a motor assembly includes a stator; a rotor having a rotor shaft and electromagnetically interacting with the stator to be rotated; and an impeller combined with the rotor shaft. The rotor shaft includes a first shaft; and a second shaft formed to extend in the same elongate direction as the first shaft and having a smaller diameter than the first shaft. The impeller comprises, an impeller body; a plurality of wings formed on the outer circumferential face of the impeller body for producing air currents by rotation; and a shaft combiner having a first shaft combiner in which the first shaft is settled and a second shaft combiner in which the second shaft is settled, and formed on the impeller body to be combined with the rotor shaft.

The shaft combiner comprises a shaft cover arranged at an end of the second shaft combiner to release inside air when the rotor shaft is pressed in the shaft combiner, and formed to have a discharging hole to link internal space formed when the rotor shaft is combined with the impeller to outer space of the impeller, and to block an end of the rotor shaft.

In accordance with one aspect of the present disclosure, a motor assembly includes a stator; a rotor having a rotor shaft and electromagnetically interacting with the stator to be rotated; and an impeller having an impeller body, a plurality of wings formed on the outer face of the impeller body for producing air currents, and a shaft combiner arranged on the impeller body for the rotor shaft to be combined with, and insert-injected with the rotor shaft. The rotor shaft comprises a plurality of anti-slip grooves formed to correspond to the shaft combiner, and having grooves formed along a direction of a rotation shaft at regular intervals in a circumferential direction.

The impeller is configured to have an adhesive applied into the plurality of anti-slip grooves and be insert-injected with the rotor shaft.

The rotor shaft comprises an anti-leakage flange formed at an end of the rotor shaft to be adjacent to the plurality of anti-slip grooves for preventing an adhesive applied onto the plurality of anti-slip grooves from leaking out.

The anti-leakage flange comprises an anti-leakage groove formed to be sunken along the circumference of the rotor shaft on the inside of the anti-leakage flange to contain an adhesive leaking out.

Advantageous Effects

The motor assembly of the present disclosure may firmly combine an impeller and a rotor shaft for generating air currents, thus increasing lifespan, and may combine the impeller and the rotor shaft while they keep their concentric circles.

DESCRIPTION OF DRAWINGS

FIG. 1 is a perspective view of a cleaner, according to a first embodiment of the present disclosure;

FIG. 2 is a cross-sectional view of some features of the cleaner, according to the first embodiment of the present disclosure;

FIG. 3 is a perspective view of a motor assembly, according to the first embodiment of the present disclosure;

FIG. 4 is a cross-sectional view of the motor assembly, according to the first embodiment of the present disclosure;

FIG. 5 is an exploded view of the motor assembly, according to the first embodiment of the present disclosure;

FIGS. 6A and 6B are exploded views of a motor module, according to the first embodiment of the present disclosure;

FIG. 7 is an exploded view of a motor, according to the first embodiment of the present disclosure;

FIG. 8 shows arrangement relations between a circuit board and a motor, according to the first embodiment of the present disclosure;

FIG. 9 is a front view of the motor, according to the first embodiment of the present disclosure;

FIG. 10 shows flows of magnetic fields of the motor, according to the first embodiment of the present disclosure;

FIG. 11 is a perspective view of a rotor, according to the first embodiment of the present disclosure;

FIG. 12 is an exploded view of the rotor, according to the first embodiment of the present disclosure;

FIGS. 13A and 13B are perspective views of support members of the rotor, according to the first embodiment of the present disclosure;

FIG. 14 is a cross-sectional view of the rotor, according to the first embodiment of the present disclosure;

FIG. 15 is an exploded view of the rotor and an impeller, according to the first embodiment of the present disclosure;

FIG. 16 is a cross-sectional view of a combined rotor shaft and impeller, according to the first embodiment of the present disclosure;

FIG. 17 is a perspective view of a cleaner, according to a second embodiment of the present disclosure;

FIG. 18 is a cross-sectional view of some features of the cleaner, according to the second embodiment of the present disclosure;

FIG. 19 is a perspective view of a motor assembly, according to the second embodiment of the present disclosure;

FIG. 20 is a cross-sectional view of the motor assembly, according to the second embodiment of the present disclosure;

FIG. 21 is an exploded view of the motor assembly, according to the second embodiment of the present disclosure;

FIGS. 22A and 22B are exploded views of a motor module, according to the second embodiment of the present disclosure;

FIG. 23 is an exploded view of a motor, according to the second embodiment of the present disclosure;

FIG. 24 shows arrangement relations between a circuit board and a motor, according to the second embodiment of the present disclosure;

FIG. 25 is a front view of the motor, according to the second embodiment of the present disclosure;

FIG. 26 shows flows of magnetic fields of the motor, according to the second embodiment of the present disclosure;

FIG. 27 shows a graph of performance of the motor, according to the second embodiment of the present disclosure;

FIG. 28 shows a stator, according to a third embodiment of the present disclosure;

FIGS. 29 and 30 are perspective views of motor modules, according to a fourth embodiment of the present disclosure;

FIG. 31 is a perspective view of a front settling housing, according to the fourth embodiment of the present disclosure;

FIG. 32 is a perspective view of a rear settling housing, according to the fourth embodiment of the present disclosure;

FIG. 33 shows a motor, according to the fourth embodiment of the present disclosure;

FIG. 34 shows arrangement of the motor and settling housing, according to the fourth embodiment of the present disclosure;

FIG. 35 shows how to make a rotor, according to a fifth embodiment of the present disclosure;

FIG. 36 is a cross-sectional view of a combined rotor shaft and impeller, according to a sixth embodiment of the present disclosure;

FIG. 37 is a cross-sectional view of a combined rotor shaft and impeller, according to a seventh embodiment of the present disclosure;

FIG. 38 is a cross-sectional view of a combined rotor shaft and impeller, according to an eighth embodiment of the present disclosure;

FIG. 39 is a cross-sectional view of a combined rotor shaft and impeller, according to a ninth embodiment of the present disclosure;

FIG. 40 shows combination of a rotor shaft and an impeller, according to a tenth embodiment of the present disclosure;

FIGS. 41A, 41B are cross-sectional views of a combined rotor shaft and impeller, according to an eleventh embodiment of the present disclosure;

FIG. 42 is a cross-sectional view of a combined rotor shaft and impeller, according to a twelfth embodiment of the present disclosure;

FIGS. 43A, 43B are cross-sectional views of a combined rotor shaft and impeller, according to a thirteenth embodiment of the present disclosure;

FIGS. 44A, 44B are cross-sectional views of a combined rotor shaft and impeller, according to a fourteenth embodiment of the present disclosure;

FIG. 45 is a cross-sectional view of a combined rotor shaft and impeller, according to a fifteenth embodiment of the present disclosure;

FIG. 46 is a cross-sectional view of a combined rotor shaft and impeller, according to an sixteenth embodiment of the present disclosure;

FIGS. 47A, 47B are cross-sectional views of a combined rotor shaft and impeller, according to a seventeenth embodiment of the present disclosure;

FIGS. 48A, 48B are cross-sectional views of a combined rotor shaft and impeller, according to an eighteenth embodiment of the present disclosure;

FIGS. 49A, 49B are cross-sectional views of a combined rotor shaft and impeller, according to a nineteenth embodiment of the present disclosure;

FIG. 50 is a perspective view of a rotor, according to a twentieth embodiment of the present disclosure; and FIGS. 51A and 51B are perspective views of auxiliary members of the rotor, according to the twentieth embodiment of the present disclosure.

BEST MODEL

Reference will now be made in detail to embodiments, examples of which are illustrated in the accompanying drawings, wherein like reference numerals refer to the like elements throughout.

FIG. 1 is a perspective view of a cleaner, according to a first embodiment of the present disclosure, and FIG. 2 is a cross-sectional view of some features of the cleaner, according to the first embodiment of the present disclosure.

A stick-type cleaner 1 is applied for a cleaner 1 in accordance with a first embodiment of the present disclosure.

The cleaner 1 includes a main stick body 10, a sucker 20, and a main cleaner body 30.

The main stick body 10 is a part combined on the top of the main cleaner body 30, and may be held by the user to be able to operate the cleaner 1. A controller 12 is arranged in the main stick body 10 for the user to control the cleaner 1.

The sucker 20 is arranged in the bottom of the main cleaner body 30 to come into contact with a surface to be cleaned. The sucker 20 comes into contact with the surface to be cleaned, forcing dust or dirt on the surface to flow to the inside of the main cleaner body 30 with sucking force produced from the motor assembly 100.

The main cleaner body 30 has a motor assembly 100 and a dust bin 40 arranged therein. The motor assembly 100 may generate power to produce sucking force inside the main cleaner body 30, and the dust bin 40 may be located in the upper stream of air flow than the motor assembly 100 for filtering out dust or filth from the air flowing from the sucker 20.

FIG. 3 is a perspective view of a motor assembly, according to the first embodiment of the present disclosure, FIG. 4 is a cross-sectional view of the motor assembly, according to the first embodiment of the present disclosure, and FIG. 5 is an exploded view of the motor assembly, according to the first embodiment of the present disclosure.

The motor assembly 100 is arranged in the main cleaner body 30 for producing sucking force.

The motor assembly 100 may include a housing 102, a motor 170 installed inside the housing 102 for generating sucking force, a settling housing 142 for fixing the motor 170 in the housing 102, and an impeller 130 installed on a rotor shaft 172a of the motor 170 to be rotated.

The housing 102 includes a first housing 110, and a second housing 120 to be combined with the first housing 110. The housing 102 may be shaped almost like a cylinder, without being limited thereto, and may have other various forms. The first housing 110 and the second housing 120 may be detachably arranged in the axial direction of the rotor shaft 172a. The first housing 110 has an air sucking hole 111 through which air flowing in by the motor 170 flows to the inside of the housing 102, and the second housing 120 has an air discharging hole 121 to discharge the air flowing to the inside of the housing 102. Since the second housing 120 is combined with the first housing 110 on the rear side of the first housing 110, the air sucking hole 111 is formed on the front side of the housing 102 and the air discharging hole 121 is formed on the back. Arrangement of the air sucking hole 111 and the air discharging hole 121 is, however, not limited thereto.

The first housing 110 and the second housing 120 are combined to form an air fluid path 113 leading from the air sucking hole 111 to the air discharging hole 121 and form an internal space 127 in which the motor 170 or the impeller 130 are arranged.

The air fluid path 113 may include a module fluid path 113a and a module outside fluid path 113b. In the motor assembly 100, air is sucked in by the impeller 130 and the sucked air is circulated in the air fluid path 113. The air flowing into the housing 102 may be circulated by a fluid path guide 194 of an insulator 190 in the module fluid path 113a running to the inside of the motor module 140 and in the module outside fluid path 113b passing between the outside of the motor module 140 and the inside of the housing 102. The sucked air passing the module fluid path 113a may cool down from the heat produced from the inside of the motor module 140. The sucked air passing the module fluid path 113a and passing the module outside fluid path 113b may cool down from the heat produced from a circuit board 196 while passing the circuit board 196.

The first housing 110 may include a shroud 112.

The shroud 112 is arranged to correspond to the impeller 130 or a diffuser 122, as will be described later, for guiding air flowing into the housing 102 by the motor 170. The shroud 112 may be formed such that a space formed by the shroud 112 becomes wider along the axial direction of the rotor shaft 172a, in order for the fluid path to be wider in a direction in which air sucked by the motor 170 from the air sucking hole 111 proceeds. The shroud 112 enables the air flowing through the air sucking hole 111 to be guided into the housing 102, and may be formed to have a form that matches the top of the impeller 130.

The impeller 130 may be arranged on the inner side of the air sucking hole 111 of the first housing 110. The impeller 130 is arranged to be rotated along with the rotor shaft 172a. A plurality of wings 132 may be formed on the impeller 130 to make air flow. The impeller 130 is formed such that a radius of rotation of the plurality of wings 132 of the impeller 130 becomes smaller as it gets distant from the rotor 172 and the air flowing in along the direction of the rotor shaft 172a according to the rotation of the impeller 130 is discharged to the radial direction of the rotor shaft 172a. The shape and position of the impeller 130 is not limited thereto, but the impeller 130 may have any other shape and position as long as it enables air to be circulated.

A material for the impeller 130 may include plastics. Specifically, it may include carbon fiber reinforced plastics including carbon fiber.

The second housing 120 may include a diffuser 122. The diffuser 122 is arranged to increase the velocity of an air fluid moving by the impeller 130. It is located on the outer circumference along the radial direction of the impeller 130.

The diffuser 122 may be radially arranged with respect to the impeller 130. Specifically, it may be formed in a direction the plurality of wings 132 of the impeller 130 extend. The diffuser 122 may be formed with a plurality of ribs 123, 124, which may be formed with the gap that gets wider in the direction the plurality of the wings 132 extend. The plurality of ribs 123, 124 are formed to increase the velocity of a moving air fluid while guiding the air flowing by the impeller 130. Specifically, the diffuser 122 and the shroud 112 formed in the first housing 110 form a diffuser fluid path 125, guiding the air moving by the impeller 130 and increasing the velocity of the moving air fluid.

The plurality of ribs 123, 124 may include first ribs 123 and second ribs 124. The first ribs 123 are arranged on the same plane as an end in the downstream of the air circulation by the impeller 130, and the second ribs 124 are arranged to have a certain slope to the direction of the rotor shaft 172a such that the air guided by the first ribs 123 moves along the vertical direction, the direction of the rotor shaft 172a in the housing 102.

The motor module 140 may be arranged inside the housing 102. The motor module 140 is arranged for the motor 170 to be fixed as a single module inside the housing 102.

The motor module 140 may include the motor 170 and the settling housing 142.

The settling housing 142 may include a front settling housing 150, and a rear settling housing 160 arranged to be combined with the front settling housing 150 with the motor 170 in between.

The front settling housing 150 is arranged to be fixed to the housing 102. Specifically, a settling hole 126 shaped like a hole is formed in the center of the second housing 120 for being combined with the front settling housing 150, and the front settling housing 150 may be combined into the settling hole 126. They may be combined by fitting together, without being limited thereto.

The front settling housing 150 may include a front settling housing body 151, an impeller settler 153, and a front settler 154. The front settling housing body 151 may be shaped almost like a disc, and as described above, may include a body combiner 152 matching the shape of the settling hole 126 to be combined in the settling hole 126 in the shape of a hole of the second housing 120.

The impeller settler 153 is formed for the impeller 130 to be settled on the front of the front settling housing body 151. The front of the impeller settler 153 is formed to correspond to the shape of a rear face of the impeller 130 not to interfere with rotation of the impeller 130 combined with the rotor shaft 172a.

The front settler 154 is formed on the rear face of the front settling housing body 151 for the motor 170 to be settled. The front settler 154 is arranged to settle and fix a stator 180 such that the center of the rotor 172 arranged to be able to rotate corresponds to a rotation center of the impeller 130.

The shape of the front settler 154 is not limited thereto, and in an embodiment of the present disclosure, the front settler 154 is formed to protrude from the front settling housing body 151 for the front settling housing body 151 and the motor 170 to be settled therein with a certain gap.

The position of the front settler 154 is not limited thereto, but in the embodiment of the present disclosure, since the stator 180 is formed to extend long in a first direction w1, there may be four front settlers 154 arranged to correspond to the respective ends of the stator 180.

The rear settling housing 160 is formed to be combined with the front settling housing 150 with the motor 170 between the rear settling housing 160 and the front settling housing 150.

The rear settling housing 160 may include a rear settling housing body 161, and a rear settler 164. The rear settling housing body 161 may be formed to extend long in the elongate direction of the stator 180 to correspond to the shape of the stator 180.

The position of the rear settler 164 is not limited thereto, but in the embodiment of the present disclosure, since the stator 180 is formed to extend long in the elongate direction, there may be four rear settlers 164 arranged to correspond to the respective ends of the stator 180.

The front settling housing 150 and the rear settling housing 160 have screw holes 151b, 161b for combination, and are combined together by screws 148.

A structure of fixing the motor 170 to the inside of the front and rear settling housings 150 and 160 will be described later in detail.

FIGS. 6A and 6B are exploded views of a motor module, according to the first embodiment of the present disclosure.

In the center of the front and rear settling housings 150 and 160, a front through hole 151a and a rear through hole 161a are formed, respectively, for the rotor shaft 172a to pass through. In the front and rear through holes 151a and 161a, front and rear bearings 173a and 173b may be arranged, respectively, for rotation of the rotor shaft 172a.

The front settling housing 150 may include a front settling projection 156, and the front settler 154.

The front settler 154 is arranged on the inner side of the front settling housing 150 for a side of the motor 170 to be settled therein. To make the center of the rotor 172, the impeller 130, and the diffuser 122 aligned while the stator 180 is settled or fixed in the front settler 154, the front through hole 151a may be formed in the middle of the plurality of front settlers 154.

The front settling projection 156 is formed to protrude from the body of the front settling housing 150 along the edge of the front settler 154 to enclose the motor 170 on the inner side. The front settling projection 156 prevents the position of the motor 170 from being twisted to a direction perpendicular to the rotor shaft 172a while the motor assembly 100 is operating. Specifically, the front of the motor 170 is settled in the front settler 154, and a side of the motor 170 is settled in a front projection settling plane 156a of the front settling projection 156. A front guide plane 156b may be formed on the front settling projection 156 to guide the motor 170 to be easily settled in the front settler 154. The front guide plane 156b is formed on an end of the front settling projection 156 to have a certain angle of slope inward and may be connected to the front projection settling plane 156a.

The body of the front settling housing 150 has almost a round shape, and there are four front settling projections 156 arranged to protrude from the body of the front settling housing 150.

The rear settling housing 160 may include a rear settling projection 166, and the rear settler 164.

The rear settler 164 is arranged on the inner side of the rear settling housing 160 for the other side of the motor 170 to be settled therein. To make the center of the rotor 172, the impeller 130, and the diffuser 122 aligned while the stator 180 is settled or fixed in the rear settler 164, a rear through hole 161a may be formed in the middle of the plurality of rear settlers 164.

The rear settling projection 166 is formed to protrude from the body of the rear settling housing 160 along the edge of the rear settler 164 to enclose the motor 170 on the inner side. Along with the front settling projection 156, the rear settling projection 166 prevents the position of the motor 170 from being twisted to a direction perpendicular to the rotor shaft 172a while the motor assembly 100 is operating.

In combining the motor 170 and the rear settling projection 166, to facilitate settlement of the motor 170 in the rear settler 164, a rear guide plane 167b may be formed in the rear settling projection 166 to have a certain angle of slope. Specifically, the back face of the motor 170 is settled in the rear settler 164, and a side of the motor 170 is settled in a rear projection settling plane 167a of the rear settling projection 166. A rear guide plane 167b may be formed on the rear settling projection 166 to guide the motor 170 to be easily settled in the rear settler 164. The rear guide plane 167b may be formed on an end of the rear settling projection 166 to have a certain angle of slope, and may be connected to the front projection settling plane 167a.

The body of the rear settling housing 160 may be formed to extend long in the first direction w1, which is an elongate direction of the stator 180, to correspond to the shape of the stator 180 as will be described later. There may be four rear settling projections 166 arranged at positions corresponding to the front settling projections 156 of the front settling housing 150.

A magnet sensor 144 may be arranged in the rear settling housing 160.

The magnet sensor 144 is located on the same axis with a magnet of the rotor 172 to detect the position of the rotating rotor 172. This information is delivered to a position sensor (not shown) of the circuit board 196, enabling position control of the rotor 172.

The magnet sensor 144 may be arranged to be settled in a sensor bracket 146 for delivering information to the position sensor (not shown) of the circuit board 196. The sensor bracket 146 has one end that may be combined with the sensor settler 168 arranged on the rear side of the rear settling housing 160 and the other end that may be combined onto the circuit board 196. With the magnet sensor 144 arranged on the rotor 172 instead of a direct position sensor, position control of the rotor 172 may be realized by adding a simple structure.

The front settling housing 150 and the rear settling housing 160 have screw holes 151b, 161b for combination, and are combined together by screws 148. Specifically, in the embodiment, the screws 148 are prepared for the four front settlers 154 and four rear settlers 164 one for each, such that the screws 148 may pass through the screw holes 161b of the rear settlers 164 and may be combined with the screw holes 151b of the corresponding front settlers 154. That is, the front settling housing 150 and the rear settling housing 160 are combined and fixed to each other with four screws 148.

FIG. 7 is an exploded view of a motor, according to the first embodiment of the present disclosure.

The motor 170 may include the rotor 172 and the stator 180.

The rotor 172 is arranged to be able to rotate in the center of the stator 180.

The stator 180 is formed to electromagnetically interact with the rotor 172.

The stator 180 may include a stator body 182, an insulator 190, and a coil 195.

There are a pair of stator bodies 182 arranged in the first direction w1 to face each other with the rotor 172 in between. In other words, the stator bodies 182 may be arranged lengthwise to face each other. The pair of stator bodies 182 may be arranged to be combined with each other in the first direction w1, the elongate direction. In other words, it is not that the stator 180 is arranged in a round form along the circumferential direction, it is that the stator 180 is arranged to enclose the rotor 172 such that a length formed in the first direction w1 may be longer than a length formed in the second direction w2 perpendicular to the first direction w1. That is, let the length of the stator 180 formed in the first direction w1 be L1 and the length formed in the second direction w2 be L2, and L1 may be greater than L2.

As the stator 180 is formed to extend long in one direction than in the other direction, space to the outer side in the other direction of the stator 180 is relatively wider than space to the outer side in the one direction. This may secure a fluid path running the space, and thus improve motor cooling and performance of motor assembly.

As the stator 180 is formed in the first direction w1, an arrangement area 188 may be formed around the rotor 172 along the circumferential direction of the stator 180. That is, the arrangement area 188 may be formed to a side of the stator 180, which is perpendicular to the elongate direction of the stator 180.

The arrangement area 188 is an area formed on the same plane with the stator 180, which improves space utility of an internal space 127 of the motor assembly 100. The arrangement area 188 may be shaped almost like a half circle, in which the components of the motor assembly 100 may be arranged and in an embodiment of the present disclosure, a capacitor 198 may be arranged.

There may be a pair of arrangement areas 188 formed on both sides of the stator 180, and there may also be a pair of capacitors 198. In an embodiment of the present disclosure, a total of four may be arranged by two for each arrangement area 188. The capacitor 198 has functions of flattening the voltage or eliminating ripples.

In the center of a pair of stator bodies 182, a rotor receptor 187a for receiving the rotor 172 is formed. The stator body 182 may be formed by piling up press-processed iron plates.

The stator body 182 may include at least one stator core 184. There may be a plurality of stator cores 184 arranged in parallel to one another. The pair of stator bodies 182 may each have at least two stator cores 184 aligned in parallel, and may be symmetrically arranged with the rotor in between.

The stator core 184 includes a center core 185 and side cores 186 arranged on both sides to the center core 185.

The center cores 185 are arranged to face each other with the rotor 172 in the center, and the rotor receptor 187a is formed between the center cores 185 such that the rotor 172 is able to rotate in the rotor receptor 187a. A pair of the side cores 186 may be arranged to both sides of the center core 185, and may be aligned in parallel with the center core 185.

The stator core 184 of one of the pair of stator bodies 182 and the stator core 184 of the other stator body 182 may be formed to be aligned in the same line. That is, the stator cores 184 may be arranged to face each other on the same line. In other words, on the extended line in the elongate direction of the stator core 184 of one of the pair of stator bodies 182, the stator core 184 of the other stator body 182 may be arranged.

The side cores 186 arranged to both sides of the center core 185 may be arranged such that a pair of side cores 186 of a stator 180 may be combined with a pair of side cores 186 of the opposite stator 180. In other words, one of the opposite side cores 186 may have a combining projection 186a and the other one may have a combining groove 186b for the combining projection 186a to be inserted thereto and combined therewith.

As the center cores 185 and the side cores 186 are aligned in parallel in the same direction, winding coils 195 around the stators 180 may become easy.

A stator slot 187b is formed between the stator cores 184. As the coils 195 are wound around the stator cores 184, the coils 195 are received in the stator slots 187b. Extended core parts 185a obtained by partially expanding the width of the stator cores 184 are formed on the inner ends of the stator cores 184 adjacent to the rotor 172. Specifically, the extended core parts 185a are formed from the partially expanded width of the center cores 185 to wrap around the rotor 172 on the inner ends of the center cores 185 directed to the rotor 172. A gap 185b is formed between the inner side of the extended core part 185a and the outer side of the rotor 172 for allowing rotation of the rotor 172.

The insulator 190 is formed of an electrically insulating material to wrap a part of the stator 180 and wrap the stator core 184. The insulator 190 includes an insulator body 191 arranged to correspond to a side of the stator body 182, a center core supporter 192 arranged on the insulator body 191 to correspond to the center core 185, and a coil guide 193 protruding from an inner side of the radial direction from the center core supporter 192.

The coil 195 is wound around the center core 185 and over to the center core supporter 192 while the insulator 190 is combined with the stator body 182. It could be wound around the side core 186 and over to the insulator 190 wrapping around the side core 186, but in the embodiment of the present disclosure, winding around the center core 185 and over to the center core supporter 192 will only be described. In other words, although the coil 195 wound around the center core 185 will be described as an example, not only the center core 185 but also even the pair of side cores 186 may be wound with the coil 195 to have three phase polarity for output density and easy control.

The insulator 190 may include a fluid path guide 194. The fluid path guide 194 may be slanted from an end in the elongate direction of the stator 180 toward the air fluid path 113, and with this arrangement, part of the air sucked by the impeller 130 to the inside of the housing 102 passes the inside of the motor module 140, thereby forming the module fluid path 113a. That is, the air fluid path 113 is partitioned by the fluid path guide 194 into the module fluid path 113a and the module outside fluid path 113b.

The insulator 190 may include a body combiner 191a. The body combiner 191a is arranged on a side of the insulator body 191 to guide the coil 195 to be wound around the motor 170 to the circuit board 196. The body combiner 191a may be inserted and fixed to the circuit board 196 for combining the motor 170 and the circuit board 196.

FIG. 8 shows arrangement relations between a circuit board and a motor, according to the first embodiment of the present disclosure.

The circuit board 196 may be arranged under the motor 170 to deliver electric signals to the motor 170. On a side of the circuit board 196, there may be a mounting area 197 in which circuit elements are arranged. In the mounting area 197, circuit elements, such as heating devices, capacitors 198, etc., may be arranged.

Since the motor 170 needs to receive electrical signals from the circuit board 196 and the heat generated from the circuit board 196 may be eliminated through air flow produced by operation of the motor 170, the circuit board 196 may be arranged to be adjacent to the motor 170.

However, in reality, it grows unnecessary space to avoid interference between the circuit elements and the motor 170, and thus the motor assembly 100 grows bigger.

In an embodiment of the present disclosure, the motor 170 is arranged to extend long in a direction, and the arrangement area 188 may be on the same plane. In other words, on both sides of the stator 180 formed along a direction, which is an elongate direction, the arrangement area 188, which is an affordable space arranged for other components of the motor assembly 100 to be arranged therein, may be formed. In an embodiment of the present disclosure, since the housing 102 has almost a round form or the impeller 130 is formed in a round shape, the arrangement area 188 may be arranged in the form of a half circle having arcs with a regular interval.

In the mounting area 197 of the circuit board 196, electric devices may be arranged to avoid interference with the arrangement of the motor 170 in the arrangement area 188 of the motor 170. Although the capacitor 198 is arranged as an example in the embodiment, other electric devices may also be arranged in the arrangement area 188.

This arrangement may enable the motor 170 and the circuit board 196 to be arranged even closer to each other, space utilization inside the housing 102 may be improved.

FIG. 9 is a front view of the motor, according to the first embodiment of the present disclosure, and FIG. 10 shows flows of magnetic fields of the motor, according to the first embodiment of the present disclosure.

The stator 180 may be symmetrically arranged such that a pair of stator bodies 182 face each other.

A pair of extended core parts 185a arranged on ends of a pair of the center cores 185 around the rotor 172 may have centers of their internal curved planes go against each other. Specifically, a pair of extended core parts 185a are formed to enclose the outer face of the rotor 172, in which case an inner face center of one extended core part 185a goes against an inner face center of the other extended core part 185a. With this feature, the pair of extended core parts 185a enclosing the rotor 172 give electromagnetic affection in different magnitudes and directions for the rotor 172 to be rotated in a direction.

FIG. 10 shows electromagnetic flows passing the stator 182 and rotor 172.

The electromagnetic flows passing the stator 180 and rotor 172 are produced between one of a pair of side cores 186 and the center core 185 according to a change in polarity due to the rotation of the rotor 172.

A procedure of assembling the motor assembly 100 in accordance with an embodiment of the present disclosure will now be described.

Referring to FIG. 7, a pair of the stator bodies 182 are combined as one stator 180 through combination between the opposite side cores 186. At least a part of the stator 180 are covered by the insulator 190 for electrical insulation.

Referring to FIGS. 6A, 6B, the extended core part 185a and the gap 185b are formed in the rotor receptor 187a formed in a pair of stators 180 combined with the insulator 190, and the rotor 172 is inserted thereto and fixed by the settling housing 142 as a module.

Specifically, one side and the other side of the motor 170 are settled in the front settler 154 of the front settling housing 150 and the rear settler 164 of the rear settling housing 160, respectively, and a side of the motor 170 is settled to the settling projection 170.

Furthermore, the rotor shaft 172*a* passes through a through hole of the settling housing 142 to make the concentric of the rotor 172 and the stator 180 aligned even in settling and combining the motor 170 in the settling housing 142.

The front settling housing 150 and the rear settling housing 160 may be combined together by screws 148, without being limited thereto.

This procedure may arrange the motor 170 and the settling housing 142 in a module.

Referring to FIG. 5, the motor module 140 may be combined in the settling hole 126 of the second housing 120. Specifically, a body combiner 152 of the front settling housing 150 may be combined in the settling hole 126 of the second housing 120.

The impeller 130 may be combined with the rotor shaft 172*a* in front of the motor module 140. Specifically, the impeller 130 may be arranged in an impeller settler 153 of the front settling housing 150.

The first housing 110 may be combined on the front of the second housing 120. The shroud 112 is arranged on the inner side of the first housing 110, forming a fluid path extending to the inside of the housing 102 with the impeller 130 and a diffuser.

A capacitor 198 may be arranged in the arrangement area 188 of the motor 170 in the back of the motor module 140, and the circuit board 196 may be combined to not interfere the motor 170 with the electric elements. Specifically, it is arranged to be mechanically combined with the circuit board 196 through a circuit combiner combined with the insulator 190, and for the coil 195 arranged in the motor 170 to be electrically combined with the circuit board 196.

Once the motor module 140 is combined with the housing 102 and the circuit board 196, the motor assembly 100 may be assembled.

FIG. 11 is a perspective view of a rotor, according to the first embodiment of the present disclosure, and FIG. 12 is an exploded view of the rotor, according to the first embodiment of the present disclosure.

The rotor 172 may be arranged in the rotor receptor 187*a* of the stator 180. The rotor 172 may be arranged in the rotor receptor 187*a* to interact electromagnetically with the stator 180.

The rotor 172 may include the rotor shaft 172*b* and a magnet 173.

The rotor shaft 172*b* is formed to be able to rotate around the rotor shaft 172*a*.

The impeller 130 is combined at one end of the rotor shaft 172*b*, thus being rotated with the rotor 172. The rotor shaft 172*b* may have the form of a rod. The rotor shaft 172*b* may be rotated while forming the gap 185*b* with the extended core part 185*a* of the stator 180.

The magnet 173 is arranged to allow the rotor shaft 172*b* to pass through. That is, it may be arranged around the rotor shaft 172*b*. The shape and arrangement of the magnet 173 is not limited, but in the embodiment of the present disclosure, the magnet 173 has a ring shape, allowing the rotor shaft 172*b* to pass through the center.

The rotor 172 may include a support member 174.

The support member 174 is arranged to be adjacent to the magnet 173. Specifically, the support member 174 may be arranged to be adjacent to the magnet 173 in the direction of the rotor shaft 172*a*. There may be a pair of support members 174 arranged on one and the other sides of the magnet 173 in the direction of the rotor shaft 172*a*. The support member 174 may include a balancer. In other words, a pair of balancers may be arranged on both sides of the magnet 173 for compensating for eccentricity due to rotation of the rotor 172.

The support member 174 is arranged to allow the rotor shaft 172*b* to pass through. That is, it may be arranged around the rotor shaft 172*b*. The shape and arrangement of the support member 174 is not limited, but in the embodiment of the present disclosure, the support member 174 has a ring shape, allowing the rotor shaft 172*b* to pass through the center.

The support member 174 may include a first support member 174*a* arranged on one side of the magnet 173 along the direction of the rotor shaft 172*a*, and a second support member 174*b* arranged on the other side of the magnet 173 along the direction of the rotor shaft 172*a*. The support member 174 includes balancers, so the first support member 174*a* corresponds to a first balancer and the second support member 174*b* corresponds to a second balancer.

The rotor 172 may further include a magnet cover 176.

The magnet cover 176 is formed to enclose the circumferential face of the magnet 173. The rotor 172 rotates at a high speed, which scatters the magnet 173, leading to decrease in durability. For this reason, the magnet cover 176 is formed to enclose the circumferential face of the magnet 173, thereby increasing the durability of the magnet 173.

The magnet cover 176 is formed of any material as long as the material helps improve the durability of the magnet 173, but in the embodiment, it may be formed of a carbon fiber. The magnet cover 176 of a carbon fiber material is subject to a rolling process to enclose the circumferential face of the magnet 173 and then hardened to endure rapid rotation, thereby increasing the durability of the magnet 173.

The magnet cover 176 may be directly rolled on the magnet 173, or may be wound around a jig of the form of a ring type rod and hardened, and the result may cover the circumferential face of the magnet 173. The magnet cover 176 and the magnet 173 may be more stably fixed by an adhesive applied in between.

FIGS. 13A, 13B are perspective views of support members of the rotor, according to the first embodiment of the present disclosure, and FIG. 14 is a cross-sectional view of the rotor, according to the first embodiment of the present disclosure.

The rotor 172 may include an internal channel 177 formed for circulation of an adhesive for adhering the rotor shaft 172*b*, the support member 174, and the magnet 173 together.

The internal channel 177 may include an adhesion channel 178 and a magnet combination channel 179. The adhesion channel 178 may be included in the support member 174, and the magnet combination channel 179 may be included in the magnet 173.

The adhesion channel 178 and the magnet combination channel 179 are formed to be linked together, allowing an adhesive to be injected thereto and circulated therein to adhere the respective components together. The adhesion channel 178 and the magnet combination channel 179 may be bent for adhesion of a plurality of particular components of the rotor 172. Specifically, as will be described below, the adhesion channel 178 and the magnet combination channel 179 may be linked together and bent for an adhesive to be circulated to adhere the support member 174, the magnet 173, and the rotor shaft 172b together.

The magnet combination channel 179 is formed for the adhesive to be circulated therein to adhere the rotor shaft 172b and the magnet 173 together. The magnet combination channel 179 is formed by the outer circumferential face of the rotor shaft 172b and the inner circumferential face of the magnet 173. The magnet combination channel 179 may have the form of a ring type fluid path allowing the adhesive to be circulated therein. As the magnet combination channel 179 is filled with an adhesive and then solidified, the magnet 173 and the rotor shaft 172b may be glued together.

The magnet combination channel 179 may be formed between the rotor shaft 172b and the magnet 173, ranging from the rotor shaft 172b to one side and to the other side of the magnet 173. In other words, the adhesive may be applied only to necessary parts to adherer the magnet 173 and the rotor shaft 172b together, thereby increasing manufacturing efficiency and improving the product quality.

The adhesion channel 178 forms a fluid path for the adhesive to be circulated therein to adhere the support member 174 and the magnet 173 together. The adhesion channel 178 is formed in the support member 174.

In the support member 174, an inlet 174aa and an outlet 174b may be formed for the adhesive to flow to the channel. The inlet 174aa may be formed on the outer side of the first support member 174a, and the outlet 174bb may be formed on the outer side of the second support member 174b. The inlet 174aa and outlet 174bb are not limited to a particular number and position, but in the embodiment, they are formed in number to correspond to the number of the first and second channels 178a and 178b.

The adhesion channel 178 may include the first channel 178a formed in the first support member 174a and the second channel 178b formed in the second support member 174b.

The first channel 178a is formed in the first support member 174a for an adhesive to be circulated between the first support member 174a and a side of the magnet 173. Specifically, it is formed for the adhesive to be circulated between the first support member 174a and a side of the magnet 173 facing the first support member 174a. One end of the first channel 178a may be linked to the inlet 174aa of the first support member 174a. The other end of the first channel 178a may be linked to the magnet combination channel 179.

There may be one or more first channels 178a. If there are a plurality of first channels 178a, the positions are not limited. In the embodiment, they are arranged along the direction of the rotor shaft 172a at regular intervals in the circumferential direction for the adhesive to uniformly flow into the channel. Specifically, there may be three first channels 178a arranged around the rotor shaft 172a at intervals of 120 degrees.

The first channel 178a may include an inlet channel 178aa and a first circulation channel 178ab.

The inlet channel 178aa is linked to the inlet 174aa. The inlet channel 178aa may be arranged to pass through the first support member 174a and linked to the first circulation channel 178ab.

The first circulation channel 178ab is formed to guide the adhesive flowing into the inlet channel 178aa to the magnet combination channel 179. One end of the first circulation channel 178ab may be linked to an end of the inlet channel 178aa, and the other end may be linked to the magnet combination channel 179.

The first circulation channel 178ab may be formed on the inner side of the first support member 174a facing one side of the magnet 173. The first circulation channel 178ab may be formed to have a fluid path toward the centrifugal direction of the rotor shaft 172a, which runs from an end of the inlet channel 178aa up to the magnet combination channel 179.

The shape and arrangement of the first circulation channel 178ab is not limited, and while in the embodiment the first circulation channel 178ab is formed on the inner side of the first support member 174a, it may also be formed on the magnet 173 in the same shape.

The inlet 174aa may be formed to be separated from the rotor shaft 172b, and the inlet channel 178aa linked to the inlet 174aa may be formed to be separated in parallel from the rotor shaft 172a. The fluid path in which the adhesive is circulated is to be short to reduce pneumatic resistance of the adhesive, and on the contrary to this, the fluid path is to be long to stably combine the magnet 173 and the first support member 174a. Accordingly, the first circulation channel 178ab may be formed to be relatively longest by separating the inlet 174aa from the rotor shaft 172b and forming the fluid path of the inlet channel 178aa formed between the inlet 174aa and the first circulation channel 178ab to pass through the first support member 174a in a direction parallel to the rotor shaft 172a to make the fluid path short.

The second channel 178b is formed in the second support member 174b for an adhesive to be circulated between the second support member 174b and the other side of the magnet 173.

Specifically, it is formed for the adhesive to be circulated between the second support member 174b and the other side of the magnet 173 facing the second support member 174b. One end of the second channel 178b may be linked to the outlet 174bb of the second support member 174b. The other end of the second channel 178b may be linked to the magnet combination channel 179.

There may be one or more second channels 178b. If there are a plurality of second channels 178b, the positions are not limited. In the embodiment, they are arranged around the rotor shaft 172a at regular intervals in the circumferential direction for the adhesive to uniformly flow to the internal channel 177. Specifically, there may be three second channels 178b arranged around the rotor shaft 172a at intervals of 120 degrees. The arrangement of the second channels 178b may not correspond to the first channels 178a.

The second channel 178b may include an outlet channel 178ba and a second circulation channel 178bb.

The outlet channel 178ba is linked to the outlet 174bb. The outlet channel 178ba may be arranged to pass through the second support member 174a and linked to the second circulation channel 178bb.

The second circulation channel 178bb is formed to guide the adhesive that has passed the first channel 178a and the magnet combination channel 179 to the outlet channel 178ba. One end of the second circulation channel 178bb may be linked to an end of the outlet channel 178ba, and the other end may be linked to the magnet combination channel 179.

The second circulation channel 178bb may be formed on the inner side of the second support member 174b facing one side of the magnet 173. The second circulation channel 178bb may be formed to have a fluid path toward the radial direction of the rotor shaft 172a, which runs from the magnet combination channel 179 to an end of the outlet channel 178ba.b The shape and arrangement of the second circulation channel 178*bb* is not limited, and while in the embodiment, the second circulation channel 178*bb* is formed on the inner side of the second support member 174*b*, it may also be formed on the magnet 173 in the same shape.

The outlet 174*bb* may be formed to be separated from the rotor shaft 172*b*, and the outlet channel 178*ba* linked to the outlet 174*bb* may be formed to be separated in parallel from the rotor shaft 172*a*. The fluid path in which the adhesive is circulated is to be short to reduce pneumatic resistance of the adhesive, and on the contrary to this, the fluid path is to be long to stably combine the magnet 173 and the second support member 174*b*. Accordingly, the second circulation channel 178*bb* may be formed to be relatively longest by separating the outlet 174*bb* from the rotor shaft 172*b* and forming the fluid path of the outlet channel 178*ba* formed between the outlet 174*bb* and the second circulation channel 178*bb* to pass through the second support member 174*b* in a direction parallel to the rotor shaft 172*a* to make the fluid path short.

The support member 174 may include an anti-leakage groove 175.

The anti-leakage groove 175 is formed to prevent the adhesive circulating in the channel from leaking out of the rotor 172. The anti-leakage groove 175 may also be formed to contain the adhesive, firmly adhering the support member 174 and the magnet 173 together. The anti-leakage groove 175 may be formed adjacent to the channel in order for the adhesive circulating in the channel to be contained in the anti-leakage groove 175 when the adhesive leaks out of the channel.

The anti-leakage groove 175 may be formed in an adhesion part where the support member 174 and the magnet 173 come into contact to each other. The adhesion part has a planar shape as in the embodiment of the present disclosure, and makes face-to-face contact with the magnet 173. The anti-leakage groove 175 may be formed to be more sunken than the adjacent adhesion part to contain the adhesive, thereby improving efficiency of adhesion between the support member 174 and the magnet 173 and preventing the adhesive from leaking outside.

The anti-leakage groove 175 may include an inner anti-leakage groove 175*a* and an outer anti-leakage groove 175*b*.

There may be a plurality of inner anti-leakage grooves 175*a* formed between the plurality of the first and second channels 178*a* and 178*b*. That is, they may be arranged between the plurality of first circulation channels 178*ab* in the first support member 174*a*. They may also be arranged between the plurality of second circulation channels 178*bb* in the second support member 174*b*.

The inner anti-leakage grooves 175*a* may be formed around the rotor shaft 172*a* in the circumferential direction, each almost having an arc shape. As the inner anti-leakage grooves 175 are formed in the circumferential direction to make the magnet 173 and the support member 174 contact each other, both the components may not break apart even when the rotor 17 is rotated at a high speed.

The outer anti-leakage grooves 175*a* may be arranged on the outer side than the adhesion channel 178 in the adhesion part. In other words, the first circulation channel 178*ab* or the second circulation channel 178*bb* are formed in the adhesion part, and arranged around the rotor shaft 172*a* on the outer side for preventing the adhesive from leaking out of the channels.

The shape of the outer anti-leakage groove 175*a* is not limited, but in the embodiment of the present disclosure, it may be arranged in the form of a ring in the adhesion part to efficiently prevent leakage of the adhesive.

Furthermore, although not shown, a ring may be arranged in the outer anti-leakage groove 175*a*. The ring may be arranged in the outer anti-leakage groove 175*a* for preventing the adhesive from leaking outside through between an auxiliary member 174 and the magnet 173.

A method for manufacturing the rotor 172 will now be described.

In the rotor shaft 172*b*, the magnet 173 and a pair of support members 174 are combined each on one and the other sides of the magnet 173.

The inlet 174*aa* and the outlet 174*bb* are formed in a pair of the support members 174, which are connected to the internal channels 177 to circulate an adhesive.

When an adhesive flows in through the inlet 174*aa*, the adhesive passes the inlet channel 178*aa* and flows in the first circulation channel 178*ab* formed between the first support member 174*a* and the magnet 173.

The adhesive flowing in the first circulation channel 178*ab* passes the magnet combination channel 179 formed between the magnet 173 and the rotor shaft 172*b* and is guided to the second circulation channel 178*bb* formed between the magnet 173 and the second support member 174*b*.

The adhesive passing the second circulation channel 178*bb* is released out of the outlet channel 178*ba* through the outlet 174*bb*.

In this procedure, the adhesive fills the internal channel 177 and is hardened in a certain period of time, thereby combining the respective components.

If the adhesive passing the internal channel 177 is leaking out of the internal channel 177, it is supposed to be contained in the anti-leakage groove 175, more firmly combining the magnet 173 and the support member 174 together.

FIG. 15 is an exploded view of the rotor and the impeller, according to the first embodiment of the present disclosure, and FIG. 16 is a cross-sectional view of a combined rotor shaft and impeller, according to the first embodiment of the present disclosure.

The impeller 130 is configured to be rotated along with the rotor shaft 172*b*.

The impeller 130 may include an impeller body 131, a shaft combiner 133, and a plurality of wings 132.

The impeller body 131 is formed such that its cross-sectional area becomes smaller along the direction of the rotor shaft 172*a* and the air flowing along the direction of the rotor shaft 172*a* is discharged in the radial direction of the rotor shaft 172*a* as the impeller is rotated.

The plurality of wings 132 are formed on the impeller body 131, rotating with the impeller body 131 to form air currents. The plurality of wings 132 may be formed on the outer face of the impeller body 131. Specifically, the rotor 172 is arranged on the rear face of the impeller body 131, and the plurality of wings 132 are arranged in the front face of the impeller body 131 to form air currents.

A shaft combiner 133 is arranged on the impeller body 131 for the rotor shaft 172*b* to be combined with the impeller body 131. A shaft insert hole 133*a* is formed in the shaft combiner 133 for the rotor shaft 172*b* to be inserted thereto.

The shaft combiner 133 may include a shaft combining plane 134 corresponding to the outer circumferential face of the rotor shaft 172*b*. The inner diameter of the shaft combiner 133 formed by the shaft combining plane 134 is formed to correspond to the outer diameter of the rotor shaft 172*b*, for the rotor shaft 172*b* to be pressed into the shaft combiner 133.

How to combine the rotor shaft 172b to the shaft combiner 133 is not limited, and in the embodiment of the present disclosure, the impeller 130 and the rotor shaft 172b may operate as a unit body when the rotor shaft 172b is pressed into the shaft combiner 133.

A motor assembly 200 and cleaner 51 having the same in accordance with a second embodiment will now be described.

Features overlapping with what are described in the above embodiment will be omitted.

FIG. 17 is a perspective view of a cleaner, according to a second embodiment of the present disclosure, and FIG. 18 is a cross-sectional view of some features of the cleaner, according to the second embodiment of the present disclosure.

A cleaner 51 in accordance with the second embodiment of the present disclosure corresponds to a canister-type cleaner 51 unlike the cleaner 51 in the first embodiment. Although the types of the cleaners 51 in accordance with the first and second embodiments are different for convenience of explanation, it is possible to apply the motor assembly 200 in the second embodiment to the stick-type cleaner 51 in the first embodiment or to apply the motor assembly 200 in the first embodiment to the canister-type cleaner 51 in the second embodiment.

The cleaner 51 in the embodiment of the present disclosure includes a sucker 60, and a main cleaner body 62.

The main cleaner body 62 and the sucker 60 may be connected through a connecting hose 70 and a connecting tube 72 to deliver a sucking force produced by the main body, and an handle 74 may be arranged between the connecting hose 70 and the connecting tube 72 to be held by the user.

The connecting hose 70 may be formed of a flexible crumpled tube with one end connected to the main body and the other end connected to the handle 74, enabling the sucker 60 to be freely moved within a certain radius centered around the main body, and the connecting tube 72 may be formed to have a certain length with one end connected to the sucker 60 and the other end connected to the handle 74, enabling the user to hold the handle 74 to clean a surface to be cleaned on the floor while moving the sucker 60.

The connecting hose 70 is connected onto the front of the main cleaner body 62 for receiving sucked air.

The main cleaner body 62 has a motor assembly 200 and a dust bin 80 arranged therein. The motor assembly 200 may generate power to produce sucking force inside the main cleaner body 62, and the dust bin 80 may be located in the upper stream of air flow than the motor assembly 200 for filtering out dust or filth from the air flowing from the sucker 60.

FIG. 19 is a perspective view of a motor assembly, according to the second embodiment of the present disclosure, FIG. 20 is a cross-sectional view of the motor assembly, according to the second embodiment of the present disclosure, and FIG. 21 is an exploded view of the motor assembly, according to the second embodiment of the present disclosure.

The motor assembly 200 is arranged in the main cleaner body 62 for producing sucking force.

The motor assembly 200 may include a housing 202, a motor 270 installed inside the housing 202 for generating sucking force, a settling housing 242 for fixing the motor 270 in the housing 202, and an impeller 230 installed on a shaft of the motor 270 to be rotated.

The housing 202 includes a first housing 210, a second housing 220 to be combined with the first housing 210, and a third housing 228 combined on the rear side of the second housing 220. The housing 202 may be shaped almost like a cylinder, without being limited thereto, and may have other various forms. The first housing 210 and the second housing 220 may be detachably arranged in the axial direction of the rotor shaft 272a. The first housing 210 has an air sucking hole 211 through which air flowing in by the motor 270 flows to the inside of the housing 202, and the third housing 228 has an air discharging hole 229 to discharge the air flowing to the inside of the housing 202.

On the top of the first housing 210, a fluid path cut-off rib 214 is formed to prevent the air sucked with the motor 270 from leaking out without being sucked into the air sucking hole 211. The fluid path cut-off rib 214 is arranged outside of the air sucking hole 211 on the top of the first housing 210. At least one fluid path cut-off rib 214 may be arranged by forming a concentric circle centered on the air sucking hole 211 on the top of the first housing 210.

Since the third housing 228 is combined with the second housing 220 on the rear side of the second housing 220 combined on the rear side of the first housing 210, the air sucking hole 211 may be on the front side of the housing 202 and the air discharging hole 229 may be on the back. Arrangement of the air sucking hole 211 and the air discharging hole 229 is, however, not limited thereto.

The first housing 210, the second housing 228, and the third housing 228 are combined to form an air fluid path 213 leading from the air sucking hole 211 to the air discharging hole 229 and form an internal space 227 in which the motor 270 or the impeller 230 are arranged.

The air fluid path 213 may include a module fluid path 213a and a module outside fluid path 213b. In the motor assembly 200, air is sucked in by the impeller 230 and the sucked air is circulated in the air fluid path 213. The air flowing into the housing 202 may be circulated in the module fluid path 213a running to the inside of the motor module 240 and in the module outside fluid path 213b passing between the outside of the motor module 240 and the inside of the housing 202. The sucked air passing the module fluid path 213a may cool down from the heat produced from the inside of the motor module 240. The sucked air passing the module fluid path 213a and passing the module outside fluid path 213b may cool down from the heat produced from a circuit board 298 while passing the circuit board 298.

The first housing 210 may include a shroud 212.

The shroud 212 is arranged to correspond to the impeller 230 or a diffuser 222, as will be described later, for guiding air flowing into the housing 202 by the motor 270.

The shroud 212 may be formed such that a space formed by the shroud 212 becomes wider along the axial direction of the rotor shaft 272a, in order for a fluid path to be wider in a direction in which air sucked by the motor 270 from the air sucker 211 proceeds. The shroud 212 enables the air flowing through the air sucking hole 211 to be guided into the housing 202, and may be formed to have a form that matches the top of the impeller 230.

The impeller 230 may be arranged on the inner side of the air sucking hole 211 of the first housing 210. The impeller 230 is arranged to be rotated with the rotor shaft 272a. A plurality of wings 232 may be formed on the impeller 230 to make air flow. The impeller 230 is formed such that a radius of rotation of the plurality of wings 232 of the impeller 230 becomes smaller as it gets distant from the rotor 272 and the air flowing in along the direction of the rotor shaft 272a according to the rotation of the impeller 230 is discharged in the radial direction of the rotor shaft 272a.

The shape and position of the impeller 230 is not limited thereto, but the impeller 230 may have any other shape and position as long as it enables air to be circulated.

The second housing 220 may include a diffuser 222. The diffuser 222 is arranged to increase the velocity of an air fluid moving by the impeller 230. It is located around the outer circumference along the radial direction of the impeller 230.

The diffuser 222 may be radially arranged with respect to the impeller 230. Specifically, it may be formed in a direction the plurality of wings 232 of the impeller 230 extend. The diffuser 222 may be formed with a plurality of ribs 223, 224, which may be formed with the gap that gets wider in the direction the plurality of the wings 232 extend. The plurality of ribs 223, 224 are formed to increase the velocity of a moving air fluid while guiding the air flowing by the impeller 230. Specifically, the diffuser 222 and the shroud 212 formed in the first housing 210 form a diffuser fluid path 225, guiding the air moving by the impeller 230 and increasing the velocity of the moving air fluid.

The plurality of ribs 223, 224 may include first ribs 223 and second ribs 224. The first ribs 223 are arranged on the same plane as a cross-sectional part in the downstream of the air circulation by the impeller 230, and the second ribs 224 are arranged to have a certain inclination to the direction of the rotor shaft 272a such that the air guided by the first ribs 223 moves along the vertical direction, the direction of the rotor shaft 272a in the housing 202.

The motor module 240 may be arranged inside the housing 202. The motor module 240 is arranged for the motor 270 to be fixed as a single module inside the housing 202.

The motor module 240 may include the motor 270 and the settling housing 242.

The settling housing 242 may include a front settling housing 250 and a rear settling housing 260 to be combined with the front settling housing with the motor 270 in between.

The front settling housing 250 is arranged to be fixed to the housing 202. Specifically, a settling hole 226 shaped like a hole is formed in the center of the second housing 220 for being combined with the front settling housing 250, and the front settling housing 250 may be combined into the settling hole 226.

They may be combined by fitting together, without being limited thereto.

The front settling housing 250 may include a front settling housing body 251, an impeller settler 253, and a front settler 254. The front settling housing body 251 may be shaped almost like a disc, and as described above, may include a body combiner 252 matching the shape of the settling hole 226 to be combined in the settling hole 226 in the shape of a hole of the second housing 220.

The impeller settler 253 is formed for the impeller 230 to be settled on the front of the front settling housing body 251. The front of the impeller settler 253 is formed to correspond to the shape of a rear face of the impeller 230 not to interfere with rotation of the impeller 230 combined with the rotor shaft 272a.

The front settler 254 is formed on the rear face of the front settling housing body 251 for the motor 270 to be settled. The front settler 254 is arranged to settle and fix a stator 280 such that the center of the rotor 272 arranged to be able to rotate corresponds to a rotation center of the impeller 230.

The shape of the front settler 254 is not limited thereto, and in an embodiment of the present disclosure, the front settler 254 is formed to protrude from the front settling housing body 251 for the front settling housing body 251 and the motor 270 to be settled therein with a certain gap.

The position of the front settler 254 is not limited thereto, but in the embodiment of the present disclosure, since the stator 280 is formed to extend long in a first direction w1, there may be four front settlers 254 arranged to correspond to the respective ends of the stator 280.

The rear settling housing 260 is formed to be combined with the front settling housing 250 with the motor 270 between the rear settling housing 160 and the front settling housing 250.

The rear settling housing 260 may include a rear settling housing body 261, and a rear settler 264. The rear settling housing body 261 may be formed to extend long in the first direction w1, an elongate direction of the stator 280 to correspond to the shape of the stator 280.

The front settling housing 250 and the rear settling housing 260 have screw holes 251b, 261b for combination, and are combined together by screws 248.

A structure of fixing the motor 270 inside of the front and rear settling housings 250 and 260 will be described later in detail.

FIGS. 22A and 22B are exploded views of a motor module, according to the second embodiment of the present disclosure.

In the center of the front and rear settling housings 250 and 260, a front through hole 251a and a rear through hole 261a are formed, respectively, for the rotor shaft 272a to pass through. In the front and rear through holes 251a and 261a, front and rear bearings 273a and 273b may be arranged, respectively, for rotation of the rotor shaft 272a.

The front settling housing 250 may include a front settling housing body 251, a front settler 254, and a front auxiliary settler 255.

The front settling housing body 251 is shaped almost like a circle.

The front settler 254 is arranged on the inner side of the front settling housing body 251 for a side of the motor 270 to be settled therein. The front settler 254 may be formed on the rear side of the front settling housing body 251. To make the center of the rotor 272, the impeller 230, and the diffuser 222 aligned while the stator 280 is settled or fixed in the front settler 254, the front through hole 251a may be formed in the middle of the plurality of front settlers 254.

The front auxiliary settler 255 is arranged on the inner side of the front settling housing 250. Unlike in the first embodiment, the motor 270 may further include an auxiliary stator 287, and may be arranged for a part of the auxiliary stator 287 to be settled, thereby stably supporting the center part of the motor 270 formed in the elongate direction.

The front auxiliary settler 255 is formed to protrude from the front settling housing body 251, and there are a pair of the auxiliary stators 287 arranged, and accordingly, there are a pair of the front auxiliary settlers 255 arranged to correspond to them.

The front settling projection 256 is formed to enclose at least a part of the outer face of the stator 280 to prevent the position of the motor 270 from being twisted to a direction perpendicular to the rotor shaft 272a while the motor assembly 200 is operating.

The front settling projection 256 is formed to protrude further than the front auxiliary settler 255 from the front settling housing body 251 to enclose the auxiliary stator 287. The front settling projection 256 may be arranged with the front auxiliary settler 255 to correspond to the auxiliary stator 287, and more particularly, arranged to enclose the outer face of the auxiliary stator 287. In other words, the front of the motor 270 is settled in the front settler 254 and the front auxiliary settler 255, and the side of the motor 270 is settled in the front projection settling plane 256a of the front settling projection 256. A front guide plane 256b may be formed on the front settling projection 256 to guide the motor 270 to be easily settled in the front settler 254. The front guide plane 256b is formed on an end of the front settling projection 256 to have a certain angle of slope inward and may be connected to the front projection settling plane 256a.

The rear settling housing 260 may include a rear settling housing body 261, a rear settling projection 266, and a rear settler 264.

The rear settling housing body 261 may be formed to extend long in the elongate direction of the stator 280 to correspond to the shape of the stator 180.

The rear settling projection 266 is formed to protrude forward from the rear settling housing body 261 to support a side of the stator 280. Along with the front settling projection 256, the rear settling projection 266 prevents the position of the motor 270 from being twisted to a direction perpendicular to the rotor shaft 272a while the motor assembly 200 is operating.

The rear settling projection 266 may include a first rear settling projection 266a and a second rear settling projection 266b.

The first rear settling projection 266a is formed to fix an end of the first direction w1, which is the elongate direction of the stator 280, and the second rear settling projection 266b is formed to fix an end of the second direction w2 perpendicular to the first direction w1. That is, an end of the main stator 281 is fixed to the first rear settling projection 266a and the auxiliary stator 287 is fixed to the second rear settling projection 266b.

The rear settler 264 may be formed on the inner side of the first and second rear settling projections 266a and 266b, and arranged for the other side of the motor 270 to be settled and supported. Specifically, the rear settler 264 may include a first rear settler 264a arranged on the inner side of the first rear settling projection 266a and a second rear settler 264b arranged on the inner side of the second rear settling projection 266b.

The rear settling projection 266 may include a rear guide plane 267b formed to have a certain angle of slope toward the inner side of the projection for guiding the motor 270 to be easily settled in the first and second rear settlers 264a and 264b. Specifically, the back face of the motor 270 is settled in the rear settler 264, and a side of the motor 270 is settled in a rear projection settling plane 267a of the rear settling projection 266. A rear guide plane 267b may be formed on the rear settling projection 266 to guide the motor 270 to be easily settled in the rear settler 264. The rear guide plane 267b may be formed on an end of the rear settling projection 266 to have a certain angle of slope, and may be connected to the rear projection settling plane 267a.

The body of the rear settling housing 260 may be formed to extend long in the elongate direction of the stator 280, to correspond to the shape of the stator 180 as will be described later. There may be four rear settling projections 266 arranged at positions that go against the front settling projections 256 of the front settling housing 250. That is, the front settling projection 256 and the rear settling projection 266 may be alternately arranged to more firmly support the motor 270.

A magnet sensor 244 may be arranged in the rear settling housing 260.

The magnet sensor 244 is located on the same axis and same line with a magnet 245 of the rotor 272 to detect the position of the rotating rotor 272. This information is delivered to a position sensor (not shown) on the circuit board 298, enabling position control of the rotor 272.

The magnet sensor 244 may be arranged to be settled in a sensor bracket 246, for delivering information to the position sensor (not shown) on the circuit board 298. The sensor bracket 246 has one end that may be combined with the sensor settler 268 arranged on the rear side of the rear settling housing 260 and the other end that may be combined onto the circuit board 298. With the magnet sensor 244 arranged on the rotor 272 instead of a direct position sensor, position control of the rotor 272 may be realized by adding a simple structure.

The front settling housing 250 and the rear settling housing 260 have screw holes 251b, 261b for combination, and are combined together by screws 248. Specifically, in the embodiment, the screws 148 are prepared for the two front auxiliary settlers 255 and two rear settlers 264 one for each, such that the screws 248 may pass through the screw holes 261b of the rear settlers 264b and may be combined with the screw holes 251b of the corresponding front auxiliary settlers 255. That is, the front settling housing 250 and the rear settling housing 260 may be combined and fixed to each other with two screws 248.

FIG. 23 is an exploded view of a motor, according to the second embodiment of the present disclosure.

The motor 270 may include the rotor 272 and the stator 280.

The rotor 272 is arranged to be able to rotate in the center of the stator 280.

The stator 280 is formed to electromagnetically interact with the rotor 272.

The stator 280 may include a main stator 281 and an auxiliary stator 287.

The main stator 280 may include a main stator body 282, and at least one main stator core 283 arranged to extend from the main stator body 282.

There are a pair of the main stator bodies 282 arranged in the first direction w1 to face each other with the rotor 272 in between. In other words, a pair of the stator bodies 282 may be arranged lengthwise to face each other. The pair of stator bodies 282 may be arranged to be combined with each other in the first direction w1, the elongate direction. In other words, it is not that the main stator 281 is arranged in a round form along the circumferential direction, it is that the main stator 281 is arranged to enclose the rotor 272 such that a length formed in the first direction w1 may be longer than a length formed in the second direction w2 perpendicular to the first direction w1. That is, let the length of the stator 280 formed in the first direction w1 be L1 and the length formed in the second direction w2 be L2, and L1 may be greater than L2.

The main stator core 283 includes a center core 284 and side cores 285 arranged on either side to the center core 284.

The center cores 284 are arranged to face each other with the rotor 272 in the center, and the rotor receptor 291 is formed between the center cores 284 such that the rotor 272 is able to rotate in the rotor receptor 187a. A pair of the side cores 285 may be arranged to either side of the center core 284, and may be aligned in parallel with the center core 284.

Stator slots 283a are formed between the center core 284 and the side cores 285. As the coil 299 is wound around the center core 284, the coil 299 is received in the stator slots 283a. A main extended core part 284a obtained by partially expanding the width of the center core 284 is formed on the inner end of the center core 284 adjacent to the rotor 272. Specifically, the main extended core part 284a is formed from the partially expanded width of the center core 284 to wrap around the rotor 272 on the inner end of the center core 284 directed to the rotor 272. A gap 284b is formed between the inner side of the main extended core part 284a and the outer side of the rotor 272 for rotation of the rotor 272.

The auxiliary stator 287 is arranged to electromagnetically interact with the rotor 272 along with the main stator 281. The auxiliary stators 287 may be arranged to face each other with the rotor 272 in between in the other direction perpendicular to the one direction. There may be a pair of the auxiliary stators 287 arranged to face each other with the rotor 272 in between between a pair of the main stator bodies 282.

The auxiliary stator 287 may include an auxiliary stator body 288, and at least one auxiliary stator core 289 arranged to extend from the auxiliary stator body 288.

The auxiliary cores 289 may be arranged to face each other with the rotor 272 in between and extend shorter than the center core 284 in the other direction perpendicular to the one direction. A rotor receptor 291 is formed between the auxiliary cores 289 for the rotor 272 to be rotated. That is, the rotor receptor 291 may be formed between a pair of the center cores 284 and a pair of the auxiliary cores 289.

An auxiliary extended core part 289a obtained by partially expanding the width of the auxiliary core 289 is formed on the inner end of the auxiliary core 289 adjacent to the rotor 272. Specifically, the auxiliary extended core part 289a is formed from the partially expanded width of the auxiliary core 289 to wrap around the rotor 272 on the inner end of the auxiliary core 289 directed to the rotor 272. A gap 284b is formed between the inner side of the auxiliary extended core part 289a and the outer side of the rotor 272 for rotation of the rotor 272.

The main stator 281 and the auxiliary stator 287 may be formed by piling up press-processed iron plates.

The main stator 281 may include a main combiner 286 formed to bend from an end of the side core 285 to an outer side.

The main stator 281 may include a main combiner 286 formed at an end of the side core 285 to bend to an outer side. The main combiner 286 is formed to increase intensity of a combined part when combined with the auxiliary stator 287 and stably support the motor 270 in the settling housing 242. In other words, the main combiner 286 has a larger thickness than the adjacent main stator 281 by being combined with the auxiliary stator 287. This configuration may increase intensity of the combined part of the main stator 281 and the auxiliary stator 287 and allow them to be stably supported in the front auxiliary settler 255 and the second rear settler 264b.

Combining grooves 286b may be formed in the main combiner to be combined with the auxiliary stator 287, and combining projections 288a may be formed in the auxiliary stator 287. Specifically, the auxiliary stator 287 may be arranged between a pair of main combiners 286 facing each other, and the main stator 281 and the auxiliary stator 287 may be combined by combination of the combining grooves 286b formed in the respective main combiners 286 and the combining projections 288a formed on both sides of the auxiliary stator 287.

The auxiliary stator 287 may include a contact flange 290 and a fixing groove 288b.

The contact flange 290 may be formed to extend along a direction toward the main stators 281 arranged on either side from the auxiliary stator body 288 and arranged on the inner side of the main combiners 286. The main combiner 286 includes a concave combining plane 286a for the contact flange 290 to be settled therein, and the contact flange 290 includes a convex flange settling plane 290a to correspond to the combining plane 286a. Although the combining plane 286a and the flange settling plane 290a have concave and convex forms, respectively, it is not limited thereto as long as they are formed to make face-to-face contact with each other. The combining plane 286a and the flange settling plane 290a are formed to have slopes to one and the other directions in order for the auxiliary stator 287 to not easily fall away from the main stator 281.

When the contact flange 290 is settled inside the main combiner 286, it prevents the auxiliary stator 287 from moving from the inside of the main combiner 286 to the outer direction.

The fixing groove 288b is formed at an end of the edge of the auxiliary stator body 288 to be sunken from the auxiliary stator body 288. When the front settling housing 250 and the rear settling housing 260 are combined, the side of the screws 248 comes in the fixing groove 288b, supporting one side of the auxiliary stator 287 by being settled in the fixing groove 288b.

The insulator 294 is formed of an electrically insulating material to wrap a part of the stator 280 and wrap around the center core 284. The insulator 294 includes an insulator body 295 arranged to correspond to the body of the stator 280, a center core supporter 296 arranged in the insulator body 295 to correspond to the center core 284, and a coil guide 297 protruding from an inner side of the radial direction in the center core supporter 296.

The insulator 294 may include a body combiner 295a. The body combiner 295a is arranged on a side of the insulator body 295 to guide the coil 299 to be wound around the motor 270 to the circuit board 298. The body combiner 295a may be inserted and fixed to the circuit board 298 for combining the motor 270 and the circuit board 298.

The coil 299 is wound around the center core 284 and over to the center core supporter 296 while the insulator 294 is combined with the stator body 280. It could be wound around the side core 285 and over to the insulator 294 wrapping around the side core 285, but in the embodiment of the present disclosure, winding around the center core 284 and over to the center core supporter 296 will only be described.

The insulator 294 may include core reinforcers 295b. The core reinforcers 295b are arranged outside of the stator 280 to support the stator 280 vertically. In the embodiment of the present disclosure, the core reinforcers 295b are arranged outside of the side core 285 to support the side core 285 vertically. Since the stator 280 is formed by piling up press-processed iron plates, being supported vertically by the core reinforcers 295b may improve durability of the stator 280.

Although in this embodiment, the fluid path guide as in the first embodiment is omitted, it is possible to apply the fluid path guide in this embodiment.

As the stator 280 is formed in the first direction w1, an arrangement area 292 may be formed around the rotor 272 along the circumferential direction of the stator 280. That is, the arrangement area 292 may be formed in a part perpendicular to the elongate direction of the stator 180.

The arrangement area 292 is an area formed on the same plane with the stator 280, which improves space utility of an internal space 227 of the motor assembly 200. The arrangement area 292 may be shaped almost like a half circle, in which the components of the motor assembly 200 may be arranged and in an embodiment of the present disclosure, a capacitor 298b may be arranged.

There may be a pair of arrangement areas 292 formed on either side of the stator 280, and there may also be a pair of capacitors 298b. In an embodiment of the present disclosure, a total of four may be arranged by two for each arrangement area 292. The capacitor 298b has functions of flattening the voltage or eliminating ripples.

FIG. 24 shows arrangement relations between a circuit board and a motor, according to the second embodiment of the present disclosure.

The circuit board 298 may be arranged under the motor 270 to deliver electric signals to the motor 270. On a side of the circuit board 298, there may be a mounting area 298a in which circuit elements are arranged. In the mounting area 298a, circuit elements, such as heating devices, capacitors 198, etc., may be arranged.

Since the motor 270 needs to receive electrical signals from the circuit board 298, and the heat generated from the circuit board 298 may be eliminated through air flow produced by operation of the motor 270, the circuit board 298 may be arranged to be adjacent to the motor 270. However, in reality, it grows unnecessary space to avoid interference between the circuit elements and the motor 270, and thus the motor assembly 200 grows bigger.

In an embodiment of the present disclosure, the motor 270 is arranged to extend long in a direction, and the arrangement area 292 may be on the same plane. In other words, on both sides of the stator 280 formed along a direction, which is an elongate direction, the arrangement area 292, which is an affordable space arranged for other components of the motor assembly 200 to be arranged therein, may be formed. In an embodiment of the present disclosure, since the housing 202 has almost a round form or the impeller 230 is formed in a round shape, the arrangement area 292 may be arranged in the form of a half circle having arcs with a regular interval.

In the mounting area 298a of the circuit board 298, electric devices may be arranged in an area that overlaps the arrangement area 292 of the motor 270 to avoid interference with the arrangement of the motor 270.

Although the capacitor 298b is arranged as an example in the embodiment, other electric devices may also be arranged in the arrangement area 292.

This arrangement may enable the motor 270 and the circuit board 298 to be arranged even closer to each other, space utilization inside the housing 202 may be improved.

FIG. 25 is a front view of the motor, according to the second embodiment of the present disclosure, and FIG. 26 shows flows of magnetic fields of the motor, according to the second embodiment of the present disclosure.

The stator 280 may be symmetrically arranged around the rotor 272.

A pair of main extended core parts 284a and a pair of auxiliary extended core parts 289a that form gaps 284b with the outer face of the rotor 272 around the rotor 272 may be arranged to have centers of their curved faces go against to each other.

Specifically, a pair of main extended core parts 284a and a pair of auxiliary extended core parts 289a are each formed to enclose the outer face of the rotor 272, and arranged to have a center of the internal face of one main extended core part 284a or a center of the internal face of one auxiliary extended core part 289a go against to a center of the internal face of the other main extended core part 284a or a center of the internal face of the other auxiliary extended core part 289a.

With this feature, a pair of the extended core parts 284a or a pair of the auxiliary extended core parts 289a enclosing the rotor 272 give electromagnetic affection in mutually different magnitudes and directions for the rotor 272 to be rotated in a direction.

The stator bodies 282, 288 may include a direction check groove 282a formed to check a combination direction of the stator. Assume that it is applied for the main stator body 282 in the embodiment of the present disclosure. The position of the direction check groove 282a is not limited, and may be formed on one side to distinguish left and right directions of the main stator body 282. As described above, a center of the internal face of one main extended core part 284a or a center of the internal face of one auxiliary extended core part 289a and a center of the internal face of the other main extended core part 284a or a center of the internal face of the other auxiliary extended core part 289a are formed to go against to each other. That is, the main extended core part 284a or auxiliary extended core part 289a is formed to have one end closer to the rotor than the other end.

In combining a pair of the stator bodies 282, 288, if one ends close to the rotor from the main extended core parts 284a or auxiliary extended core parts 289a are aligned in the same direction because the stator bodies 282, 288 are combined without distinguishing the left and right directions, a starting torque required for initial rotation of the rotor 272 does not occur. Accordingly, a pair of the stator bodies 282, 288 may be combined such that the direction check grooves 282a formed on the stator bodies 282, 288 are symmetrically arranged around the rotor 272, thereby facilitating occurrence of the starting torque required for the initial rotation of the rotor. Although the direction check grooves 282a are illustrated and described in the embodiment, they may be applied in any other embodiments.

FIG. 26 shows production of magnetic fields formed across the stator 280 and the rotor 272.

As a current is supplied to the motor 270, a magnetic field is produced while the stator 280 and the rotor 272 are electromagnetically interacting with each other. The magnetic field is produced across the stator 280 and the rotor 272 due to changes in polarity according to rotation of the rotor 272.

A procedure of assembling the motor assembly 200 in accordance with an embodiment of the present disclosure will now be described.

Referring to FIG. 23, a pair of main stator bodies 282 are combined with a pair of auxiliary stators 287 in between. In other words, the stator 280 is formed by arranging and combining the auxiliary stators 287 between opposite side cores 285 of a pair of the main stator bodies 282.

At least a part of the stator 280 are covered by the insulator 294 for electrical insulation.

Referring to FIGS. 22A, 22B, the extended core part and the gap 284b are formed in the rotor receptor 291 formed in the stator 280 combined with the insulator 294, and the rotor 272 is inserted thereto, fixing the motor 270 to the settling housing 242 as a module.

Specifically, one side and the other side of the motor 270 are settled in the front settler 254 of the front settling housing 250 and the rear settler 264 of the rear settling housing 260, respectively, and sides of the motor 270 are settled to the front settling projection 256 and the rear settling projection 266.

Furthermore, the rotor shaft 272a passes through a through hole of the settling housing 242 to make the concentric of the rotor 272 and the stator 280 aligned even in settling and combining the motor 270 in the settling housing 242.

The front settling housing 250 and the rear settling housing 260 may be combined together by screws 248, without being limited thereto.

This procedure may arrange the motor 270 and the settling housing 242 in a motor module 240.

Referring to FIG. 21, the motor module 240 may be combined in the settling hole 226 of the second housing 220. Specifically, a body combiner 252 of the front settling housing 250 may be combined in the settling hole 226 of the second housing 220.

The impeller 230 may be combined with the rotor shaft 272a in front of the motor module 240. Specifically, the impeller 230 may be arranged in an impeller settler 253 of the front settling housing 250.

The first housing 210 may be combined on the front of the second housing 220. The shroud 212 is arranged on the inner side of the first housing 210, forming a fluid path extending to the inside of the housing 202 with the impeller 230, and a diffuser.

A capacitor 298b may be arranged in the arrangement area 292 of the motor 270 in the back of the motor module 240, and the circuit board 298 may be combined to not interfere the motor 270 and the electric elements with each other. Specifically, it is arranged to be mechanically combined with the circuit board 298 through a circuit combiner combined with the insulator 294, and for the coil 299 arranged in the motor 270 to be electrically combined with the circuit board 298.

Once the motor module 240 is combined with the housing 202 and the circuit board 298, the motor assembly 200 may be assembled.

FIG. 27 shows a graph of performance of the motor, according to the second embodiment of the present disclosure.

The horizontal axis represents the phase of counter electromotive force, and the vertical axis represents the magnitude of the counter electromotive force. A dashed plot represents counter electromotive force for the motor 170 having a pair of the stator bodies 182 arranged in the first direction w1 as in the first embodiment, and a solid plot represents counter electromotive force for the motor with the stator 280 having the main stator 281 and the auxiliary stator 287 as in the second embodiment.

In the case of having the auxiliary stator 287, unlike the motor 170 without the auxiliary stator 287 as in the first embodiment, the counter electromotive force increases, facilitating volume expansion. Facilitation of the volume expansion may make it possible to expand the volume without increasing pileup of the stator. That is, the volume may be expanded even without increasing the size of the stator. Consequently, the size of the motor 270 may be miniaturized.

A motor assembly and cleaner having the same in accordance with a third embodiment will now be described.

Features overlapping with what are described in the above embodiments will be omitted.

FIG. 28 shows a stator, according to a third embodiment of the present disclosure.

In the embodiment, there is a stator 380 having a different form from that in the second embodiment. In the embodiment, the shape and combined structure of the stator 380 is different from what is in the second embodiment.

A motor 370 may include a main stator 381 and an auxiliary stator 387.

The auxiliary stator 387 may include an auxiliary stator body 388, and at least one auxiliary stator core 389 arranged to extend from the auxiliary stator body 388.

The auxiliary stator body 388 may be formed to have thicker width than a side core 385 of the adjacent main stator 281 for reinforcing intensity of a combined portion. Specifically, the outer side of the auxiliary stator body 388 may be formed to be swollen with respect to the inner side.

The auxiliary cores 389 may be arranged to face each other with a rotor 372 in between and extend shorter than the center core 384 in the other direction perpendicular to the one direction. A rotor receptor 391 is formed between the auxiliary cores 389 for the rotor 372 to be rotated. That is, the rotor receptor 391 may be formed between a pair of the center cores 384 and a pair of the auxiliary cores 389.

An auxiliary extended core part 389a obtained by partially expanding the width of the auxiliary core 389 is formed on the inner end of the auxiliary core 389 adjacent to the rotor 372. Specifically, the auxiliary extended core part 389a is formed from the partially expanded width of the auxiliary core 389 to wrap around the rotor 372 on the inner end of the auxiliary core 389 directed to the rotor 372. A gap 384b is formed between the inner side of the auxiliary extended core part 389a and the outer side of the rotor 372 for allowing rotation of the rotor 372.

The auxiliary stator 387 may include an air barrier. The air barrier is formed to have big resistance to the flows of magnetic fields, changing the flow of the magnetic fields. This may promote the flow of the magnetic fields. In the embodiment, the air barrier may be formed in the shape of a hole in the auxiliary stator body 388 and formed on an outer side to the auxiliary core 389.

The main stator 381 is arranged on an end of the side core 285, and may have combining grooves 386b formed to be combined with the auxiliary stator 387, and combining projections 388a may be formed in the auxiliary stator 387. The main stator 381 and the auxiliary stator 387 may be combined as the combining projections 288a are inserted into the combining grooves 386b.

Main stator bodies 382, main stator cores 383, main extended core parts 384a, stator slots 383a, main combiners 386, arrangement areas 392 will not be described because they are the same as described in the above.

An assembly of a motor 470 and cleaner having the same in accordance with a fourth embodiment will now be described.

Features overlapping with what are described in the above embodiments will be omitted.

FIGS. 29 and 30 are perspective views of motor modules, according to a fourth embodiment of the present disclosure, FIG. 31 is a perspective view of a front settling housing, according to the fourth embodiment of the present disclosure, FIG. 32 is a perspective view of a rear settling housing, according to the fourth embodiment of the present disclosure, FIG. 33 shows a motor, according to the fourth embodiment of the present disclosure, and FIG. 34 shows arrangement of the motor and settling housing, according to the fourth embodiment of the present disclosure.

In the embodiment, there is a stator 480 having a different form from that in the third embodiment.

In the embodiment, the shape of the stator 480 and combined structure of a settling housing 442 are different from what are in the third embodiment.

An auxiliary stator 487 may include an auxiliary stator body 488, and at least one auxiliary stator core 489 arranged to extend from the auxiliary stator body 488.

The auxiliary stator body 488 may be formed to have the same width as a side core 485 of the main stator 481. Specifically, an outer side of the side core 485 and an outer side of the auxiliary stator body 488 may be aligned on the same plane.

Unlike the stator 480 in the second and third embodiments, there is no projections protruding from the side of the stator 480, which may make an arrangement area 492 bigger than the stator 480 in the second and third embodiments in the same housing.

The auxiliary cores 489 may be arranged to face each other with a rotor 472 in between and extend shorter than the center core 484 in the other direction perpendicular to the one direction. A rotor receptor 491 is formed between the auxiliary cores 489 for the rotor 472 to be rotated. That is, the rotor receptor 491 may be formed between a pair of the center cores 484 and a pair of the auxiliary cores 489.

An auxiliary extended core part 489a obtained by partially expanding the width of the auxiliary core 489 is formed on the inner end of the auxiliary core 489 adjacent to the rotor 472. Specifically, the auxiliary extended core part 489a is formed from the partially expanded width of the auxiliary core 489 to wrap around the rotor 472 on the inner end of the auxiliary core 489 directed to the rotor 472. A gap 484b is formed between the inner side of the auxiliary extended core part 489a and the outer side of the rotor 472 for rotation of the rotor 472.

The main stator 481 is arranged on an end of the side core 485, and may have combining projections formed to be combined with the auxiliary stator 487, and combining grooves 488a may be formed in the auxiliary stator 487. The main stator 481 and the auxiliary stator 487 may be combined as the combining projections are inserted into the combining grooves 488a.

The stator 480 may be fixed by a settling housing 442.

The front settling housing 450 may include a front settling housing body 451, a front settler 454, and a front auxiliary settler 455. The front settling housing body 451 may be shaped almost like a disc.

The front settler 454 is formed on the rear face of the front settling housing body 451 for the motor 470 to be settled. The front settler 454 is arranged to settle and fix the stator 480 such that the center of the rotor 472 arranged to be able to rotate between the stators 480 corresponds to a rotation center of the impeller. The front settler 454 is arranged on the inner side of the front settling housing body 451 for a side of the motor 470 to be settled therein. The front settler 454 may be formed on the rear side of the front settling housing body 451.

The shape of the front settler 454 is not limited thereto, and in an embodiment of the present disclosure, the front settler 454 is formed to protrude from the front settling housing body 451 for the front settling housing body 451 and the motor 470 to be settled therein with a certain gap.

The position of the front settler 454 is not limited thereto, but in the embodiment of the present disclosure, since the stator 480 is formed to extend long in the length direction, there may be four front settlers 454 arranged to correspond to the respective ends of the stator 480.

The front auxiliary settler 455 is arranged on the inner side of the front settling housing 450. The front auxiliary settler 455 is formed for an auxiliary stator 487 to be settled therein, thereby stably supporting the center part of the motor 470 formed in the elongate direction.

The front auxiliary settler 455 is formed to protrude from the front settling housing body 451, and there are a pair of the auxiliary stators 487 arranged, and accordingly, there are a pair of the front auxiliary settlers 455 arranged to correspond to them.

The front settling housing 450 may include a front settling projection 456. The front settling projection 456 is formed to enclose at least a part of the outer face of the stator 280 to prevent the position of the stator 480 from being twisted to the left or right direction while the motor assembly 470 is operating.

The front settling projection 456 is formed to protrude further than the front settler 454 from the front settling housing body 451 to enclose the main stator 481 on the inner side. The front settling projection 456 may be arranged with the front auxiliary settler 455 to correspond to the main stator 481, and more particularly, arranged to enclose the outer face of the main stator 481.

The front settling projection 456 may include a front projection settling plane 456a in which a side of the motor 470 is settled, and a front guide plane 456b formed to extend from the front projection settling plane 456a and have a certain angle of slope inward to facilitate settling of the motor 470.

The rear settling housing 460 is formed to be combined with the front settling housing 450 with the motor 470 between the rear settling housing 460 and the front settling housing 450.

The rear settling housing 460 may include a rear settling housing body 461, a rear settler 464, and a rear settling projection 466. The rear settling housing body 461 may be formed to extend long in the elongate direction of the stator 480 to correspond to the shape of the stator 480.

The rear settler 464 is formed on the front face of the rear settling housing body 461 for the motor 470 to be settled. The front settler 454 is arranged to settle and fix the stator 480 such that the center of the rotor 472 arranged to be able to rotate between the stators 480 corresponds to a center of the impeller. The rear settler 464 is arranged on the inner side of the rear settling housing body 461 for the other side of the motor 470 to be settled therein.

The shape of the rear settler 464 is not limited thereto, and in an embodiment of the present disclosure, the rear settler 464 is formed to protrude from the rear settling housing body 461 for the front settling housing body 461 and the motor 470 to be settled therein with a certain gap.

The position of the rear settler 464 is not limited thereto, but in the embodiment of the present disclosure, since the stator 480 is formed to extend long in the length direction, there may be four rear settlers 464 arranged to correspond to the respective ends of the stator 480.

The rear auxiliary settler 465 is arranged on the inner side of the rear settling housing 460. The rear auxiliary settler 465 is formed for an auxiliary stator 487 to be settled therein, thereby stably supporting the center part of the motor 470 formed in the elongate direction.

The rear auxiliary settler 465 is formed to protrude from the rear settling housing body 461, and there are a pair of the auxiliary stators 487 arranged, and accordingly, there are a pair of the rear auxiliary settlers 465 arranged to correspond to them.

The rear settling projection 466 is formed to protrude from the body of the rear settling housing 460 along the edge of the rear settler 464 to enclose the motor 470 on the inner side. In combining the motor 470 and the rear settling projection 466, to facilitate settlement of the motor 470 in the rear settler 464, a rear guide plane 467b may be formed in the rear settling projection 466 to have a certain angle of slope. Specifically, the back face of the motor 470 is settled in the rear settler 464, and a side of the motor 470 is settled in a rear projection settling plane 467a of the rear settling projection 466. A rear guide plane 467b may be formed on the rear settling projection 466 to guide the motor 470 to be easily settled in the rear settler 464. The rear guide plane 467b maybe formed on an end of the rear settling projection 466 to have a certain angle of slope, and may be connected to the rear projection settling plane 467a.

The front settling housing 450 and the rear settling housing 460 have screw holes 451b, 461b for combination, and are combined together by screws 448.

In the center of the front and rear settling housings 450 and 460, a front through hole 451a and a rear through hole 461a are formed, respectively, for the rotor shaft 472a to pass through.

Main stator bodies 482, main stator cores 483, and main extended core parts 484a will not be described because they are the same as what are described in the previous embodiments.

A motor assembly and cleaner having the same in accordance with a fifth embodiment will now be described.

In the embodiment, a magnet cover 776 is different from what is in the first embodiment.

FIG. 35 shows how to manufacture a rotor, according to a fifth embodiment of the present disclosure.

In the first embodiment, the magnet cover 776 is formed by being rolling-processed to enclose the outer circumferential face of the magnet 773 and then hardened to enclose the magnet 773.

In this embodiment, the magnet cover 776 may include a ribbon-shaped cover body 776a.

The cover body may be formed to be spirally wound on the circumferential face of the magnet 773. As the cover body is spirally wound, it becomes the magnet cover 776 that encloses the circumferential face of the magnet 773. The cover body may be wound as long as the length of the magnet 773, and accordingly, may vary by the length of the magnet 773.

The cover body may be directly wound on the outer circumferential face of the magnet 773, and alternatively, the magnet cover 776 is manufactured while the cover body is wound around a ring type jig and hardened, and the resultant magnet cover 776 is put on the outer circumferential face of the magnet 773. The magnet cover 776 and the magnet 773 may be more firmly fixed by an adhesive applied in between.

A motor assembly and cleaner having the same in accordance with a sixth embodiment will now be described.

In this embodiment, features of a combined part between an impeller 830 and a rotor shaft 872b are different from what are in the first embodiment. Description of the same features as described in the aforementioned embodiments will be omitted herein.

FIG. 36 is a cross-sectional view of a combined rotor shaft and impeller, according to a sixth embodiment of the present disclosure.

The impeller 830 includes an impeller body 831, a plurality of wings 832, and a shaft combiner 833.

The shaft combiner 833 may include a shaft combining plane 834 and a gradient combining plane 835.

The shaft combining plane 834 is formed to correspond to the outer circumferential face of the rotor shaft 872b. The shaft combining plane 834 is formed for the rotor shaft 872b to be pressed in.

The gradient combining plane 835 is formed to extend from the shaft combining plane 834 and to be gradient. Specifically, it is formed to be gradient toward a direction getting distant from the rotor shaft 872b.

In other words, the gradient combining plane 835 is partially formed on the inner circumferential face of a shaft combiner 833, and formed to be gradient such that the inner diameter gradually increases along the inserted direction of the rotor shaft 872b in the inner circumferential face of the shaft combiner 833. The outer circumferential face of the rotor shaft 872b and the gradient combining plane 835 may be stuck to each other by an adhesive.

With this arrangement, the rotor shaft 872b is pressed in and combined with the shaft combining plane 834 and combined with the shaft combiner 833 by being adhered to the gradient combining plane 835 by an adhesive.

A shaft insertion hole 833a is not described herein because it is the same as what is described above.

A motor assembly and cleaner having the same in accordance with a seventh embodiment will now be described.

In this embodiment, features of a combined part between an impeller 930 and a rotor shaft 972b are different from what are in the first embodiment. Description of the same features as described in the aforementioned embodiments will be omitted herein.

FIG. 37 is a cross-sectional view of a combined rotor shaft and impeller, according to a seventh embodiment of the present disclosure.

The impeller 930 includes an impeller body 931, a plurality of wings 932, and a shaft combiner 933.

The shaft combiner 933 includes an anti-deformation unit 936 and a gradient combining plane 935.

The anti-deformation unit 936 is formed to prevent deformation of the shaft combiner 933 when the rotor shaft 972b is combined with the shaft combiner 933. In order for the rotor shaft 972b to be pressed in the shaft combiner 933, the outer circumferential face of the rotor shaft 972b and the inner circumferential face of the shaft combiner 933 are formed to be substantially correspond to each other, which may deform the inner circumferential face of the shaft combiner 933 when the rotor shaft 972b is pressed therein.

The anti-deformation unit 936 may be formed integrally with the impeller 930 by being insert-injected with the impeller 930 along the inner circumferential face of the shaft combiner 933. The anti-deformation unit 936 may be formed in the shaft combiner 933 such that at least a part of the anti-deformation unit 936 is arranged from an end of the shaft combiner 933 into which the rotor shaft 972b is inserted.

The anti-deformation unit 936 may include an anti-deformation plane 936a corresponding to the outer circumferential face of the rotor shaft 172b. The anti-deformation plane 936a is formed for the rotor shaft 872b to be pressed in.

The anti-deformation unit 936 is not limited to a certain material, but may be formed of a material from a metal family to prevent deformation due to the rotor shaft 972b.

The gradient combining plane 935 is the same as what is described in the above embodiment.

With this arrangement, the rotor shaft 972b is pressed in and combined with the anti-deformation plane 936a of the anti-deformation unit 936 and combined with the shaft combiner 933 by being adhered to the gradient combining plane 935 by an adhesive.

A shaft insertion hole 933a and a shaft combining plane 934 are not described herein because they are the same as what are described above.

A motor assembly and cleaner having the same in accordance with an eighth embodiment will now be described.

In this embodiment, features of a combined part between an impeller 1030 and a rotor shaft 1072b are different from what are in the ninth embodiment. Description of the same features as described in the aforementioned embodiments will be omitted herein.

FIG. 38 is a cross-sectional view of a combined rotor shaft and impeller, according to an eighth embodiment of the present disclosure.

The impeller 1030 includes an impeller body 1031, a plurality of wings 1032, and a shaft combiner 1033.

The shaft combiner 1033 includes an anti-deformation unit 1036.

Compared to the third embodiment, the anti-deformation unit 1036 may be formed all across the inner circumferential face of the shaft combiner 1033 in this embodiment.

The anti-deformation unit 1036 may be formed to extend from one end of the shaft combiner 1033, in which the rotor shaft 1072*b* is inserted, to the other end in the shaft combiner 1033.

The anti-deformation unit 1036 may include an anti-deformation plane 1036*a* corresponding to the outer circumferential face of the rotor shaft 1072*b*. The anti-deformation plane 1036*a* is formed for the rotor shaft 1072*b* to be pressed in.

With this arrangement, the rotor shaft 1072*b* is combined with the shaft combiner 1033 by being pressed in the anti-deformation plane 1036*a* of the anti-deformation unit 1036.

A shaft insertion hole 1033*a* is not described herein because it is the same as what is described above.

A motor assembly and cleaner having the same in accordance with a ninth embodiment will now be described.

In this embodiment, features of a combined part between an impeller 1130 and a rotor shaft 1172*b* are different from what are in the eighth embodiment. Description of the same features as described in the aforementioned embodiments will be omitted herein.

FIG. 39 is a cross-sectional view of a combined rotor shaft and impeller, according to a ninth embodiment of the present disclosure.

The impeller 1130 includes an impeller body 1131, a plurality of wings 1132, and a shaft combiner 1133.

The shaft combiner 1133 includes an anti-deformation unit 1136.

The anti-deformation unit 1136 includes an anti-deformation plane 1136*a* and an anti-deformation gradient plane 1136*b*.

The anti-deformation plane 1136*a* is formed to correspond to the outer circumferential face of the rotor shaft 1172*b* and formed for the rotor shaft 1172*b* to be pressed in.

The anti-deformation gradient plane 1136*b* may extend from the anti-deformation plane 1136*a* and may be gradient. Specifically, it is formed to be gradient toward a direction getting distant from the rotor shaft 1172*b*.

In other words, the anti-deformation gradient plane 1136*b* is partially formed on the inner circumferential face of the anti-deformation unit 1136, and formed to be gradient such that the inner diameter gradually increases along the inserted direction of the rotor shaft 1172*b* in the inner circumferential face of the anti-deformation unit 1136. The outer circumferential face of the rotor shaft 1172*b* and the anti-deformation gradient plane 1136*b* may be stuck to each other by an adhesive, With this arrangement, the rotor shaft 1172*b* is pressed in and combined with the anti-deformation plane 1136*a* and combined with the shaft combiner 1133 by being adhered to the anti-deformation gradient plane 1136*b* by an adhesive.

A shaft insertion hole 1133*a* is not described herein because it is the same as what is described above.

A motor assembly and cleaner having the same in accordance with a tenth embodiment will now be described.

In this embodiment, features of a combined part between an impeller 1230 and a rotor shaft 1272*b* are different from those in the first embodiment. Description of the same features as described in the aforementioned embodiments will be omitted herein.

FIG. 40 shows combination of a rotor shaft and an impeller, according to a tenth embodiment of the present disclosure.

The rotor shaft 1272*b* may include an anti-slip part 1272*ba*, which is knurling-processed across the outer circumferential face of the rotor shaft 1272*b* to correspond to a shaft combining plane 1234 of the shaft combiner 1233.

As the rotor shaft 1272*b* is pressed in the shaft combiner 1233, the anti-slip part 1272*ba* is combined to correspond to the shaft combining plane 1234.

A shaft insertion hole 1233*a* is not described herein because it is the same as what is described above.

A motor assembly and cleaner having the same in accordance with a eleventh embodiment will now be described.

In this embodiment, features of a combined part between an impeller 1330 and a rotor shaft 1372*b* are different from those in the first embodiment. Description of the same features as described in the aforementioned embodiments will be omitted herein.

FIGS. 41A, 41B are cross-sectional views of a combined rotor shaft and impeller, according to an eleventh embodiment of the present disclosure.

The rotor shaft 1372*b* may include a screw projection 1372*ba*.

The screw projection 1372*ba* is formed to have a screw thread formed across the outer circumferential face of the rotor shaft 1372*b*. The screw projection 1372*ba* is formed at one end of the rotor shaft 1372*b* from which to be inserted into the impeller 1330. The screw projection 1372*ba* is formed to correspond to a screw groove 1337 as will be described below, to be screw-combined with the screw groove 1337.

The screw projection 1372*b* may be formed to be stepped from the outer circumferential face of the adjacent rotor shaft 1372*b* in order to have an outer diameter smaller than the outer circumferential face of the adjacent rotor shaft 1372*b*.

A shaft insertion hole 1333*a* is not described herein because it is the same as what is described above.

The impeller 1330 may include an impeller body 1331, a plurality of wings 1332, and a shaft combiner 1333.

The shaft combiner 1333 includes a shaft combining plane 1334, and a screw groove.

The screw groove 1337 is formed to correspond to the screw projection 1372*ba*, and a screw groove is formed for a screw thread of the screw projection 1372*ba* to be combined with. The screw groove 1337 may be formed to have a step from the inner circumferential face of the adjacent shaft combiner 1333 such that the inner diameter of the screw groove 1337 is smaller than the inner circumferential face of the adjacent shaft combiner 1333.

The rotor shaft 1372*b* may include a shaft step plane 1372*bb*, a stepped plane adjacent to the screw projection 1372*ba*, and the impeller 1330 may include an impeller step plane 1338, a stepped plane adjacent to the screw groove 1337. As the rotor shaft 1372*b* is combined with the impeller 1330, the shaft step plane 1372*bb* and the stepped plane of the impeller 1330 may be formed to face each other. Since the shaft step plane 1372*bb* and the stepped plane of the impeller 1330 may be adhered to each other by an adhesive, the rotor shaft 1372*b* and the impeller 1330 may be combined even in the direction of the rotor shaft 1372*a*.

With this arrangement, the rotor shaft 1372*b* is pressed in and combined with the shaft combining plane 1334 and combined with the shaft combiner 1333 by the screw projection 1372*ba* screw-combined with the screw groove 1337. Furthermore, the shaft step plane 1372*bb* and the impeller step plane 1338 may be adhered to each other by an adhesive, thereby more firmly combining them.

A motor assembly and cleaner having the same in accordance with a twelfth embodiment will now be described.

In this embodiment, features of a combined part between an impeller 1430 and a rotor shaft 1472*b* are different from those in the eleventh embodiment. Description of the same features as described in the aforementioned embodiments will be omitted herein.

FIG. 42 is a cross-sectional view of a combined rotor shaft and impeller, according to a twelfth embodiment of the present disclosure.

The rotor shaft 1472*b* may include a screw projection 1472*ba*.

The impeller 1430 may include an impeller body 1431, a plurality of wings 1432, and a shaft combiner 1433.

The shaft combiner 1433 includes a shaft combining plane 1434 and a nut unit 1439.

The nut unit 1439 is formed to correspond to the screw projection 1472*ba*, and a screw groove is formed for a screw thread of the screw projection 1472*ba* to be combined with. The nut unit 1439 may be formed to have a step from the inner circumferential face of the adjacent shaft combiner 1433 such that the inner diameter of the nut unit 1439 is smaller than the inner circumferential face of the adjacent shaft combiner 1433.

The nut unit 1439 has the form of a screw groove for the screw projection 1472*ba* to be combined with, and includes a nut combiner 1439*a* formed on the inner circumferential face. The nut combiner 1439*a* may be formed to have a step from the inner circumferential face of the adjacent shaft combiner 1433 such that the inner diameter of the nut combiner 1439*a* is smaller than the inner circumferential face of the adjacent shaft combiner 1433.

The nut unit 1439 may be insert-injected with the impeller 1430 on the front of the impeller 1430, and may be arranged to be simply screw-combined with the rotor shaft 1472*b*.

The rear face 1439*b* of the nut unit 1439 and the shaft step plane 1472*bb* of the rotor shaft 1472*b* may be formed to face each other. Since the rear face 1439*b* of the nut unit 1439 and the shaft step plane 1472*bb* may be adhered to each other by an adhesive, the rotor shaft 1472*b* and the impeller 1430 may be combined even in the direction of the rotor shaft 1472*a*.

With this arrangement, the rotor shaft 1472*b* is pressed in and combined with the shaft combining plane 1434 and combined with the shaft combiner 1433 by the nut combiner 1439*a* of the nut unit 1439 screw-combined with the screw projection 1472*ba*. Furthermore, the shaft step plane 1472*bb* and the rear face 1439*b* of the nut unit 1439 may be adhered to each other by an adhesive, thereby more firmly combining them.

A motor assembly and cleaner having the same in accordance with a thirteenth embodiment will now be described.

In this embodiment, features of a combined part between an impeller 1530 and a rotor shaft 1572*b* are different from what are in the first embodiment. Description of the same features as described in the aforementioned embodiments will be omitted herein.

FIGS. 43A, 43B are cross-sectional views of a combined rotor shaft and impeller, according to a thirteenth embodiment of the present disclosure.

The rotor shaft 1572*b* includes a first shaft 1572*ba*, and a second shaft 1572*bb* formed to extend in the same elongate direction as the first shaft 1572*ba*.

The second shaft 1572*bb* may be formed to have a diameter smaller than the first shaft 1572*ba*. The second shaft 1572*bb* may be formed to be stepped from the first shaft 1572*ba*. In the present embodiment, the second shaft 1572*bb* may be formed to extend from the first shaft 1572*ba* at an end of the first shaft 1572*ba*.

The impeller 1530 includes an impeller body 1531, a shaft combiner 1533, and a plurality of wings 1532.

The shaft combiner 1533 includes a first shaft combining plane 1534*a* and a second shaft combining plane 1534*b*.

The first shaft 1572*ba* is combined and settled in the first shaft combining plane 1534*a*, and the second shaft 1572*bb* is combined and settled in the second shaft combining plane 1534*b*. Since the second shaft 1572*bb* having a smaller diameter than the first shaft 1572*ba* is settled in the second shaft combining plane 1534*b*, it may have an inner diameter smaller than the first shaft combining plane 1534*a*.

The rotor shaft 1572*b* may include a shaft step plane 1572*bc*, which is a stepped plane formed between the first shaft 1572*ba* and the second shaft 1572*bb*. The impeller 1530 may include an impeller step plane 1538, which is a stepped plane formed between the first shaft combining plane 1534*a* and the second shaft combining plane 1534*b*.

In a case of pressing the rotor shaft 1572*b* in the shaft combiner 1533, the shaft step plane 1572*bc* and the impeller step plane 1538 may be formed to face each other and adhered to each other by an adhesive, thereby enabling the rotor shaft 1572*b* and the impeller 1530 to be combined even in the direction of the rotor shaft 1572*a*.

With this arrangement, the rotor shaft 1572*b* is combined with the shaft combiner 1533 by pressing the first shaft 1572*ba* and the second shaft 1572*bb* in the first shaft combining plane 1534*a* and the second shaft combining plane 1534*b*, respectively. Furthermore, the shaft step plane 1572*bb* and the impeller step plane 1538 may be adhered to each other by an adhesive, thereby more firmly combining them.

A motor assembly and cleaner having the same in accordance with a fourteenth embodiment will now be described.

In this embodiment, features of a combined part between an impeller 1630 and a rotor shaft 1672*b* are different from what are in the fifteenth embodiment. Description of the same features as described in the aforementioned embodiments will be omitted herein.

FIGS. 44A, 44B are cross-sectional views of a combined rotor shaft and impeller, according to a fourteenth embodiment of the present disclosure.

The rotor shaft 1672*b* includes a first shaft 1672*ba*, and a second shaft 1672*bb*. A shaft step plane 1672*bc* may be formed between the first shaft 1672*ba* and the second shaft 1672*bb*.

The impeller 1630 includes an impeller body 1631, a shaft combiner 1633, and a plurality of wings 1632.

The shaft combiner 1633 includes a first shaft combining plane 1634*a* and a second shaft combining plane 1634*b*. An impeller step plane 1638 may be formed between the first shaft combining plane 1634*a* and the second shaft combining plane 1634*b*.

The shaft combiner 1633 may include a shaft cover 1639 arranged at an end of the second shaft combining plane 1634*b*. The shaft cover 1639 is arranged to block the end of the rotor shaft 1672b, and formed to contain an adhesive injected between the rotor shaft 1672b and the shaft combiner 1633.

The shaft cover 1639 may include a discharging hole 1639a. The discharging hole 1639a is formed to link an inner space formed when the rotor shaft 1672b is combined with the impeller 1630 to an outer space of the impeller 1630.

The discharging hole 1639a is formed to release inside air when the rotor shaft 1672b is pressed into the shaft combiner 1633. As the inside air is released, the shaft combiner 1633 and the rotor shaft 1672b may come into tight contact with each other. Furthermore, if an adhesive is injected between the shaft combiner 1633 and the rotor shaft 1672b, the inside air may be taken out, thereby improving an adhesion efficiency of the adhesive. The shape and arrangement of the discharging hole 1639a is not limited, but in this embodiment, the discharging hole 1639a is arranged in the center of the shaft cover 1639.

A motor assembly and cleaner having the same in accordance with a fifteenth embodiment will now be described.

In this embodiment, features of a combined part between an impeller 1730 and a rotor shaft 1772b are different from those in the fifteenth embodiment. Description of the same features as described in the aforementioned embodiments will be omitted herein.

FIG. 45 is a cross-sectional view of a combined rotor shaft and impeller, according to a fifteenth embodiment of the present disclosure.

The rotor shaft 1772b includes a first shaft 1772ba, and a second shaft 1772bb formed to extend in the same elongate direction as the first shaft 1772ba.

The second shaft 1772bb may be formed to have a diameter smaller than the first shaft 1772ba. The second shaft 1772bb may be formed to be stepped from the first shaft 1772ba. In the present embodiment, the second shaft 1772bb may be formed to extend from the first shaft 1772ba at an end of the first shaft 1772ba.

The rotor shaft 1772b may include a shaft step plane 1772bc, which is a stepped plane formed between the first shaft 1772ba and the second shaft 1772bb.

The impeller 1730 may include an impeller body 1731, a shaft combiner 1733, and a plurality of wings 1732.

The shaft combiner 1733 may include a shaft combining plane 1734 corresponding to the outer circumferential face of the rotor shaft 1772b. The shaft combining plane 1734 is formed for the rotor shaft 1772b to be pressed in. Specifically, it is formed for the first shaft 1772ba of the rotor shaft 1772b to be pressed in.

The second shaft 1772bb and the shaft combining plane 1734 may be adhered to each other by an adhesive.

With this arrangement, the rotor shaft 1772b may be combined with the shaft combiner 1733 as the first shaft 1772ba is pressed in and combined on the shaft combining plane 1734 and the second shaft 1772bb and the shaft combining plane 1734 are adhered to each other by an adhesive.

A motor assembly and cleaner having the same in accordance with a sixteenth embodiment will now be described.

In this embodiment, features of a combined part between an impeller 1830 and a rotor shaft 1872b are different from those in the fourteenth embodiment. Description of the same features as described in the aforementioned embodiments will be omitted herein.

FIG. 46 is a cross-sectional view of a combined rotor shaft and impeller, according to a sixteenth embodiment of the present disclosure.

The rotor shaft 1872b includes a first shaft 1872ba, a second shaft 1872bb formed to extend in the same elongate direction as the first shaft 1872ba, and a third shaft 1872bc formed to extend in the same elongate direction as the second shaft 1872bb.

A screw thread is formed on the outer circumferential face of the third shaft 1872bc for a nut unit 1839 to be combined with, as will be described below.

An impeller 1830 includes an impeller body 1831, a shaft combiner 1833, and a plurality of wings 1832.

The shaft combiner 1833 includes a shaft combining plane 1834 and a nut unit 1839.

The shaft combining plane 1834 is formed for the rotor shaft 1872b to be pressed in. Specifically, it is formed for the first shaft 1872ba of the rotor shaft 1872b to be pressed in. The second shaft 1872bb and the shaft combining plane 1834 may be adhered to each other by an adhesive.

The nut unit 1839 is formed to correspond to the third shaft 1872bc, and a screw groove is formed for a screw thread of the outer circumferential face of the third shaft 1872bc to be combined with. The nut unit 1839 has the form of a screw groove for the third shaft to be combined with, and includes a nut combiner 1839a formed on the inner circumferential face.

The nut combiner 1839a may be formed to have a step from the inner circumferential face of the adjacent shaft combiner 1833 such that the inner diameter of the nut combiner 1839a is smaller than the inner circumferential face of the adjacent shaft combiner 1833.

The nut unit 1839 may be insert-injected with the impeller 1830 on the front of the impeller 1830, and may be arranged to be simply screw-combined with the rotor shaft 1872b.

With this arrangement, the rotor shaft 1872b may be combined with the shaft combiner 1833 as the first shaft 1872ba is pressed in and combined on the shaft combining plane 1834, the second shaft 1872bb and the shaft combining plane 1834 are adhered to each other by an adhesive, and the third shaft 1872bc is screw-combined with the nut unit 1839.

A motor assembly and cleaner having the same in accordance with a seventeenth embodiment will now be described.

In this embodiment, features of a combined part between an impeller 1930 and a rotor shaft 1972b are different from those in the fifteenth embodiment. Description of the same features as described in the aforementioned embodiments will be omitted herein.

FIGS. 47A, 47B are cross-sectional views of a combined rotor shaft and impeller, according to a seventeenth embodiment of the present disclosure.

The rotor shaft 1972b includes a first shaft 1972ba, and a second shaft 1972bb formed to extend in the same elongate direction as the first shaft 1972ba. The second shaft 1972bb may be formed to have a diameter smaller than the first shaft 1972ba. The second shaft 1972bb may be formed to be stepped from the first shaft 1972ba. In the present embodiment, the second shaft 1972bb may be formed to extend from the first shaft 1972ba at an end of the first shaft 1972ba. The rotor shaft 1972b may include a shaft step plane 1972bc, which is a stepped plane formed between the first shaft 1972ba and the second shaft 1972bb.

Unlike the rotor shaft 1772b in the seventeenth embodiment, the second shaft 1972bb may be arranged on the first shaft 1972ba. In other words, the first shafts 1972ba may be arranged on both ends of the second shaft 1972bb.

An impeller 1930 includes an impeller body 1931, a shaft combiner 1933, and a plurality of wings 1932.

The shaft combiner 1933 may include a shaft combining plane 1934 corresponding to the outer circumferential face of the rotor shaft 1972b. The inner diameter of the shaft combiner 1933 formed by the shaft combining plane 1934 is formed to correspond to the outer diameter of the rotor shaft 192b, for the rotor shaft 1972b to be pressed into the shaft combiner 1933. Specifically, it is formed for the first shaft 1972ba of the rotor shaft 1972b to be pressed in.

The second shaft 1972bb and the shaft combining plane 1934 may be adhered to each other by an adhesive. The adhesive to be injected between the second shaft 1972bb and the shaft combining plane 1934 is placed in a space closed by the shaft step plane 1972bc.

With this arrangement, the rotor shaft 1972b may be combined with the shaft combiner 1933 as the first shaft 1972ba is pressed in and combined on the shaft combining plane 1934 and the second shaft 1972bb and the shaft combining plane 1934 are adhered to each other by an adhesive.

A motor assembly and cleaner having the same in accordance with an eighteenth embodiment will now be described.

In this embodiment, features of a combined part between an impeller 2030 and a rotor shaft 2072b are different from those in the first embodiment. Description of the same features as described in the aforementioned embodiments will be omitted herein.

FIGS. 48A, 48B are cross-sectional views of a combined rotor shaft and impeller, according to an eighteenth embodiment of the present disclosure.

The impeller 2030 and the rotor shaft 2072b may be integrally injected. Specifically, in injecting the impeller 2030, in order for the rotor shaft 2072b to be integrally injected, the rotor shaft 2072b may be insert-injected.

The impeller 2030 may include an impeller body 2031, a shaft combiner 2033, and a plurality of wings 2032.

The rotor shaft 2072b may be formed to correspond to the shaft combiner 2033, and may include a plurality of anti-slip grooves 2072ba formed to prevent slip of the impeller 2030.

The plurality of anti-slip grooves 2072ba are arranged in the form of grooves along the direction of the rotor shaft 2072a on the outer circumferential face of the rotor shaft 2072b. Since the impeller 2030 and the rotor shaft 2072b are integrally injected, the shaft combiner 2033 of the impeller 2030 may include a combining projection plane 2034 having the form of an inner circumferential plane with a plurality of projections corresponding to the form of the plurality of anti-slip grooves 2072ba.

A motor assembly and cleaner having the same in accordance with a nineteenth embodiment will now be described.

In this embodiment, features of a combined part between an impeller 2030 and a rotor shaft 2072b are different from those in the eighteenth embodiment. Description of the same features as described in the aforementioned embodiments will be omitted herein.

FIGS. 49A, 49B are cross-sectional views of a combined rotor shaft and impeller, according to a nineteenth embodiment of the present disclosure.

The rotor shaft 2072b may further include an anti-leakage flange 2072bb formed at the end of the rotor shaft 2072b.

The anti-leakage flange 2072bb may have a diameter larger than the adjacent rotor shaft 2072b and may be formed at the end of the rotor shaft 2072b. In injecting the impeller 2030 and the rotor shaft 2072b, an adhesive may be applied onto the outer circumferential face of the rotor shaft 2072b for more firm combination such that the adhesive leaking out in a process is prevented from leaking to the front of the impeller 2030.

The anti-leakage flange 2072bb may have the form of a flange at the end of the rotor shaft 2072b, and in a case of being configured with the plurality of anti-slip grooves 2072ba, may be arranged adjacent to the plurality of anti-slip grooves 2072ba.

The anti-leakage flange 2072bb may include an anti-leakage groove 2072bc formed on the inner side of the anti-leakage flange 2072bb to be sunken along the circumference of the rotor shaft 2072b to contain the adhesive that is leaking out. The anti-leakage groove 2072bc may be formed along the circumference of the rotor shaft 2072b and may have the form of a ring type groove centered around the rotor shaft 2072b.

Although the anti-slip groove 2072ba and the anti-leakage flange 2072bb are configured together in this embodiment, it is possible that only one of the components is applied.

A motor assembly and cleaner having the same in accordance with a twentieth embodiment will now be described.

Features overlapping with those of the first embodiment will not be described below.

FIG. 50 is a perspective view of a rotor, according to a twentieth embodiment of the present disclosure, and FIGS. 51A and 51B are perspective views of auxiliary members of the rotor, according to the twentieth embodiment of the present disclosure.

The rotor 2172 may include a support member 2174.

The support member 2174 is arranged to be adjacent to the magnet 173. Specifically, the support member 2174 may be arranged to be adjacent to the magnet 173 in the direction of the rotor shaft 172a. There may be a pair of support members 2174 arranged on one and the other sides of the magnet 173 in the direction of the rotor shaft 172a. The support member 2174 may include a balancer. In other words, a pair of balancers may be arranged on both sides of the magnet 173 for compensating for eccentricity due to rotation of the rotor 2172.

The support member 2174 may include an internal support member 2174c and an outside support member 2174d. The internal support member 2174c and the outside support member 2174d may be detachably arranged. Specifically, the internal support member 2174c and the outside support member 2174d are formed to have the same concentric circle, and combining the internal support member 2174c and the outside support member 2174d may form an inlet 174aa, an outlet 174bb, and an internal channel 177.

One of the internal support member 2174c and the outside support member 2174d may include an assembling projection 2174ca formed to protrude, and the other of the internal support member 2174c and the outside support member 2174d may include an assembling groove 2174da corresponding to the assembling projection 2174ca. In this embodiment, the internal support member 2174c includes the assembling projection 2174ca and the outside support member 2174d has the assembling groove 2174da formed therein, enabling the both components to be firmly combined in the circumferential direction when the internal support member 2174c and the outside support member 2174d are combined.

The inlet 174aa, outlet 174bb, and internal channel 177 are the same as what are described in the first embodiment, so the description will be omitted below.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

Furthermore, since the respective embodiments are not independent ones but may have compatible components, they may be modified in various ways.

The invention claimed is:

1. A motor assembly comprising:
a stator;
a rotor including a rotor shaft that electromagnetically interacts with the stator to be rotated, the rotor shaft having anti-slip grooves extending in an axial direction along an outer face of the rotor shaft and formed at regular intervals in a circumferential direction of the rotor shaft;
an impeller including:
an impeller body,
a plurality of wings formed on an outer face of the impeller body to produce air currents via rotation of the impeller, and
a shaft combiner, arranged on the impeller body, into which the rotor shaft is inserted; and
an adhesive in the anti-slip grooves to adhere the outer face of the rotor shaft to the shaft combiner,
wherein the rotor shaft comprises an anti-leakage flange formed at an end of the rotor shaft to prevent the adhesive from leaking out from between the outer face of the rotor shaft and the shaft combiner.

2. The motor assembly of claim 1, wherein the anti-leakage flange comprises an anti-leakage groove sunken along a circumference of the rotor shaft on an inside of the anti-leakage flange to prevent the adhesive from leaking out.

3. The motor assembly of claim 1, wherein the anti-slip grooves of the rotor shaft are adjacent to the shaft combiner.

4. A vacuum cleaner comprising:
a motor to suck air into the vacuum cleaner, the motor including:
a stator,
a rotor including a rotor shaft that electromagnetically interacts with the stator to be rotated, the rotor shaft having anti-slip grooves extending in an axial direction along an outer face of the rotor shaft and formed at regular intervals in a circumferential direction of the rotor shaft,
an impeller including:
an impeller body,
a plurality of wings formed on an outer face of the impeller body to produce air currents via rotation of the impeller, and
a shaft combiner, arranged on the impeller body, into which the rotor shaft is inserted, and
an adhesive in the anti-slip grooves to adhere the outer face of the rotor shaft to the shaft combiner,
wherein the rotor shaft comprises an anti-leakage flange formed at an end of the rotor shaft to prevent the adhesive from leaking out from between the outer face of the rotor shaft and the shaft combiner.

5. The vacuum cleaner of claim 4, wherein the anti-leakage flange comprises an anti-leakage groove sunken along a circumference of the rotor shaft on an inside of the anti-leakage flange to prevent the adhesive from leaking out.

6. The vacuum cleaner of claim 4, wherein the anti-slip grooves of the rotor shaft are adjacent to the shaft combiner.

* * * * *